(12) United States Patent
Li et al.

(10) Patent No.: US 10,192,361 B2
(45) Date of Patent: Jan. 29, 2019

(54) HEAD-MOUNTED DISPLAY DEVICE AND COMPUTER PROGRAM

(71) Applicant: SEIKO EPSON CORPORATION, Tokyo (JP)

(72) Inventors: Jia Li, Aurora (CA); Guoyi Fu, Vaughan (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/187,257

(22) Filed: Jun. 20, 2016

(65) Prior Publication Data

US 2017/0011555 A1   Jan. 12, 2017

(30) Foreign Application Priority Data

Jul. 6, 2015   (JP) .................................. 2015-135365
Aug. 27, 2015   (JP) .................................. 2015-167787
(Continued)

(51) Int. Cl.
*G09G 5/00*   (2006.01)
*G06T 19/00*   (2011.01)
(Continued)

(52) U.S. Cl.
CPC ........ *G06T 19/006* (2013.01); *G02B 27/0101* (2013.01); *G02B 27/0172* (2013.01);
(Continued)

(58) Field of Classification Search
CPC ........... G06T 19/006; G06T 7/70; G06T 1/60; G06T 2207/30204; G06T 7/80;
(Continued)

(56) References Cited

U.S. PATENT DOCUMENTS 6,335,722 B1   1/2002   Tani et al.
9,317,973 B2   4/2016   Choukroun
(Continued)

FOREIGN PATENT DOCUMENTS

EP   1852821 A1   11/2007
EP   2341386 A1   7/2011
(Continued)

OTHER PUBLICATIONS

Kato et al. Marker Tracking and HMD Calibration for a Video-based Augmented Reality Conferencing System, Dec. 1999, 1-10.*
(Continued)

*Primary Examiner* — Robert Craddock
(74) *Attorney, Agent, or Firm* — Oliff PLC

(57) ABSTRACT

A head-mounted display device includes an image display section configured to display an image, an imaging section, a memory section configured to store data of a marker image, an image setting section configured to cause the image display section to display an image based at least on the data, and a parameter setting section. The parameter setting section derives at least one of camera parameters of the imaging section and a spatial relationship, the spatial relationship being between the imaging section and the image display section, based at least on an image that is captured by the imaging section in the case where the imaging section acquires a captured image of a real marker.

6 Claims, 35 Drawing Sheets

(30) Foreign Application Priority Data

| Dec. 2, 2015 | (JP) | 2015-235305 |
|---|---|---|
| Dec. 2, 2015 | (JP) | 2015-235306 |
| Dec. 2, 2015 | (JP) | 2015-235307 |
| May 16, 2016 | (JP) | 2016-097716 |

(51) Int. Cl.

| G06F 3/01 | (2006.01) |
|---|---|
| G02B 27/01 | (2006.01) |
| G06T 7/80 | (2017.01) |
| G06T 1/60 | (2006.01) |
| G06T 7/30 | (2017.01) |
| G06T 7/70 | (2017.01) |

(52) U.S. Cl.
CPC .......... *G02B 27/0176* (2013.01); *G06F 3/011* (2013.01); *G06T 1/60* (2013.01); *G06T 7/30* (2017.01); *G06T 7/70* (2017.01); *G06T 7/80* (2017.01); *G02B 2027/014* (2013.01); *G02B 2027/0138* (2013.01); *G02B 2027/0154* (2013.01); *G06T 2200/04* (2013.01); *G06T 2207/30204* (2013.01)

(58) Field of Classification Search
CPC ... G06T 2200/04; G06T 7/30; G02B 27/0101; G02B 27/0172; G02B 27/0176; G02B 2027/0138; G02B 2027/014; G06F 3/011
USPC .......................................................... 345/633
See application file for complete search history.

(56) References Cited

U.S. PATENT DOCUMENTS

| 2002/0052709 | A1 | 5/2002 | Akatsuka et al. |
|---|---|---|---|
| 2002/0105484 | A1 | 8/2002 | Navab et al. |
| 2002/0113756 | A1 | 8/2002 | Tuceryan et al. |
| 2002/0180759 | A1 | 12/2002 | Park et al. |
| 2003/0080978 | A1 | 5/2003 | Navab et al. |
| 2008/0292131 | A1 | 11/2008 | Takemoto et al. |
| 2008/0317333 | A1 | 12/2008 | Li et al. |
| 2010/0182426 | A1 | 7/2010 | Perruchot et al. |
| 2011/0194029 | A1 | 8/2011 | Herrmann et al. |
| 2011/0248904 | A1 | 10/2011 | Miyawaki et al. |
| 2012/0062691 | A1 | 3/2012 | Fowler et al. |
| 2012/0212398 | A1* | 8/2012 | Border .............. G02B 27/017 345/8 |
| 2012/0257024 | A1 | 10/2012 | Inaba |
| 2012/0313955 | A1 | 12/2012 | Choukroun |
| 2013/0050065 | A1 | 2/2013 | Shimizu |
| 2013/0050833 | A1 | 2/2013 | Lewis et al. |
| 2013/0106694 | A1 | 5/2013 | Tanaka et al. |
| 2013/0162675 | A1 | 6/2013 | Matsushima et al. |
| 2013/0187943 | A1 | 7/2013 | Bohn et al. |
| 2013/0230209 | A1 | 9/2013 | Hashimoto et al. |
| 2013/0235169 | A1 | 9/2013 | Kato et al. |
| 2013/0241805 | A1 | 9/2013 | Gomez |
| 2013/0335575 | A1 | 12/2013 | Tsin et al. |
| 2014/0071308 | A1 | 3/2014 | Cieplinski et al. |
| 2014/0160320 | A1 | 6/2014 | Babale et al. |
| 2014/0327792 | A1 | 11/2014 | Mulloni et al. |
| 2014/0333665 | A1 | 11/2014 | Sylvan et al. |
| 2015/0009313 | A1 | 1/2015 | Noda et al. |
| 2015/0025683 | A1 | 1/2015 | Amano |
| 2015/0109335 | A1 | 4/2015 | Hayakawa et al. |
| 2015/0169085 | A1 | 6/2015 | Ida et al. |
| 2015/0213648 | A1 | 7/2015 | Wu et al. |
| 2015/0220143 | A1 | 8/2015 | Choi et al. |
| 2015/0228122 | A1 | 8/2015 | Sadasue |
| 2015/0293362 | A1 | 10/2015 | Takahashi et al. |
| 2016/0139413 | A1 | 5/2016 | Gribetz et al. |
| 2016/0203581 | A1 | 7/2016 | Keller et al. |
| 2016/0247322 | A1 | 8/2016 | Komaki |
| 2016/0262608 | A1 | 9/2016 | Krueger |
| 2016/0269685 | A1 | 9/2016 | Jessop et al. |
| 2016/0295208 | A1 | 10/2016 | Beall |
| 2016/0323569 | A1 | 11/2016 | Wang |
| 2016/0349510 | A1 | 12/2016 | Miller et al. |
| 2017/0041592 | A1 | 2/2017 | Hwang et al. |
| 2017/0054970 | A1 | 2/2017 | Singh et al. |
| 2017/0085770 | A1 | 3/2017 | Cui et al. |
| 2017/0213085 | A1 | 7/2017 | Fu et al. |
| 2017/0278262 | A1 | 9/2017 | Kawamoto et al. |
| 2018/0007350 | A1 | 1/2018 | Liu et al. |

FOREIGN PATENT DOCUMENTS

| JP | H06-137840 A | 5/1994 |
|---|---|---|
| JP | 2005-038321 A | 2/2005 |
| WO | 99/23524 A1 | 5/1999 |
| WO | 2004-113991 A2 | 12/2004 |

OTHER PUBLICATIONS

Naimark et al., Circular Data Matrix Fiducial System and Robust Image Processing for a Wearable Vision-Inertial Self-Tracker, Dec. 2002, Proceedings of the International Symposium on Mixed and Augmented Reality (ISMAR'02), 1-10.*

Fuhrmann Anton et al., "Fast Calibration for Augmented Reality", Vienna University of Technology.

Zhang, Xiang et al., "Visual Marker Detection and Decoding in AR Systems: A Comparative Study," Proceedings of the International Symposium on Mixed and Augmented Reality, Sep. 30, 2002, pp. 97-106.

You, Suya et al., "Hybrid Inertial and Vision Tracking for Augmented Reality Registration," Virtual Reality, (1999), Proceedings of IEEE Houston, Texas, Mar. 13, 1999, pp. 260-267.

Kato, Hirokazu et al., "Marker Tracking and HMD Calibration for a Video-Based Augmented Reality Conferencing System", Augmented Reality, (1999), Proceedings of the Second IEEE and ACM International Workshop on San Francisco, California, pp. 85-94.

Garrido-Jurado, S. et al., "Automatic Generation and Detection of Highly Reliable Fiducial Markers Under Occlusion", Pattern Recognition, vol. 47, (2014), pp. 2280-2292.

Oct. 19, 2016 Extended Search Report issued in European Patent Application No. 16175559.0.

May 4, 2017 Office Action issued in U.S. Appl. No. 14/740,523.

McGarrity, Erin et al., "A Method for Calibrating See-Through Head-Mounted Displays for AR" Augmented Reality, 1999. (IWAR'99) Proceedings. 2nd IEEE and ACM International Workshop on. IEEE, 1999.

Zhang, Xiang et al.; "Visual Marker Detection and Decoding in AR Systems: A Comparative Study", Augments Reality Group; Siemens Corporation Research; Princeton, NJ, (2002), pp. 1-10.

Sep. 14, 2017 Office Action issued in U.S. Appl. No. 14/740,523.

Billinghurst, Mark. et al., "Collaborative Mixed Reality", Proceedings of International Symposium on Mix Reality, (Jan. 1, 1993), pp. 261-284.

Owen, Charls B. et al., "Display-Relative Calibration for Optical See-Through Head-Mounted Displays", Proceedings of the "Third IEEE and ACM International Symposium on Mixed and Augmented Reality", (Nov. 2-5, 2004), Arlington VA, USA, IEEE Piscataway, NJ, USA, pp. 70-78.

Genc, Yakup et. al, "Practical Solutions for Calibration of Optical See-Through Devices", Proceedings of International Symposium on Mixed and Augmented Reality, ISMAR 2002, (Sep. 30-Oct. 1, 2002), Drmstadt, Germany, IEEE Computer Society, Los Alamitos, pp. 169-275.

Gottschalk, Stefan. et al., "Autocalibration for Virtual Environments Tracking Hardware", Proceedings of SIGGRAPH 93, Computer Graphics Proceedings, Annucal Conference Series, pp. 65-72, (1993).

Malek S. et. al., "Calibration Method for an Augmented Reality System", World Academy of Science, Engineering and Technology 21, (2008).

Tuceryan, Mihran et. al., "Calibration Requirements and Procedures for a Monitor-Based Augmented Reality System", IEEE Transactions on Visualization and Computer Graphics, vol. 1, No. 3, pp. 255-273, (1995).

(56) References Cited

OTHER PUBLICATIONS

Sep. 12, 2016 Office Action issued in U.S. Appl. No. 14/740,523.
U.S. Appl. No. 15/159,327 filed May 19, 2016 in the name of Yang et al.
Apr. 19, 2018 Office Action issued in U.S. Appl. No. 14/740,523.
Feb. 14, 2018 Office Action issued in U.S. Appl. No. 15/346,112.
Feb. 14, 2018 Office Action issued in U.S. Appl. No. 15/346,261.
Feb. 27, 2018 Office Action issued in U.S. Appl. No. 15/159,327.
U.S. Appl. No. 14/740,523, filed Jun. 16, 2015 in the name of Kezele et al.
U.S. Appl. No. 15/346,112, filed Nov. 8, 2016 in the name of Li et al.
U.S. Appl. No. 15/346,261, filed Nov. 8, 2016 in the name of Fu et al.
Aug. 10, 2018 Office Action issued in U.S. Appl. No. 15/346,112.
Aug. 13, 2018 Office Action issued in U.S. Appl. No. 15/346,261.

* cited by examiner

| DISPLAY MARKER IMAGE IMG | STRUCTURES OF ACTUAL MARKER AND MODEL MARKER |
|---|---|
| BOTH EYES / ALIGNMENT | 2D |
| SINGLE EYE / ALIGNMENT | 3D |

| POSITION AND POSE OF MODEL MARKER (MARKER IMAGE IMG) | PARAMETER TO BE ADJUSTED |
|---|---|
| FIXED TO DISPLAY SECTION | PARAMETER GROUP OTHER THAN CAMERA PARAMETER CP |
| SETTABLE BY USER (CUSTOMIZED ALIGNMENT) | PARAMETER GROUP |

HEAD-MOUNTED DISPLAY DEVICE AND COMPUTER PROGRAM

BACKGROUND

1. Technical Field

The present invention relates to a technique of a head-mounted display device.

2. Related Art

Hitherto, there has been known a head-mounted display device (HMD) which is worn on a user's head. For example, JP-A-2005-38321 discloses a video see-through type HMD in which an imaging section capable of imaging an outside scene through a supporting section slides up and down with respect to the HMD.

SUMMARY

When an image display apparatus including an optical see-through type head-mounted display device includes a technique of displaying an image at a position of a specific object, imaged by a camera, so as to be superposed thereon with a high level of accuracy, it is possible to provide improved convenience with respect to an AR (augmented reality) function. However, when the display image is correctly superposed on the specific object imaged by the camera, it is preferable that a spatial relationship between the camera and an image display section is correctly obtained.

Furthermore, a variation may occur in camera parameters of the imaging section according to the manufacturing accuracy. In addition, a relative positional relationship between the image display sections and the imaging section that captures an image may not be uniform to cause a variation.

An advantage of some aspects of the invention is to solve at least apart of the problems described above, and the invention can be implemented as the following forms or application examples.

(1) According to an aspect of the invention, a head-mounted display device is provided. The head-mounted display device includes an image display section configured to transmit light from an outside scene and to display an image; an imaging section; a memory section configured to store data of a marker image; an image setting section configured to cause the image display section to display an image based at least on the data; and a parameter setting section. The parameter setting section derives at least one of a camera parameter of the imaging section and a spatial relationship, the spatial relationship being between the imaging section and the image display section, based at least on an image that is captured by the imaging section in a condition that allows a user to visually perceive that the marker image displayed by the image display section and a real marker corresponding to the marker image substantially align at least partially with each other. According to the head-mounted display device of this aspect, it is possible to simply set a position and an orientation of an AR image displayed in association with a position of a specific object, and the like, and to execute calibration with a higher level of accuracy.

(2) In the head-mounted display device of the aspect, the image setting section may cause the image display section to display an AR image so as to allow the user to visually perceive a condition that a position and pose of the AR image and those of the real marker correspond to each other, after the parameter setting section derives at least one of the camera parameters and the spatial relationship.

(3) In the head-mounted display device of the aspect, the memory section may store, as the data, a three-dimensional model that is a basis of the marker image. The image setting section may cause the image display section to display the three-dimensional model as the marker image. The parameter setting section may derive at least one of the camera parameters and the spatial relationship based at least on an image that is captured by the imaging section in a condition that allows the user to visually perceive that the marker image displayed by the image display section and the real marker having a three-dimensional shape corresponding to the three-dimensional model substantially align at least partially with each other.

(4) In the head-mounted display device of the aspect, the imaging section may be configured to be movable with respect to the image display section.

The invention can be implemented in various modes other than the head-mounted display device. For example, the invention can be implemented in modes such as an image display, a system including the image display, a computer program for implementing a method of controlling the image display and the system, a recording medium having the computer program recorded thereon, a data signal including the computer program and which is embodied within a carrier wave, or the like.

(5) An aspect of the invention provides a calibration method that allows a user to see an image displayed by an image display section being overlaid on an object in an outside scene, the image display section being capable of being transparent against the outside scene. The calibration method includes: a display step for displaying an image of a first marker through the image display section; an image acquisition step for acquiring a captured image of a second marker with an imaging section in a condition that the image of the first marker is substantially aligned with the second marker; and a derivation step for deriving data corresponding to a camera parameter of the imaging section based on the captured image. According to the method of this aspect, it is possible to optimize an unknown parameter relating to the imaging section, and to perform calibration using a value of the optimized parameter. As a result, it is possible to reduce shift of the camera parameter of the imaging section which may occur in a manufacturing process, and to overlay a display image on an outside scene.

(6) The calibration method according to the aspect of the invention may further include: a capture step for acquiring a captured image of the object with the imaging section; a detection step for detecting a relative positional relationship of the object with respect to the imaging section based on the derived data corresponding to the camera parameter; and an overlay display step for displaying an image displayed in the image display section so that at least one of a position, a size and an orientation of the image displayed in the image display section are aligned with the object based on at least the detected relative positional relationship. According to the method of this aspect, by using the derived camera parameter, it is possible to reliably align the image displayed in the image display section with the imaged object for visual recognition of a user.

(7) In the calibration method according to the aspect of the invention, the derivation step may include deriving data corresponding to a relative positional relationship between the imaging section and the image display section. According to the method of this aspect, since the data indicating the positional relationship between the imaging section that images an object and the image display section that displays an image to be viewed by a user is calculated, it is possible to allow the user to see an image that is aligned with the imaged object.

(8) In the calibration method according to the aspect of the invention, the display step may include a right display step for displaying the image of the first marker only on a right image display section that causes a right eye of the user to view the image and a left display step for displaying the image of the first marker only on a left image display section that causes a left eye of the user to view the image, and the image acquisition step may include a right image acquisition step for acquiring the captured image of the second marker after the right display step and a left image acquisition step for acquiring the captured image of the second marker after the left display step. According to the method of this aspect, since the calibration is performed using the first marker and the second marker corresponding to each of the right eye and the left eye of the user, it is possible to perform the calibration with high accuracy. Further, since the imaging of the second marker is performed in different views between the right eye and the left eye, when an image overlaid on an outside scene for display is a stereoscopic image, it is possible to allow a user to clearly view the image in a stereoscopic manner.

In the above-described configurations, all of the plural components are not essential. That is, in order to solve all or some of the above-mentioned problems, or in order to achieve all or some of effects disclosed in this description, modifications, omissions, replacements with new components, or partial omissions of restrictive contents may be appropriately performed with respect to some of the plural components. Further, in order to solve all or some of the above-mentioned problems, or in order to achieve all or some of effects disclosed in this description, all or some of technical features included in any one of the above-described configurations may be combined with all or some of technical features included in another one of the above-described configurations to form an independent configuration.

For example, an aspect of the invention may be implemented as a method including all or some of three components of the display step, the image acquisition step, and the derivation step. That is, this method may include the display step, or may not include the display step. Further, this method may include the image acquisition step, or may not include the image acquisition step. Furthermore, this method may include the derivation step, or may not include the derivation step. The display step may be a step for displaying the image of the first marker that is prepared in advance in the image display section, for example. The image acquisition step may be a step for acquiring the captured image of the second marker using the imaging section in a condition that the image of the first marker is aligned with the second marker, for example. The derivation step may be a step of deriving the data corresponding to the camera parameter of the imaging section based on the captured image, for example. Such a method may be implemented as a method for performing calibration, for example, and may also be implemented as an apparatus or the like other than the method. According to such a configuration, it is possible to solve at least one of various problems such as accuracy enhancement of the method, simplification of the method, and enhancement of convenience of a user who uses the method. All or some of the technical features of each method according to the above-described aspect of the invention may be applied to this method.

The invention may also be implemented as various forms other than methods. For example, the invention may be implemented as forms such as an image display apparatus, various apparatuses that execute the methods, a system including the various apparatuses, a computer program for implementing a control method and the system of the various apparatuses, a recording medium on which the computer program is recorded, or a data signal that includes the computer program and is implemented in a carrier wave.

(9) An aspect of the invention provides a head-mounted display device. The head-mounted display device includes an image display section that is capable of being transparent against an outside scene, and of displaying a predetermined two-dimensional marker image, an imaging section movable with respect to the image display section, and a processor, wherein the processor acquires a captured image of a real marker through the imaging section, in a condition that the marker image is displayed on the image display section and a user is allowed to see the marker image being overlaid on the real marker, and wherein the processor derives a spatial relationship between the image display section and the imaging section based at least on the captured image. According to the head-mounted display device, even when the imaging section moves relative to the image display section, it is possible to derive a spatial relationship between the captured object and the image display section. Therefore, the head-mounted display device can display the counterpart image which is correctly superimposed on the object.

(10) In the head-mounted display device of the above aspect, in the case where an object is captured by the imaging section, the processor may cause the image display section to display a counterpart image associated in advance with the captured object, using at least calculated the spatial relationship, in association with a position of the captured object. According to the head-mounted display device, it is possible to cause the image display section to display the counterpart image so as to correspond to the position of the object with a good degree of accuracy.

(11) In the head-mounted display device of the above aspect, in the case where the captured object is the real marker, the processor may cause the image display section to display the counterpart image in association with a position and pose of the real marker, and provide information for the user to determine whether a position and pose of the counterpart image substantially align with the position and pose of the real marker. According to the head-mounted display device, it is possible to cause the user to determine the success or failure of calibration.

(12) In the head-mounted display device of the above aspect, the image display section may display the marker image so that a spatial relationship between the real marker and the image display section substantially coincides with a predetermined spatial relationship in the case where the user visually perceives that the marker image and the real marker substantially align with each other, and wherein the processor may derives the spatial relationship based at least on the captured image and the predetermined spatial relationship. Not all of a plurality of components included in the respective aspects of the invention described above are essential. In order to solve some or all of the aforementioned problems, or to achieve some or all of the effects described in this specification, regarding some components of the plurality of components, it is possible to appropriately perform change, deletion, replacement with other new components, and deletion of a portion of limited contents. Further, in order to solve some or all of the aforementioned problems, or to achieve some or all of the effects described in this specification, some or all of the technical features included in the aspect of the invention described above can also be combined with some or all of the technical features included in other aspects of the invention, to thereby form an independent aspect of the invention.

For example, an aspect of the invention can be implemented as a device including some or all of elements out of three elements of the image display section, the imaging section, and the processor. That is, this device may or may not include the image display section. In addition, the device may or may not include the imaging section. In addition, the device may or may not include the processor. The image display section may, for example, be capable of being transparent against the outside scene and of displaying the two-dimensional marker image which is set in advance. The imaging section may, for example, be movable with respect to the image display section.

In a condition that the marker image is displayed through the image display section and an real marker is included in an outside scene captured by the imaging section, the processor may, for example, acquire a captured image by capturing the real marker through the imaging section in a condition that a user is allowed to visually perceive that the marker image is overlaid on the real marker, and derive a spatial relationship between the image display section and the imaging section based at least on the captured image. Such a device can be implemented as, for example, a head-mounted display device, but can also be implemented as devices other than the head-mounted display device. According to such an aspect, it is possible to solve at least one of various problems such as an improvement and simplification in the accuracy of the device, an improvement in the convenience of a user who employs the device, and the like. Some or all of the technical features of each aspect of the device described above can be applied to this device entirely.

The invention can also be implemented in various forms other than a method. For example, the invention can be implemented in forms of an image display device, various types of device performing a method thereof, a system having various types of device, a computer program for implementing a system and a method of controlling various types of device, a recording medium having the computer program recorded thereon, a data signal embodied within carrier waves inclusive of the computer program, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

In this specification, a description will be given in order according to the following items.
A. First embodiment
A-1. Configuration of image display device
A-2. Calibration execution process
B. Modification examples
C. Second embodiment:
C-1. Configuration of Image Display Device:
C-2. Calibration Execution Process:
C-3. Spatial Parameter and Camera Parameter:
C-3-1. Camera Parameter
C-3-2. Spatial Parameter
D. Modification Examples
E. Third embodiment:
E-1. Configuration of Head-mounted display device:
E-2. Calibration Execution Process:
E-2-1. First Setting Mode:
E-2-2. Setting of Parameters:
E-2-2-1. With Regard to Camera Parameter:
E-2-2-2. With Regard to Transformation parameter:
E-2-2-3. Parameter Derivation Process:
E-2-2-4. Automatic Collection of Calibration Data:
E-2-3. Second Setting Mode:
F. Fourth embodiment:
G. Fifth embodiment:
H. Modification Examples:

A. First Embodiment

Figure 1:
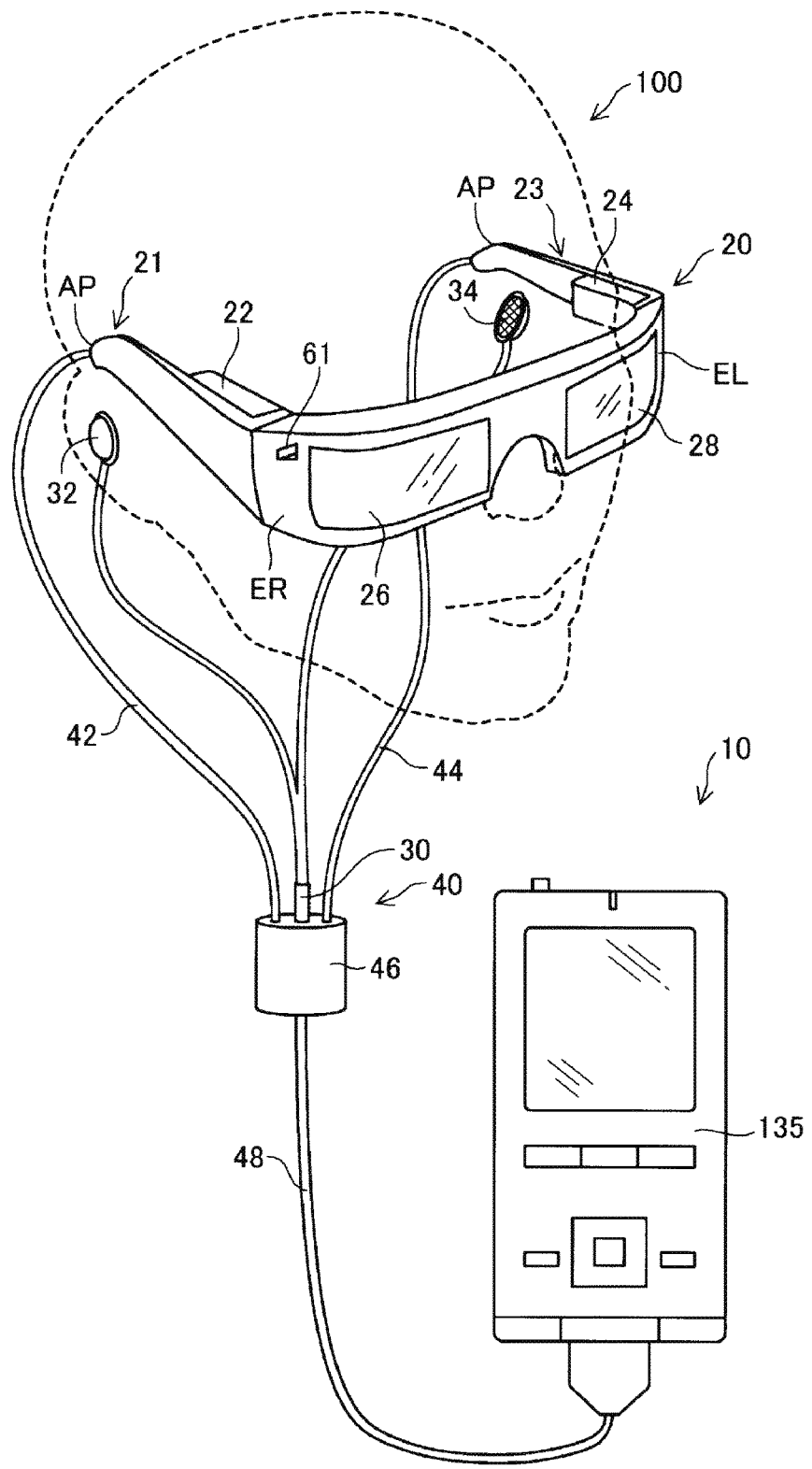
FIG. 1 is a diagram illustrating a configuration of an external appearance of a head-mounted display (HMD) that performs calibration.

FIG. 1 is a diagram illustrating a configuration of an external appearance of a head-mounted display device 100 (HMD 100) that performs calibration. The HMD 100 causes a user to see an image displayed by an image display section 20, and also, may cause the user to see an outside scene transmitted through the image display section 20. The HMD 100 of the embodiment includes image display sections corresponding to a right eye and a left eye of the user who wears the image display section 20, and causes the right eye and the left eye of the user to see separate images, and a detailed configuration thereof will be described later.

The HMD 100 includes the image display section 20 that displays an image, and a control section 10 (controller 10) that controls the image display section 20. The image display section 20 is a mounting body mounted in a head portion of the user, and has a shape of glasses. The image display section 20 includes a right holder 21, a right display driver 22, a left holder 23, a left display driver 24, a right optical image display section 26, a left optical image display section 28, and a camera 61. The right optical image display section 26 and the left optical image display section 28 are disposed to be respectively positioned in front of the right and left eyes of the user when the user wears the image display section 20. An end of the right optical image display section 26 and an end of the left optical image display section 28 are connected to each other at a position corresponding to an area between the eyebrows when the user wears the image display section 20.

The right holder 21 is a member that extends from an end portion ER which is the other end of the right optical image display section 26 to a position corresponding to a side head portion of the user when the user wears the image display section 20. Similarly, the left holder 23 is a member that extends from an end portion EL which is the other end of the left optical image display section 28 to a position corresponding to a side head portion of the user when the user wears the image display section 20. The right display driver 22 and the left display driver 24 are disposed on sides that face the head portion of the user when the user wears the image display section 20.

The display drivers 22 and 24 include liquid crystal displays 241, 242 (hereinafter, referred to "LCDs 241 and 242") which will be described in FIG. 2, projection optical systems 251 and 252, and the like. A detailed configuration of the display drivers 22 and 24 will be described later. The optical image displays 26 and 28 include light guide plates 261 and 262 to be described later (see FIG. 2) and a light adjusting plate. The light guide plates 261 and 262 are formed of a light transmitting resin material or the like, and guide image light output from the display drivers 22 and 24 to the eyes of the user. The light adjusting plate is a thin plate shaped optical element, and is disposed to cover a front side of the image display section 20 which is a side opposite to the eyes of the user. By adjusting a light transmittance of the light adjusting plate, it is possible to adjust the amount of external light incident to the eyes of the user, to thereby adjust the ease of visual recognition of a virtual image.

The camera 61 is disposed in an upper portion of the end portion ER of the right optical image display section 26. In a state where the user wears the image display section 20 in the head portion, the camera 61 captures an outside scene in a gaze orientation of the user to acquire a captured image. The camera 61 may change its orientation with respect to the image display section 20 to change an imaging range. Further, the camera 61 images a range that varies according to zooming on an optical axis. Although details will be described, calibration is performed by performing imaging by the camera 61 so that a calibration image displayed in the right optical image display section 26 or the left optical image display section 28 and a marker included in the outside scene are overlaid.

The image display section 20 further includes a connector 40 for connecting the image display section 20 to the control section 10. The connector 40 includes a main body cord 48 connected to the control section 10, a right cord 42, a left cord 44, and a connecting member 46. The right cord 42 and the left cord 44 are two cords that are branched from the main body cord 48. The right cord 42 is inserted in a housing of the right holder 21 through a tip portion AP of the right holder 21 in an extension direction thereof, and is connected to the right display driver 22. Similarly, the left cord 44 is inserted in a housing of the left holder 23 through a tip portion AP of the left holder 23 in an extension direction thereof, and is connected to the left display driver 24. The connecting member 46 is provided at a branch point between the main body cord 48, and the right cord 42 and the left cord 44, and includes a jack for connecting an earphone plug 30. A right earphone 32 and a left earphone 34 extend from the earphone plug 30. The image display section 20 and the control section perform transmission of various signals through the connector 40. The right cord 42, the left cord 44, and the main body cord 48 may employ a metal cable or an optical fiber, for example.

The control section 10 is a device for controlling the HMD 100. The control section 10 includes an operating section 135 that includes an electrostatic track pad, plural press buttons, or the like.

Figure 2:
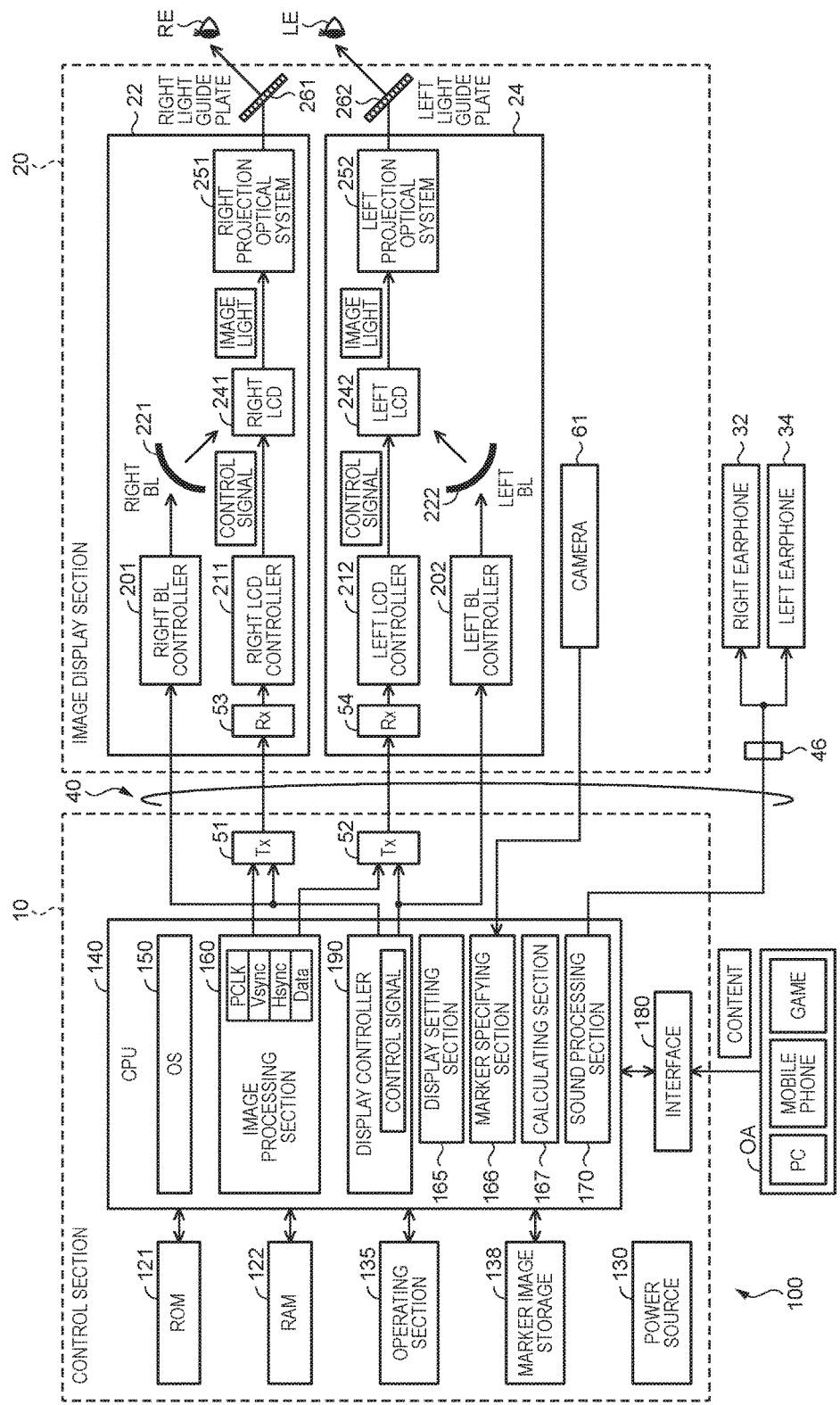
FIG. 2 is a block diagram functionally illustrating a configuration of the HMD.

FIG. 2 is a block diagram functionally illustrating a configuration of the HMD 100. As shown in FIG. 2, the control section 10 includes a ROM 121, a RAM 122, a power source 130, the operating section 135, a marker image storage 138, a CPU 140, an interface 180, a transmitter 51 (Tx 51), and a transmitter 52 (Tx 52).

The power source 130 supplies power to respective sections of the HMD 100. The ROM 121 stores various computer programs. The CPU 140 (which will be described later) develops the various computer programs stored in the ROM 121 into the RAM 122 to execute the various computer programs.

The marker image storage 138 stores a marker image IMG of model marker data and/or a marker MK1 which is a calibration image displayed in the right optical image display section 26 or the left optical image display section 28. The marker image storage 138 stores a marker image displayed in the right optical image display section 26 and a marker image displayed in the left optical image display section 28 as the same marker image IMG. The marker image IMG is acquired by projecting a model marker (2D) represented in a three-dimensional model space (3D computer graphic space) based on a projection parameter of each of the right optical image display section 26 and the left optical image display section 28.

Figure 3:
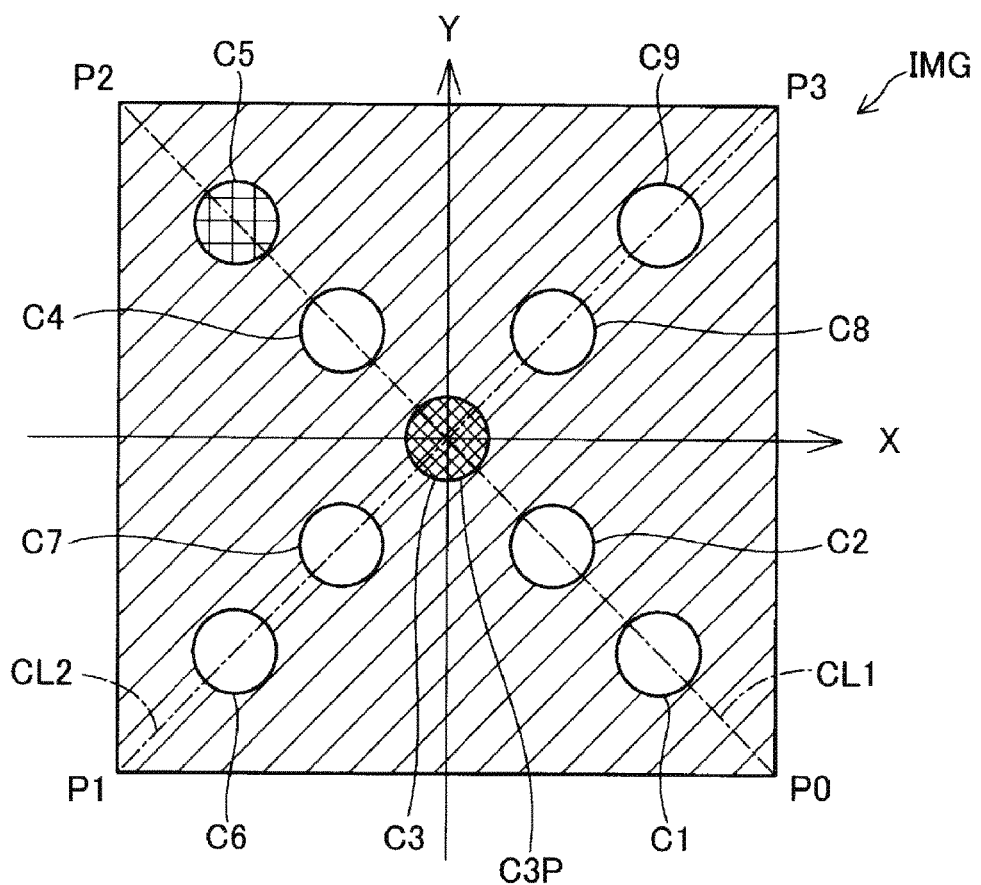
FIG. 3 is a diagram illustrating an example of a marker image displayed in an image display section.

FIG. 3 is a diagram illustrating an example of the marker image IMG displayed in the image display section 20. As shown in FIG. 3, the marker image IMG includes nine circles in a square formed by connecting four apexes P0, P1, P2, and P3 by straight lines. Five circles among the nine circles are arranged so that the centers thereof are present on a diagonal line CL1 formed by connecting the apex P0 and the apex P2. The five circles correspond to circles C1, C2, C3, C4, and C5 arranged along the diagonal line CL1 from a side close to the apex P0. Similarly, the five circles among the nine circles are arranged so that the centers thereof are present on a diagonal line CL2 formed by connecting the apex P1 and the apex P3. The five circles correspond to circles C6, C7, C3, C8, and C9 arranged along the diagonal line CL2 from a side close to the apex P1. The circle C3 is a circle whose center corresponds to a point which is an intersection point of the diagonal line CL1 and the diagonal line CL2 and is the center of gravity of the square. In this embodiment, distances between the centers of adjacent circles in the five circles having their centers on the diagonal line CL1 are set to be the same. Similarly, distances between the centers of adjacent circles in the five circles having their centers on the diagonal line CL2 are set to be the same. Further, the distances between the centers of adjacent circles having their centers on the diagonal line CL1 and the distances between the centers of adjacent circles having their centers on the diagonal line CL2 are the same. The sizes of nine circles are the same. The diagonal line CL1 and the diagonal line CL2 are straight lines that are shown in FIG. 3 for ease of description and are not included in the marker image IMG. As described later, upon detecting the actual object marker RL in the image frames captured by the camera 61, a marker specifying section 166 performs scanning along the diagonals, and performs profile determination on, for example, the binarized white and black colors in the image frames. In the present embodiment, the marker specifying section 166 determines a difference between the profile of the gradation value along the diagonals of a candidate of the marker area and the profile of the gradation values along the diagonals CL1 and CL2 stored in the marker image storage 138, so as to detect the actual object marker ML in the image frames. According to the present embodiment, by using the actual object marker RL having the circles described above, a decrease in time required to detect the actual object marker RL in the image frames is realized.

In FIG. 3, a color difference is expressed by a change of hatching. Accordingly, as shown in FIG. 3, four colors, that is, a yellow color in the circle C3, a green color in the circle C5, a white color in seven circles C1, C2, C4, C6, C7, C8, and C9 different from the circles C3 and C5, and a black color in a portion that is included in the square and does not include nine circles are present in the marker image IMG. Further, in FIG. 3, an X-axis and a Y-axis are shown, in which a center C3P of the circle C3 is the origin. In a calibration execution process (which will be described later), various coordinate values are specified using the center C3P as the origin. The colors of the circle C3 and the circle C5 are set differently from the other seven circles among the nine circles included in the marker image IMG in order to distinguish the circle C3 which is a central circle and the circle C5 for specifying the orientation of the imaged actual object marker MK1. Moreover, according to the present embodiment, the reproducibility when the centers of circles are detected may be double the reproducibility when corners or points of angles are detected. From this regard, by using the actual object marker RL having the circles described above, the locations of feature elements are detected accurately as centers of circles in the image frames.

The CPU 140 shown in FIG. 2 develops a computer program stored in the ROM 121 into the RAM 122 to function as the operating system 150 (OS 150), a display controller 190, a sound processing section 170, an image processing section 160, a display setting section 165, a marker specifying section 166, and a calculating section 167.

The display control section 190 generates control signals for controlling the right display driver 22 and the left display driver 24. The display controller 190 controls generation and emission of image light due to the respective right display driver 22 and the left display driver 24. The display controller 190 transmits respective control signals with respect to a right LCD controller 211 and a left LCD controller 212 through the transmitters 51 and 52. Further, the display controller 190 transmits respective control signals with respect to a right backlight controller 201 and a left backlight controller 202.

The image processing section 160 acquires image signals included in contents, and transmits the acquired image signals to receivers 53 and 54 of the image display section 20 through the transmitters 51 and 52. The sound processing section 170 acquires sound signals included in the contents, amplifies the acquired sound signals, and supplies the amplified sound signals to a speaker (not shown) in the right earphone 32 and a speaker (not shown) in the left earphone 34 that are connected to the connecting member 46.

The display setting section 165 displays the image of the marker MK1 stored in the marker image storage 138 in the right optical image display section 26 or the left optical image display section 28. The display setting section 165 controls a case where the marker image IMG is displayed in the right optical image display section 26 and a case where the marker image IMG is displayed in the left optical image display section 28 based on an operation received through the operating section 135 when executing calibration.

The marker specifying section 166 specifies an actual object marker RL of the marker MK1 disposed on a rear surface (surface opposite to the operating section 135) of the control section 10, a predetermined wall, or the like, from a captured image acquired by the camera 61. A specific process for specifying the actual object marker RL will be described later, but the marker specifying section 166 specifies the actual object marker RL from the captured image by extracting four apexes of the actual object marker RL, central coordinate values of the nine circles, colors of the nine circles, and the like. The marker specifying section 166 binarizes grayscale values of colors of the captured image to extract nine circles having different colors in the marker MK1, for example. The marker image IMG corresponds to an image of a first marker in the SUMMARY, and the actual object marker RL corresponds to a second marker.

The calculating section 167 optimizes parameters relating to the camera 61 based on coordinate values of the actual object marker RL specified by the marker specifying section 166, and coordinate values of pixels corresponding to the marker image IMG displayed in the right optical image display section 26 or the left optical image display section 28. The optimization of the parameters relating to the camera 61 is performed by optimizing a parameter relating to a focal distance of the camera 61 which is unknown and a parameter including a main point position (for example, central coordinates of a captured image) or the like using the acquired coordinate values. If an object is imaged using the camera parameters derived by the optimization to acquire a captured image, a position of the object in the captured image, and a display position on the image display section that is overlaid with the object when seen from a user are associated with each other. As a result, the user can view an augmented reality (AR) image so that at least one of its position, size, and pose is aligned with the object through the image display section 20. Details of the optimization of the parameters of the camera 61 will be described later.

The interface 180 is an interface for connecting various external devices OA which become supply sources of contents to the control section 10. For example, the external devices OA may include a storage device that stores an AR scenario, a personal computer (PC), a mobile phone terminal, a game terminal, and the like. For example, as the interface 180, a USB interface, a micro USB interface, a memory card interface, or the like may be used.

As shown in FIG. 2, the image display section 20 includes the right display driver 22, the left display driver 24, the right light guide plate 261 which is the right optical image display section 26, the left light guide plate 262 which is the left optical image display section 28, and the camera 61.

The right display driver 22 includes the receiver 53 (Rx 53), the right backlight controller 201 (right BL controller 201) and a right backlight 221 (right BL 221) that function as a light source, and the right LCD controller 211 and a right LCD 241 that function as a display device, and the right projection optical system 251. The right backlight controller 201 and the right backlight 221 function as the light source. The right LCD controller 211 and the right LCD 241 function as the display device.

The receiver 53 functions as a receiver for serial transmission between the control section 10 and the image display section 20. The right backlight controller 201 drives the right backlight 221 based on an input control signal. The right backlight 221 is a light emitting body using an LED, an electroluminescence (EL), or the like, for example. The right LCD controller 211 drives the right LCD 241 based on control signals transmitted from the image processing section 160 and the display controller 190. The right LCD 241 is a transmission type liquid crystal panel in which plural pixels are arranged in a matrix form.

The right projection optical system 251 is configured by a collimator lens that collimates image light emitted from the right LCD 241 into a parallel luminous flux. The right light guide plate 261 which is the right optical image display section 26 guides image light output from the right projection optical system 251 to the right eye RE of the user while reflecting the image light along a predetermined light path. Since the left display driver 24 has the same configuration as that of the right display driver 22 and corresponds to the left eye LE of the user, description thereof will not be repeated.

A-2. Calibration Execution Process

Figure 4:
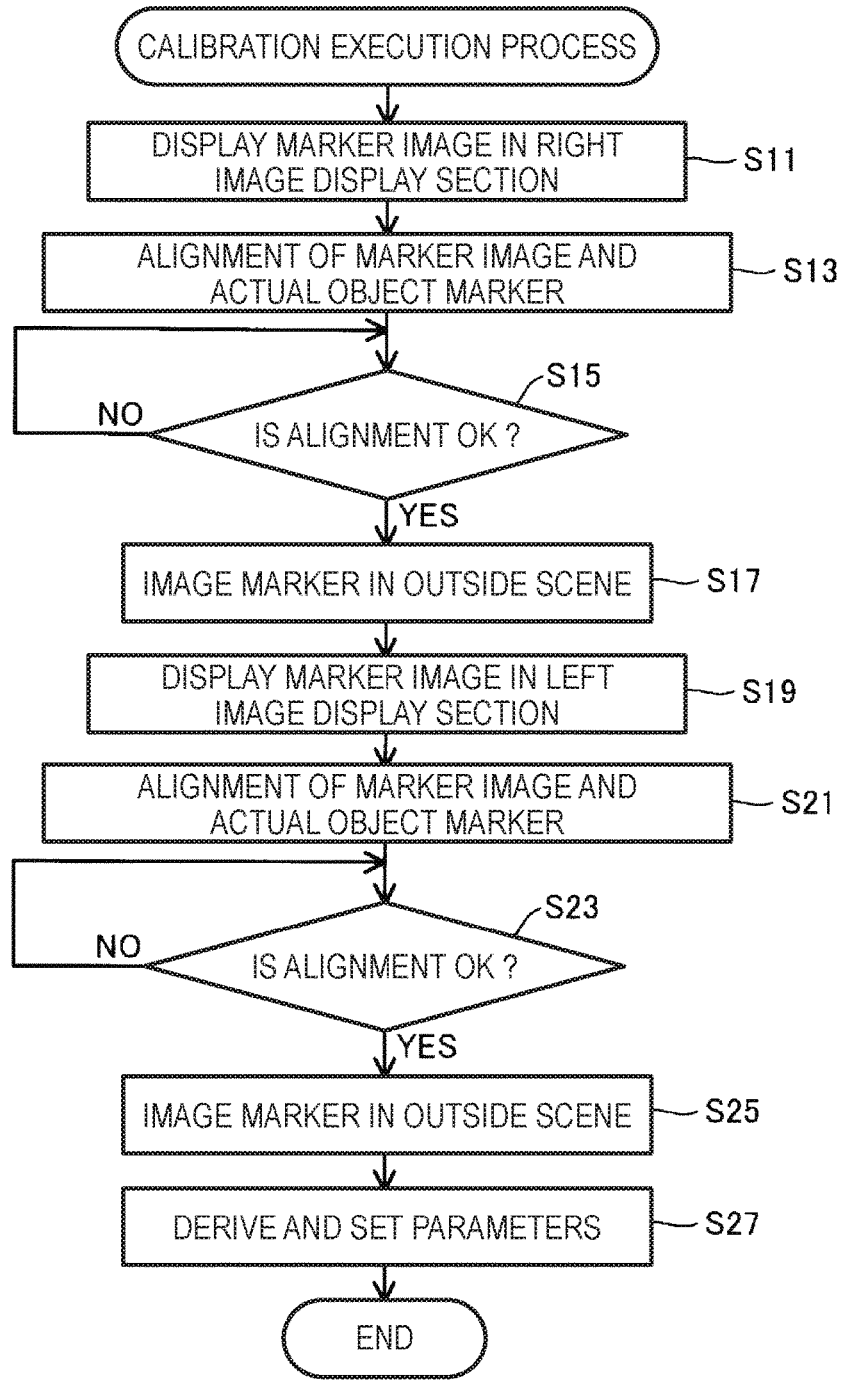
FIG. 4 is a flowchart of a calibration execution process according to an embodiment of the invention.

FIG. 4 is a flowchart of a calibration execution process according to an embodiment of the invention. The calibration execution process is a process that the CPU 140 performs imaging in a condition that the marker image IMG displayed in the right optical image display section 26 or the left optical image display section 28 and the actual object marker RL specified from the outside scene are overlaid, and optimizes parameters of the camera 61 for performing calibration using image locations of the features on the marker image IMG and those of the same features on the actual object marker RL.

In the calibration execution process, first, the display setting section 165 displays the marker image IMG only in the right optical image display section 26 which is the right image display section corresponding to the right eye of the user (step S11).

Figure 5:
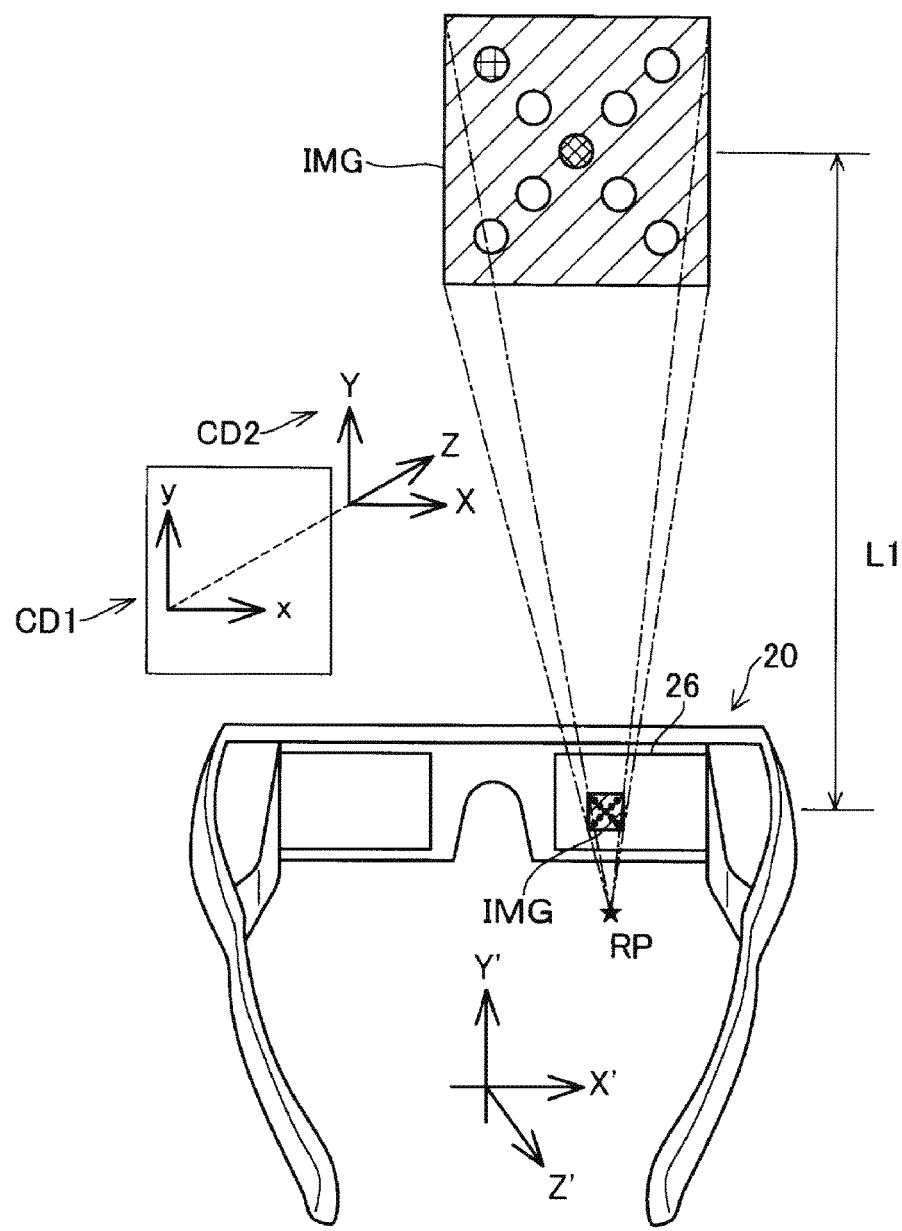
FIG. 5 is a diagram schematically illustrating a state where a marker image is displayed only in a right optical image display section.

FIG. 5 is a diagram schematically illustrating a state where the marker image IMG is displayed only in the right optical image display section 26. FIG. 5 schematically shows a case where a user views the marker image IMG displayed in the right optical image display section 26 from a right eye position RP which is set as a virtual position of the right eye of the user who wears the image display section 20. Further, in FIG. 5, a coordinate axis CD2 indicating a coordinate axis of a three-dimensional space to be imaged and a coordinate axis CD1 indicating a coordinate axis of a two-dimensional image imaged are shown. The user views the marker image IMG displayed in the right optical image display section 26 as a marker MK1 that is present at a position spaced from the image display section 20 by a distance L1.

After the process of step S11 in FIG. 4 is performed, the marker specifying section 166 urges the user to perform alignment so that the marker image IMG displayed in the right optical image display section 26 and the actual object marker RL that is present in the outside scene are overlaid (step S13).

Figure 6:
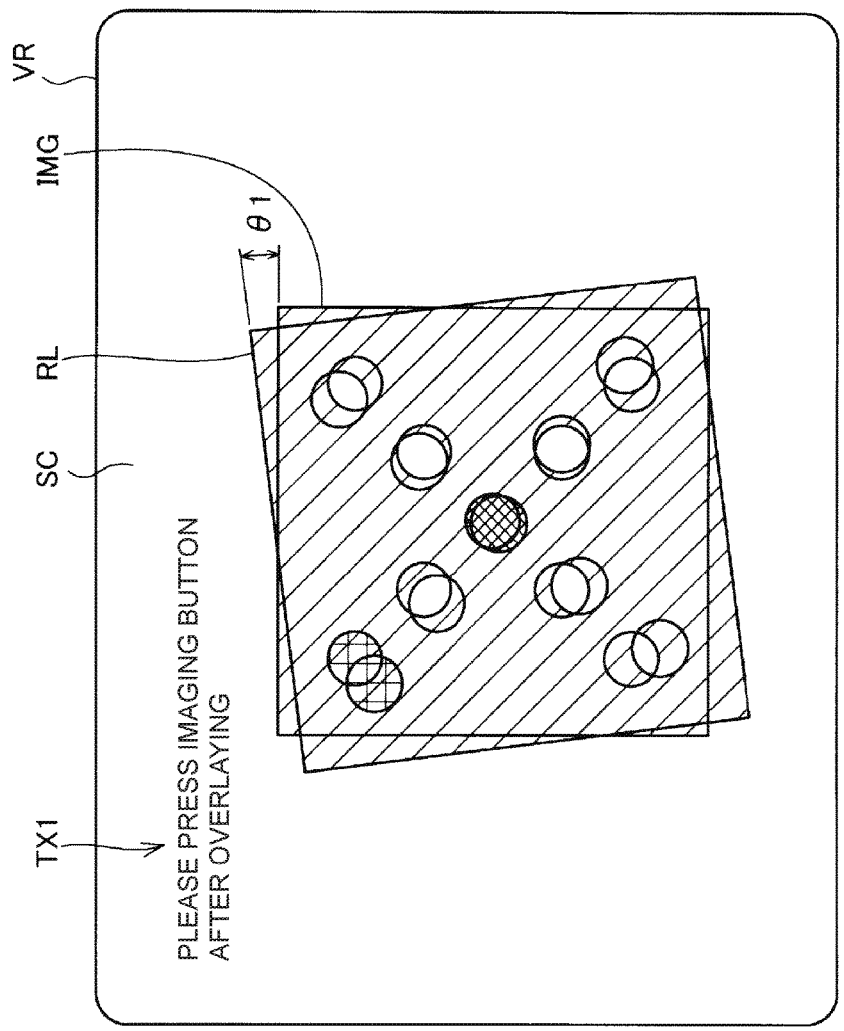
FIG. 6 is a diagram illustrating the relationship between a marker image displayed in the right optical image display section and an imaged actual object marker.

FIG. 6 shows the actual object marker RL included in an outside scene SC, and the marker image IMG and a character image TX1 displayed in the right optical image display section 26. The character image TX1 is an image of characters for promoting the user to perform imaging after the alignment of the marker image IMG and the actual object marker RL. Specifically, the character image TX1 is an image of characters indicating "Please, press imaging button after overlaying". As shown in FIG. 6, the center of the marker image IMG and the center of the actual object marker RL are not aligned. Further, in the example shown in FIG. 6, the actual object marker RL is inclined with respect to the marker image IMG by an angle θ1. In this case, the user who wears the image display section 20 changes the position or orientation of the user, to thereby overlay the marker image IMG on the actual object marker RL.

After the process of step S13 in FIG. 4 is performed, the marker specifying section 166 determines whether the alignment of the marker image IMG and the actual object marker RL is completed (step S15). As shown in the character image TX1 in FIG. 6, the marker specifying section 166 determines whether the alignment is completed according to the presence or absence of a pressing operation of the imaging button from the user. As the imaging button, any button which is set in advance in the operating section 135 may be used, and various modifications may be used.

If the pressing operation of the imaging button is not present and it is determined that the alignment is not completed (step S15: NO), the marker specifying section 166 continuously waits for the pressing operation of the imaging button indicating that the alignment is completed. If the pressing operation of the imaging button is present, the marker specifying section 166 determines that the alignment is completed (step S15: YES), and images the outside scene SC by the camera 61 (step S17).

Then, the display setting section 165 sets the marker image IMG displayed only in the right optical image display section 26 to non-display, and displays the marker image IMG only in the left optical image display section 28 (step S19). Then, similar to the process corresponding to the right eye RE of the user from step S13 to step S17, the marker specifying section 166 urges the user to perform the alignment so that the marker image IMG and the actual object marker RL are overlaid with respect to the left eye LE of the user (step S21).

After urging the user to perform the alignment with reference to a virtual left eye position LP, the marker specifying section 166 determines whether the alignment of the marker image IMG and the actual object marker RL is completed (step S23). If the pressing operation of the imaging button from the user is not present, and it is determined that the alignment is not completed (step S23: NO), the marker specifying section 166 continuously waits for the pressing operation of the imaging button indicating that the alignment is completed. If the pressing operation of the imaging button is present, the marker specifying section 166 determines that the alignment is completed (step S23: YES), and images the outside scene SC by the camera 61 (step S25). Then, the calculating section 167 optimizes the parameters of the camera 61 and camera-to-display parameters as unknown values on the basis of the captured image with reference to the right eye position RP and the left eye position LP (step S30).

There are four parameters ($f_x$, $f_y$, $C_x$, $C_y$) as the camera parameter CP relating to the camera 61. ($f_x$, $f_y$) represent a focal distance of the imaging section, and are converted into the number of pixels based on a pixel density.

The camera parameter CP may be known from a product specification of the camera 61 that forms a main portion of the imaging section (hereinafter, such camera parameters may be referred to as default camera parameters). Here, camera parameters of an actual camera may be greatly deviated from the default camera parameters. Further, even in the cameras having the same specification, the camera parameters may vary (may not be aligned) between cameras.

When the user views an AR object so that at least one of a position, a size, and a pose in the AR object is aligned (overlaid) with an actual object, the camera 61 functions as a detector that detects the position and pose of the actual object. Here, the calculating section 167 estimates the position and pose of the actual object captured by the camera 61 with respect to the camera 61 using the camera parameters. The calculating section 167 converts the estimated position and pose into the position and pose of the actual object with respect to the left optical image display section 28 using a relative positional relationship between the camera 61 and the left optical image display section 28 (right optical image display section 26). Further, the calculating section 167 determines the position and pose of the AR object based on the converted position and pose. The image processing section 160 maps (converts) the AR object having the position and pose onto a display coordinate system using projection parameters, and writes the result in a display buffer (for example, the RAM 122). Further, the image controller displays the AR object written in the display buffer in the left image display section 28. Thus, when the camera parameters are the default camera parameters, an error is included in the estimated position and pose of the actual object. Then, due to the error of the estimated position and pose, the user views the AR object as if there is an error in the overlaying of the displayed AR object and the actual object.

Thus, in this embodiment, when performing calibration for allowing the user to see the AR object so that the AR object is overlaid on an object, the camera parameters are derived through optimization. Further, the derived camera parameters are used to detect (estimate) the position and pose of the object. Then, when the AR object is displayed, a degree of shift generated between the displayed AR object and the actual object is viewed to the user is reduced. As described later, even though the same user uses the same HMD 100, it is preferable that the derivation of the camera parameters is performed whenever the calibration is performed in order for subsequent display in which at least one of the positions, sizes, and orientations between the object and the AR object are aligned each other. This is from that the user does not always align the actual object marker RL and the marker image IMG corresponding to the actual object marker RL with the same accuracy. Even though the user performs the alignment with different accuracies, since camera parameters corresponding thereto are derived, it is possible to suppress increase in shift of the overlay display when the overlay display of the AR object is performed.

A relative positional relationship (at least one of rotations and translations) between a coordinate system fixed in the camera 61 and a coordinate system fixed in the left optical image display section 28 may be known from a design specification of the HMD 100 (hereinafter, may be referred to as a default relative positional relationship). However, in reality, a rotational and/or translational shift may exist between the coordinate systems due to assembly errors which are caused when the camera 61 is attached to the image display section 20 and when the display is assembled in the HMD frame. Further, even in the HMDs 100 of the same specification, there is a variation in the rotational and/or translational shift between the coordinate systems between the HMDs 100. The rotational and translational shift may occur similarly between the camera 61 and the left optical image display section 28. Moreover, the two displays on HMD have a fixed translation shift. Users whose IPDs are the same as this shift will see the two displays straightly in front of his two eyes. However, for users with different IPDs, the displays are seen by their eyes with angle. It produces similar effect as if the camera 61 and the display section 26/28 had a rotational shift about the Y axis of the display coordinate.

As understood from the description about the default camera parameters, when allowing the user to see the AR object so that at least one of the position, size and pose of the AR object is aligned (overlaid) with those of the actual object, displaying the AR object based on the default relative positional relationship causes an error to be viewed in the overlay of the displayed AR object and the actual object.

Thus, in this embodiment, when performing calibration for allowing the user to see the AR object so that the AR object is overlaid on the actual object, parameters indicating rotation between the coordinate system of the camera 61 and the coordinate system of the right optical image display section 26 and the coordinate system of the left optical image display section 28 are derived through optimization. As a result, if the AR object is displayed using the derived parameters, a degree that the shift is viewed to the user is reduced.

As shown in FIG. 5, when the user views the marker image IMG displayed in the left optical image display section 28 and the actual object marker RL that is included in an outside scene and is positioned on a front side so that their positions, sizes, and orientations are aligned (hereinafter, may be referred to as "when the user establishes alignment by the left eye"), the relationship of the following Expression (1) is established between the coordinate systems. Hereinafter, a case where the marker image IMG is displayed in the left optical image display section 28 will be described.

$$CP \times [R_{o2dl}, t_{o2dl}] \times ModelMatrix = \qquad (1)$$
$$CP \times [R_{cam2left}, t_{cam2left}] \times [R_{obj2cam}, t_{obj2cam}] \times ModelMatrix$$

Here, CP on the left side and CP on the right side represent camera parameters of the camera 61. $[R_{o2dl}, t_{o2dl}]$ represents a transformation matrix from the coordinate system fixed to the actual object (in this case, the actual object marker RL) to the coordinate system fixed to the left optical image display section 28. Here, $[R_{o2dl}]$ represents a matrix of 3×3 indicating rotation, and $[t_{o2dl}]$ represents a matrix of 3×1 indicating translation. Here, ModelMatrix represents a matrix of 3×1 indicating an arbitrary one point on a model marker. The model marker is three-dimensional data (three-dimensional model: here, a plane in this embodiment) which is a basis when a marker image is displayed in the optical image display section 28. Notation of $[R_{o2dl}, t_{o2dl}] \times$ ModelMatrix is based on the rule of the following Expression (2).

$$[R_{o2dl}, t_{o2dl}] \times ModelMatrix = [R_{o2dl}] \times ModelMatrix + [t_{o2dl}] \qquad (2)$$

The notation rule of Expression (2) is also applied to the other parts of Expression (1).

$[R_{cam2left}, t_{cam2left}]$ on the right side in Expression (1) represents transformation matrixes from the coordinate system of the camera 61 to the coordinate system of the left optical image display section 28. $[R_{obj2cam}, t_{obj2cam}]$ on the right side in Expression (1) is transformation matrixes from the coordinate system of the actual object (actual object marker RL) to the coordinate system of the camera 61.

When the alignment of the marker image IMG and the actual object marker RL is established with respect to the left image display section 28, from the relationship of Expression (1) the following Expressions (3) and (4) are established.

$$R_{obj2cam} = inv(R_{cam2left}) * R_{o2dl} \qquad (3)$$

$$t_{obj2cam} = inv(R_{cam2left}) * (t_{o2dl} - t_{cam2left}) \qquad (4)$$

When it is assumed that the alignment of the left eye LE is established, if the pose of the actual object marker RL with respect to the camera 61 is applied to the model marker, an arbitrary point on the model marker transformed into the coordinate system of the camera 61 is expressed as $P_{cl}(X_{cl}, Y_{cl}, Z_{cl})$ in the following Expression (5).

$$P_{cl} = \begin{bmatrix} X_{cl} \\ Y_{cl} \\ Z_{cl} \end{bmatrix} \qquad (5)$$
$$= R_{obj2cam} \times ModelMatrix + t_{obj2cam}$$

If $R_{obj2cam}$, $t_{obj2cam}$ are deleted using Expression (3) and Expression (4), Expression (5) becomes the following Expression (6).

$$P_{cl} = \begin{bmatrix} X_{cl} \\ Y_{cl} \\ Z_{cl} \end{bmatrix} \qquad (6)$$
$$= inv(R_{cam2left})(R_{o2dl} \times ModelMatrix + t_{o2dl} - t_{cam2left})$$

On the right side in Expression (6), $R_{o2dl}$ and $t_{o2dl}$ represent rotations and translations from the coordinate system of the actual object marker RL to the coordinate system of the left optical image display section 28. In this embodiment, $R_{o2dl}$ and $t_{o2dl}$ are fixedly displayed at a predetermined position (for example, at the center) on the left optical image display section 28 with a predetermined orientation and a predetermined size so that predetermined rotations and translations are realized when the user aligns the marker image IMG displayed in the left optical image display section 28 with the actual object marker RL. $T_{cam2left}$ represents translation from the coordinate system of the camera to the coordinate system of the left optical image display section 28, and can use a known value from the specification of the HMD 100. In this embodiment, $R_{o2dl}$, $t_{o2dl}$, and $t_{cam2left}$ are expressed as follows.

$$R_{o2dl} = \begin{bmatrix} 1 & 0 & 0 \\ 0 & 1 & 0 \\ 0 & 0 & 1 \end{bmatrix} \qquad (7)$$

$$t_{o2dl} = \begin{bmatrix} 0 \\ 0 \\ -a \end{bmatrix} \qquad (8)$$

$$t_{cam2left} = \begin{bmatrix} D1 \\ D2 \\ D3 \end{bmatrix} \qquad (9)$$

Here, a (=L1), D1, D2, and D3 in Expressions (7), (8), and (9) are constants.

When the model marker expressed by Expression (5) is projected (mapped) onto a captured image of the camera 61, coordinates of the model marker on the captured image are as follows.

$$x_{iml} = F_x \frac{X_{cl}}{Z_{cl}} + C_x \qquad (10)$$

$$y_{iml} = F_y \frac{Y_{cl}}{Z_{cl}} + C_y \qquad (11)$$

Here, $(F_x, F_y)$ represent a focal distance of the camera 61, and $(C_x, C_y)$ represent position coordinates of the principal point of the camera 61.

Coordinates of feature elements of the marker on the captured image when the camera 61 actually images the actual object marker RL are expressed as $(u_i, v_i)$, a difference between $(u_i, v_i)$ and $(x_{iml}, y_{iml})$ is as follows.

$$e_i = \begin{bmatrix} e_x \\ e_y \end{bmatrix} = \begin{bmatrix} u_{li} - x_{imli} \\ v_{li} - y_{imli} \end{bmatrix}, \qquad (12)$$
$$i = 1 \sim 9$$

A subscript $i$ in Expression (12) represents an integer indicating the feature element in the marker, which uses a value of 1 to 9. A sum of squares is derived with respect to the alignment of the left eye LE.

$$E_L = \Sigma_{i=1}^{9}((u_{li} - x_{imli})^2 + (v_{li} - y_{imli})^2) \qquad (13)$$

In a case where the user aligns the marker displayed in the right optical image display section 26 by the right eye RE and the actual object marker RL, similarly, the sum of squares is derived.

$$E_R = \Sigma_{i=1}^{9}((u_{ri} - x_{imri})^2 + (v_{li} - y_{imri})^2 \qquad (14)$$

A cost function E is defined by the sum of $E_R$ and $E_L$.

$$E = E_R + E_L \qquad (15)$$

Parameters by which E becomes a minimum value (global minimum) is obtained by optimization calculation that includes iterative calculations.

In this embodiment, a rotation ($R_{cam2left}$) from the coordinate system of the camera 61 to the coordinate system of the left optical image display section 28, a rotation ($R_{cam2right}$) from the coordinate system of the camera 61 to the coordinate system of the right optical image display section 26, and camera parameters of the camera 61 are used as variables for optimization. In the optimization, design values may be used as initial values. As described later, in another embodiment, $R_{cam2left}$ and $R_{cam2right}$ may be fixed to the design values or the like, and only the camera parameters may be used for optimization.

In this embodiment, six rotations that form $R_{cam2left}$ and $R_{cam2right}$ are expressed with quaternions q, and parameters (variables) p to be optimized are expressed as follows.

$$p = [q_{l1}, q_{l2}, q_{l3}, q_{l4}, q_{r1}, q_{r2}, q_{r3}, q_{r4}, F_x, F_y, C_x, C_y] \qquad (16)$$

That is, in this embodiment, 12 parameters p in Expression (16) are derived by optimization. Here, the following expressions are considered.

$$\hat{q}_l = q_{l1} + q_{l2}i + q_{l3}j + q_{l4}k \qquad (17)$$

$$\hat{q}_r = q_{r1} + q_{r2}i + q_{r3}j + g_{r4}k \qquad (18)$$

$$1 = q_{l1}^2 + q_{l2}^2 + q_{l3}^2 + q_{l4}^2 \qquad (19)$$

$$1 = q_{r1}^2 + q_{r2}^2 + q_{r3}^2 + q_{r4}^2 \qquad (20)$$

Hereinafter, derivation of a Jacobi matrix used in a process of minimizing Expression (15) will be described. Hereinafter, the derivation will be described with respect to only a case where alignment of the left eye LE is established, however the derivation may be applied to a case where alignment of the right eye RE is established, similar to the case of the left eye LE.

When alignment of the left eye LE is established, a Jacobi matrix $J_L$ is as follows.

$$J_L = \begin{bmatrix} \frac{\partial x_{iml_i}}{\partial p} \\ \frac{\partial y_{iml_i}}{\partial p} \end{bmatrix} \qquad (21)$$

The Jacobi matrix in Expression (21) may be obtained by Expressions (6), (10), and (11), and the following Expressions (22) to (35).

$$inv(R_{cam2left}) = R_{cam2left}^T = \qquad (22)$$
$$\begin{pmatrix} q_{l_1}^2 + q_{l_2}^2 - q_{l_3}^2 - q_{l_4}^2 & 2q_{l_2}q_{l_3} + 2q_{l_1}q_{l_4} & 2q_{l_2}q_{l_4} + 2q_{l_1}q_{l_3} \\ 2q_{l_2}q_{l_3} + 2q_{l_1}q_{l_4} & q_{l_1}^2 - q_{l_2}^2 + q_{l_3}^2 - q_{l_4}^2 & 2q_{l_3}q_{l_4} + 2q_{l_1}q_{l_2} \\ 2q_{l_2}q_{l_4} + 2q_{l_1}q_{l_3} & 2q_{l_3}q_{l_4} + 2q_{l_1}q_{l_2} & q_{l_1}^2 - q_{l_2}^2 + q_{l_3}^2 - q_{l_4}^2 \end{pmatrix}^T$$

$$\begin{bmatrix} \frac{\partial X_{c_i}}{\partial q_{l_i}} \\ \frac{\partial Y_{c_i}}{\partial q_{l_i}} \\ \frac{\partial Z_{c_i}}{\partial q_{l_i}} \end{bmatrix} = \frac{\partial inv(R_{cam2left})}{\partial q_{l_i}} (R_{o2d_l} \times ModelMatrix + t_{o2dl} - t_{cam2left}) \qquad (23)$$

$$\frac{\partial x_{iml}}{\partial q_{l_i}} = F_x \frac{1}{Z_{c_l}} \frac{\partial X_{c_l}}{\partial q_{l_i}} - F_x \frac{X_{c_l}}{Z_{c_l}^2} \frac{\partial Z_{c_l}}{\partial q_{l_i}} \qquad (24)$$

$$\frac{\partial y_{iml}}{\partial q_{l_i}} = F_y \frac{1}{Z_{c_l}} \frac{\partial Y_{c_l}}{\partial q_{l_i}} - F_y \frac{Y_{c_l}}{Z_{c_l}^2} \frac{\partial Z_{c_l}}{\partial q_{l_i}} \qquad (25)$$

$$\frac{\partial x_{iml}}{\partial q_{r_i}} = 0 \qquad (26)$$

$$\frac{\partial y_{iml}}{\partial q_{r_i}} = 0 \qquad (27)$$

In Expressions (24) to (27), a subscript $i$ represents an integer of 1 to 4.

$$\frac{\partial x_{iml}}{\partial F_x} = \frac{X_{c_l}}{Z_{c_l}} \qquad (28)$$

$$\frac{\partial y_{iml}}{\partial F_x} = 0 \qquad (29)$$

$$\frac{\partial x_{iml}}{\partial F_y} = 0 \qquad (30)$$

$$\frac{\partial y_{iml}}{\partial F_y} = \frac{Y_{c_l}}{Z_{c_l}} \qquad (31)$$

-continued $$\frac{\partial x_{im_l}}{\partial C_x} = 1 \qquad (32)$$

$$\frac{\partial y_{im_l}}{\partial C_x} = 0 \qquad (33)$$

$$\frac{\partial x_{im_l}}{\partial C_y} = 0 \qquad (34)$$

$$\frac{\partial y_{im_l}}{\partial C_y} = 1 \qquad (35)$$

As described above, in the HMD 100 of the embodiment, after the marker specifying section 166 determines that the actual object marker RL and the marker image IMG displayed in the right optical image display section 26 or the left optical image display section 28 are overlaid on each other, the camera 61 images the outside scene SC. Further, the calculating section 167 derives the parameters p including at least the camera parameter CP relating to the camera 61 so that the cost function E is minimized, through optimization, using coordinate values of the centers of nine sets of circles of the actual object marker RL on the captured image and the model marker projected on the captured image. In the HMD 100 of the embodiment, the CPU 140 detects the position and pose of an object by the camera 61 using the derived parameters p (detection step), and performs the image display of the counterpart or corresponding AR object in the right optical image display section 26 and the left optical image display section 28 based on the detected position and pose so that the user visually perceives that at least one of the position, size and orientation of the AR object is aligned with those of the object (overlay display step). As a result, it is possible to reduce a focal distance shift of the imaging section or a position shift of an imaging sensor that may occur in a manufacturing process, and to overlay a display image on the outside scene SC. Further, it is possible to enhance the accuracy of the overlay display of the AR object to be viewed by the user and the object. According to the above-described embodiment, if the user performs the alignment once with respect to each of the right image display section and the left image display section, it is possible to obtain sufficient accuracy of the overlay display. Further, the alignment of the actual object marker RL and the marker image IMG is performed a small number of times (for example, once), it is possible to prevent accumulation of errors of the alignment as the user performs the alignment plural times from affecting calibration.

Further, in the HMD 100 of the embodiment, since the calculating section 167 optimizes the parameters P using the coordinate values of the central points of nine circles in the marker MK1, it is possible to execute optimization so that the cost function E is minimized, and to execute calibration with high accuracy.

B. Modification Examples

The invention is not limited to the above-described embodiments, and may be implemented as various forms in a range without departing from the spirit of the invention. For example, the following modifications may be used.

B-1. Modification Example 1

In the above-described embodiment, the calculating section 167 derives 12 parameters p as unknown parameters through optimization, but when variation in design values in manufacturing is small, design values may be set for some parameters among the parameters p, and the remaining parameters may be derived as unknown parameters. For example, the parameters p to be derived may be set as only the camera parameter CP of the camera 61.

$$p = [F_x, F_y, C_x, C_y] \qquad (36)$$

In the HMD 100 of this modification example, the number of parameters p to be optimized becomes small. Further, by substituting design values for parameters with a small variation in manufacturing, it is possible to reduce the time for optimizing the parameters while performing optimization of the parameters for reducing the cost function E. Further, with respect to each of the right eye and the left eye, it is possible to execute calibration by imaging the actual object marker RL a small number of times (for example, once).

B-2. Modification Example 2

In the above-described embodiments, the imaging of the outside scene SC is performed two times in total with respect to a case where the marker image IMG is displayed in the right optical image display section 26 and a case where the marker image IMG is displayed in the left optical image display section 28, but the number of times of the imaging performed for execution of calibration may be variously modified. For example, the calculating section 167 may execute optimization of parameters through only one-time imaging of the outside scene SC with respect to the case where the marker image IMG is displayed only in the right optical image display section 26. On the other hand, the imaging of the outside scene SC including the actual object marker RL may be performed three or more times, and the calculating section 167 may execute optimization of parameters for reducing the cost function E. Further, differently from the above-described embodiments, in the case of a monocular HMD, the marker image IMG may be displayed in an image display section corresponding to one eye or one image display section (that is, the monocular HMD) corresponding to both eyes to execute calibration.

In the above-described embodiments, the marker displayed in the right optical image display section 26 and the marker displayed in the left optical image display section 28 are the same marker image IMG, but the marker image IMG and the actual object marker RL may be variously modified. For example, the marker images displayed in the respective right optical image display section 26 and the left optical image display section 28 may be different from each other. Further, the marker image IMG and the actual object marker RL are not limited to the image of the marker MK1, and may be variously modified according to the accuracy of derived parameters. For example, the number of circles included in the marker MK1 is not limited to nine, and may be larger than nine, or may be smaller than nine. Further, plural feature points included in the marker MK1 may not be the centers of circles, and instead, may be the centers of gravity of triangles. In addition, plural straight lines which are not parallel in the marker Mk1 may be formed, and intersection points of the straight lines may be specified as plural feature points. Further, the marker image IMG and the actual object marker RL may be different markers. When the marker image and the actual object marker are overlaid, the marker image and the actual object marker may be variously modified to the extent that the user is enabled to recognize which parts of the marker image and the actual object marker are to be overlaid each other. For example, alignment may be performed with respect to a rectangular marker image so that the center of an actual object marker of a perfect circle is aligned with the center of the marker image.

C. Second Embodiment

C-1. Configuration of Image Display Device

Figure 7:
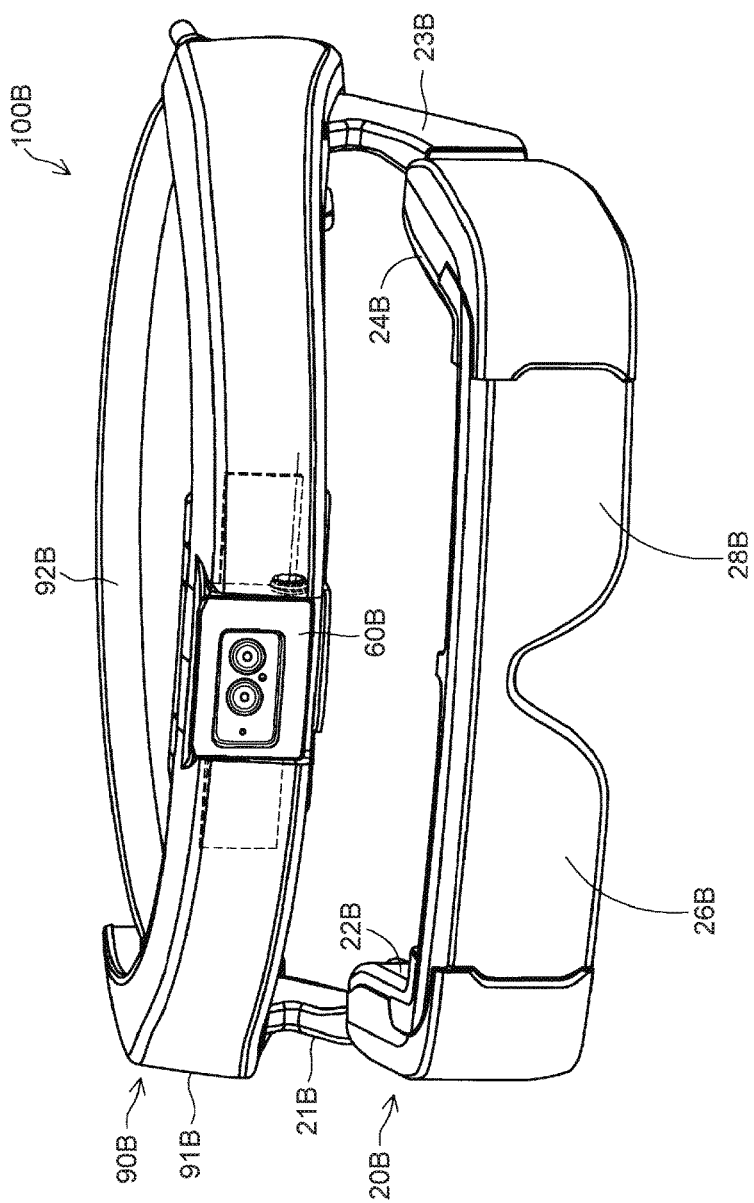
FIG. 7 is a diagram illustrating an appearance configuration of a head-mounted display device (HMD) that performs calibration.
Figure 8:
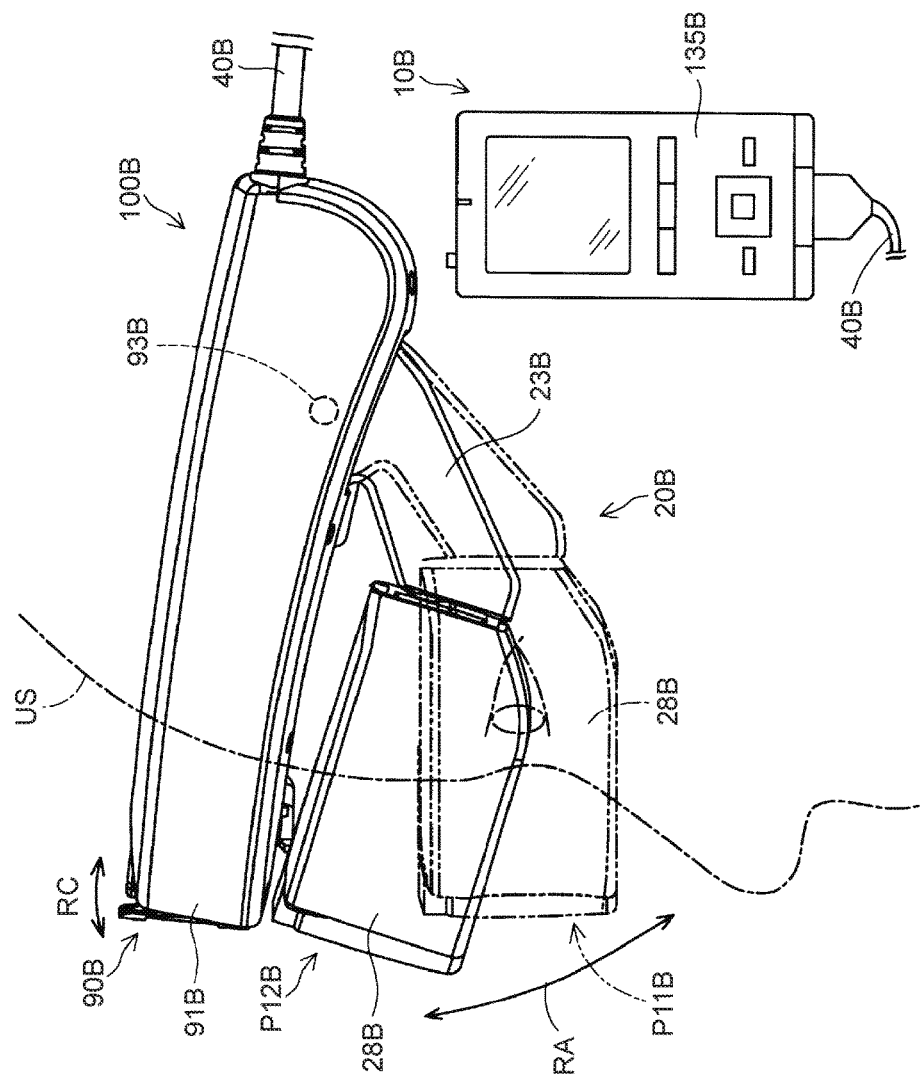
FIG. 8 is a diagram illustrating an appearance configuration of the head-mounted display device (HMD) that performs calibration.
Figure 9:
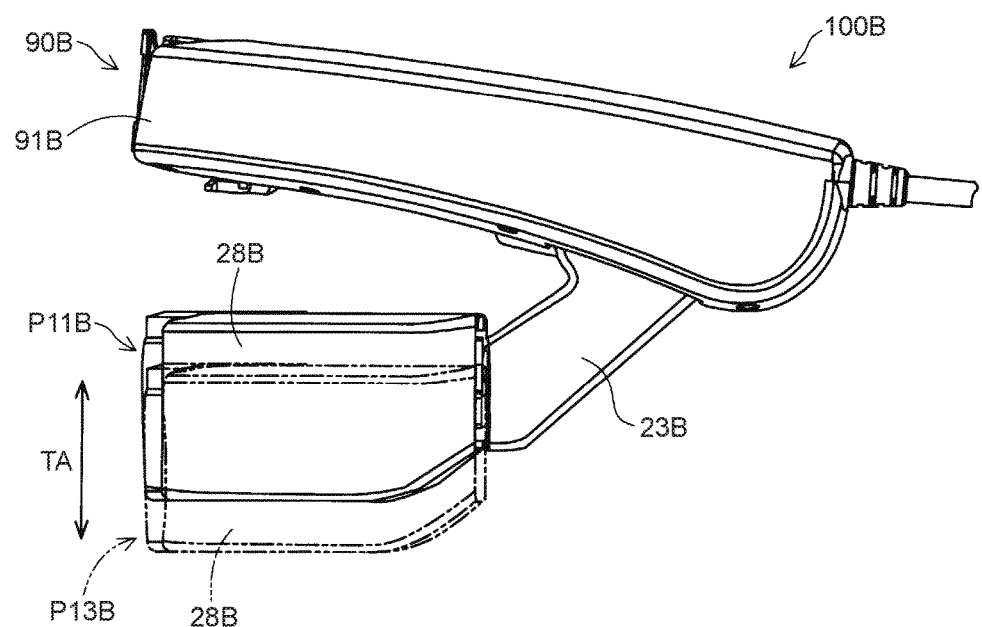
FIG. 9 is a diagram illustrating an appearance configuration of the head-mounted display device (HMD) that performs calibration.

FIGS. 7 to 9 are diagrams illustrating an appearance configuration of a head-mounted display device 100B (HMD 100B) that performs calibration. The HMD 100B causes a user to visually perceive a display image which is displayed by an image display section 20B, and thus can cause the user to visually perceive even an outside scene passing through the image display section 20B (FIG. 7). Although a detailed configuration will be described later, the HMD 100B of the present embodiment includes an image display section corresponding to each of the right eye and the left eye of a user wearing the image display section 20B, and can cause the right eye and the left eye of the user to visually perceive separate images.

As shown in FIG. 8, the HMD 100B includes a mounting band 90B which is mounted to the head-mounted display device of a user US, an image display section 20B which is connected to the mounting band 90B, an image display section 20B that displays an image, a controller 10B (controller 10B) that controls the image display section 20B, and a connection section 40B that connects the controller 10B and the mounting band 90B. As shown in FIG. 7, the mounting band 90B includes a mounting base 91B made of resin, a belt portion 92B made of cloth which is connected to the mounting base 91B, and a camera 60B. The mounting base 91B has a curved shape suited to the form of the human frontal region. The belt portion 92B is a belt for mounting around a user's head. Meanwhile, in FIG. 8, the connection section 40B connects the mounting band 90B and the controller 10B side in a wired manner, but a portion which is connected is not shown in the drawing.

The camera 60B can capture an outside scene, and is disposed at the central portion of the mounting base 91B. In other words, the camera 60B is disposed at a position corresponding to the center of a user's forehead in a condition that the mounting band 90B is mounted on a user's head. Therefore, in a condition that a user wears the mounting band 90B on the head, the camera 60B captures an outside scene which is an outside landscape in a user's eye direction, and acquires a captured image which is an image which has been captured. As shown in FIG. 8, the camera 60B movably operates in a predetermined range along a circular arc RC with respect to the mounting base 91B. In other words, the camera 60B can change an imaging range in a predetermined range.

As shown in FIG. 8, the image display section 20B is connected to the mounting base 91B through a connecting portion 93B, and has a spectacles shape. The connecting portion 93B is symmetrically disposed on both sides of the mounting base 91B and the image display section 20B, and rotatably supports the position of the image display section 20B with respect to the mounting base 91B along the circular arc RA, centering on the connecting portion 93B. In FIG. 8, a position P11B shown by a dashed-two dotted line is a lowermost end in which the image display section 20B is along the circular arc RA. In addition, in FIG. 8, a position P12B shown by a solid line is an uppermost end in which the image display section 20B is along the circular arc RA.

In addition, as shown in FIG. 9, optical image display sections 26B and 28B having a display panel that displays a marker image IMG moves in parallel in a predetermined range along a straight line TA with respect to holding portions 21B and 23B, and have the positions thereof changed. In FIG. 9, a position P13B shown by a dashed-two dotted line is a lowermost end in which the optical image display sections 26B and 28B are along the straight line TA. In FIG. 9, the position P11B shown by a solid line is an uppermost end in which the optical image display sections 26B and 28B are along the straight line TA. Meanwhile, the position P11B in FIG. 8 and the position P11B in FIG. 9 show the same position.

As shown in FIG. 7, the image display section 20B includes a right holding portion 21B, a right display drive section 22B, a left holding portion 23B, a left display drive section 24B, a right optical image display section 26B, and a left optical image display section 28B. The right optical image display section 26B and the left optical image display section 28B are disposed so as to be located in front of a user's right and left eyes when a user wears the image display section 20B. One end of the right optical image display section 26B and one end of the left optical image display section 28B are connected to each other at a position corresponding to a user's glabella when the user wears the image display section 20B.

The right holding portion 21B is a member which is provided so as to extend from the other end of the right optical image display section 26B to the connecting portion 93B connected to the mounting base 91B. Similarly, the left holding portion 23B is a member which is provided so as to extend from the other end of the left optical image display section 28B to the connecting portion 93B. The right display drive section 22B and the left display drive section 24B are disposed at sides facing a user's head when the user wears the image display section 20B.

The display drive sections 22B and 24B include liquid crystal displays 241B and 242B (hereinafter, also called "LCDs 241B and 242B"), projection optical systems 251B and 252B, and the like which are described later in FIG. 8. The details of the configuration of the display drive sections 22B and 24B will be described later. The optical image display sections 26B and 28B include light guide plates 261B and 262B (see FIG. 10) and a dimming plate which are described later. The light guide plates 261B and 262B are formed of an optically transmissive resin material or the like, and guide image light which is output from the display drive sections 22B and 24B, to a user's eyes. The dimming plate is a laminar optical element, and is disposed so as to cover the surface side of the image display section 20B which is an opposite side to a user's eyes. The light transmittance of the dimming plate is adjusted, and thus it is possible to adjust a tendency to visually perceive a virtual image by adjusting the amount of outside light entering a user's eyes.

The controller 10B is a device for controlling the HMD 100B. The controller 10B includes an operating section 135B which is provided with an electrostatic-type track pad, a plurality of buttons capable of being pressed down, and the like.

Figure 10:
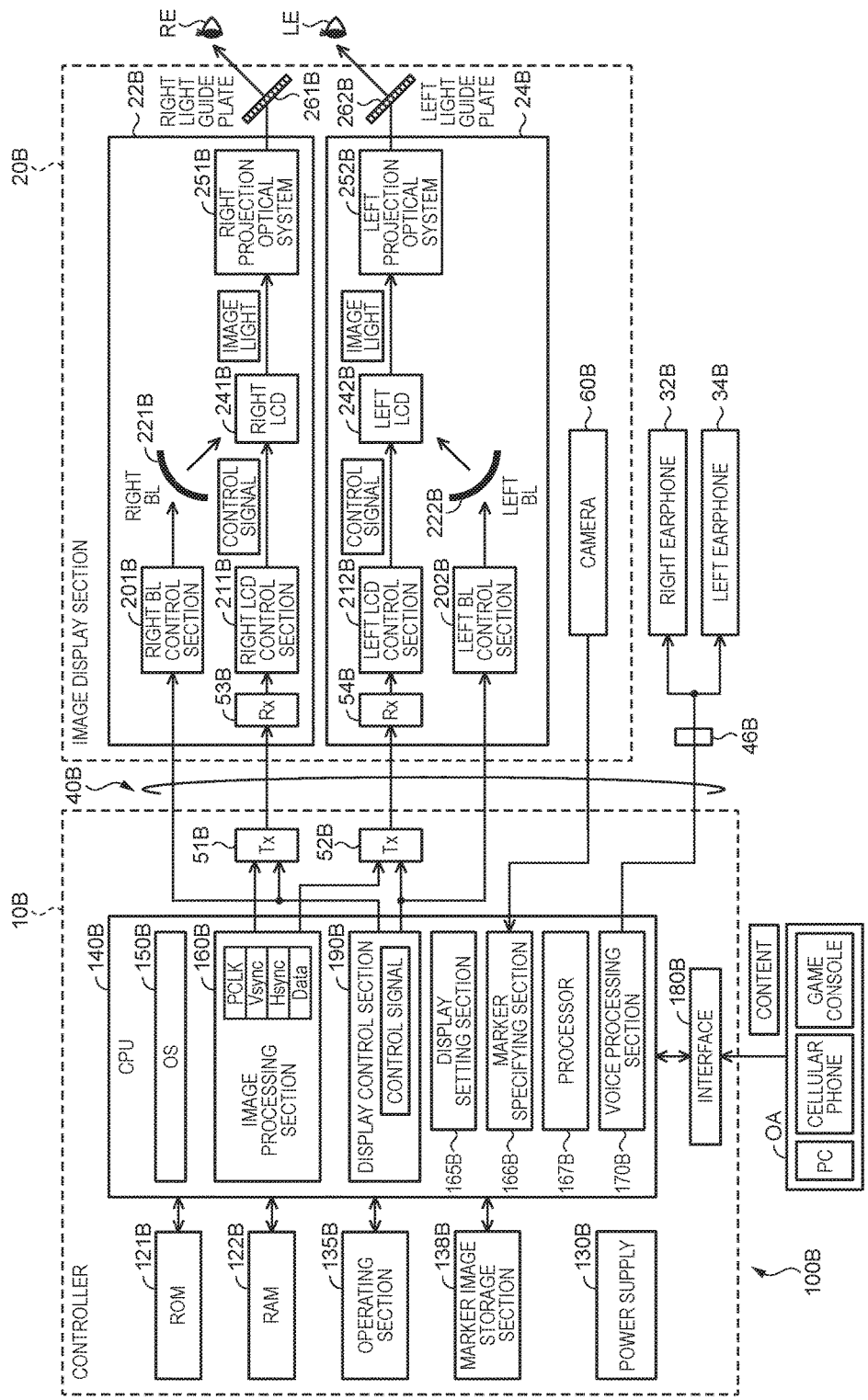
FIG. 10 is a functional block diagram illustrating a configuration of the HMD.

FIG. 10 is a functional block diagram illustrating a configuration of the HMD 100B. As shown in FIG. 10, the controller 10B includes a ROM 121B, a RAM 122B, a power supply 130B, an operating section 135B, a marker image storage section 138B, a CPU 140B, an interface 180, a transmission section 51B (Tx 51B) and a transmission section 52B (Tx 52B).

The power supply 130B supplies power to each section of the HMD 100B. Various computer programs are stored in the ROM 121B. The CPU 140B described later executes various types of computer program by developing various types of computer program stored in the ROM 121B on the RAM 122B.

The marker image storage section 138B stores data of a model marker and/or the marker image IMG of a marker MK1 as an image for calibration which is displayed on the right optical image display section 26B or the left optical image display section 28B. The marker image storage section 138B stores a marker image displayed on the right optical image display section 26B and a marker image displayed on the left optical image display section 28B as the image IMG of the same marker. The marker image IMG is obtained by mapping the above model marker (2D) represented by a three-dimensional model space (3D computer graphics space) on the basis of each projection parameter of the right optical image display section 26B or the left optical image display section 28B.

Figure 11:
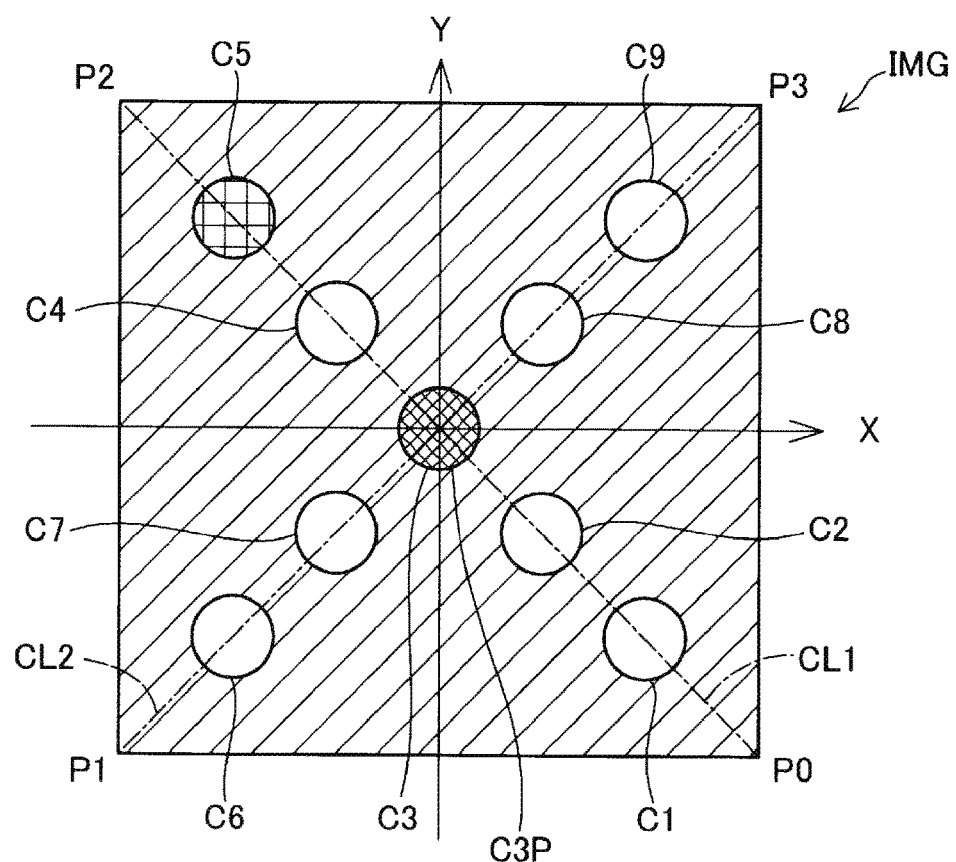
FIG. 11 is a diagram illustrating an example of a marker image which is displayed on an image display section.

FIG. 11 is a diagram illustrating an example of the marker image IMG which is displayed on the image display section 20B. As shown in FIG. 11, the marker image IMG includes nine circles in a square connecting four peaks P0, P1, P2, and P3 with a straight line. The centers of five circles out of the nine circles are present on a diagonal line CL1 connecting the peak P0 and the peak P2. The five circles are circles C1, C2, C3, C4, and C5 from a circle close to the peak P0 along the diagonal line CL1. Likewise, the centers of five circles out of the nine circles are present on a diagonal line CL2 connecting the peak P1 and the peak P3. The five circles are circles C6, C7, C3, C8, and C9 from a circle close to the peak P1 along the diagonal line CL2. The circle C3 is a circle centered at a point which is a point of intersection between the diagonal line CL1 and the diagonal line CL2, and a centroid of the square. In the present embodiment, distances between the centers of circles adjacent to each other in five circles having centers at the diagonal line CL1 are set so as to have the same distance. Likewise, distances between the centers of circles adjacent to each other in five circles having centers at the diagonal line CL2 are set so as to have the same distance. In addition, a distance between the centers of circles adjacent to each other having centers at the diagonal line CL1 and a distance between the centers of circles adjacent to each other having centers at the diagonal line CL2 are the same as each other. The sizes of the nine circles are the same as each other. Meanwhile, the diagonal line CL1 and the diagonal line CL2 are shown in FIG. 9 for convenience, and are straight lines which are not included in the marker image IMG.

In FIG. 11, a difference in color is shown by changing hatching. Therefore, as shown in FIG. 11, four colors of yellow inside the circle C3, green inside the circle C5, white inside seven circles C1, C2, C4, C6, C7, C8, and C9 different from the circles C3 and C5, and black of a portion which is included in the square and does not include the nine circles are present in the marker image IMG. In addition, an X-axis and a Y-axis using a center C3P of the circle C3 as an origin are shown in FIG. 11. In a calibration execution process described later, various coordinate values are specified using the center C3P as an origin. The reason for the colors of the circle C3 and the circle C5 out of the nine circles included in the marker image IMG to be different from that of the other seven circles is for the purpose of discriminating between the circle C3 as a central circle and the circle C5 for specifying the direction of the captured real marker MK1.

The CPU 140B shown in FIG. 10 develops computer programs stored in the ROM 121B on the RAM 122B, to thereby function as an operating system 150B (OS150B), a display controller 190B, a voice processing section 170B, an image processing section 160B, a display setting section 165B, a marker specifying section 166B and a processor 167B.

The display controller 190B generates a control signal for controlling the right display drive section 22B and the left display drive section 24B. The display controller 190B controls the generation and emission of image light based on each of the right display drive section 22B and the left display drive section 24B. The display controller 190B transmits each control signal for a right LCD controller 211B and a left LCD controller 212B through the transmission sections 51B and 52B. In addition, the display controller 190B transmits each control signal for a right backlight controller 201B and a left backlight controller 202B.

The image processing section 160B acquires an image signal included in content, and transmits the acquired image signal to receiving sections 53B and 54B of the image display section 20B through the transmission sections 51B and 52B. The voice processing section 170B acquires a voice signal included in content, amplifies the acquired voice signal, and supplies the amplified signal to a speaker (not shown) within a right earphone 32B and a speaker (not shown) within a left earphone 34B which are connected to the connection member 46B.

The display setting section 165B causes the right optical image display section 26B or the left optical image display section 28B to display an image of the marker MK1 stored in the marker image storage section 138B. The display setting section 165B controls a case where the marker image IMG is displayed on the right optical image display section 26B and a case where the marker image IMG is displayed on the left optical image display section 28B, on the basis of an operation accepted by the operating section 135B, during the execution of calibration.

The marker specifying section 166B specifies a real marker RL of the marker MK1 which is disposed on, for example, the rear surface (surface on the opposite side to the operating section 135B) of the controller 10B, a predetermined wall or the like, from a captured image which is captured by the camera 60B. Although a specific process for specifying the real marker RL will be described later, the marker specifying section 166B specifies the real marker RL from the captured image by extracting four peaks of the real marker RL, central coordinate values of nine circles, colors of nine circles, or the like. The marker specifying section 166B extracts nine circles or the like having different colors in the marker MK1 by binarizing, for example, a gradation value of the color of the captured image.

The processor 167B calculates a first parameter PM1 indicating a spatial relationship (at least one of rotations and translations) between the camera 60B and the real marker RL, using nomography in the present embodiment. In addition, the processor 167B calculates a spatial parameter PM indicating spatial relationships between the camera 60B and the optical image display sections 26B and 28B. Meanwhile, a camera coordinate system based on the camera 60B is a three-dimensional coordinate system in which an origin is fixed to the camera 60B. A real marker coordinate system, an object coordinate system, and a display coordinate system are also defined by the same concept as that of the camera coordinate system.

In addition, the processor 167B optimizes a parameter (also called a camera parameter) relating to the camera 60B. Regarding the optimization of the parameter relating to the camera 60B, a parameter relevant to the focal length of the camera 60B which is not previously known (unknown) and a parameter including a principal-point position (for example, central coordinates of the captured image) or the like are calculated so as to be capable of being optimized using the obtained coordinate value. When a target is captured using the camera parameters derived by optimization and the captured image is acquired, the position of a point on the target in the captured image and a display position on the image display section are associated with each other, the display position being to be overlaid on the point on the target when seen from a user. As a result, a user can visually perceive an AR (Augmented Reality) image so that at least one of a position, a size, and a pose aligns with that of the target, through the image display section 20B. Meanwhile, the details of the optimization of the parameter of the camera 60B will be described later. In addition, in the present embodiment, the spatial parameter PM is also calculated by performing the same optimization as that of a camera parameter CP of the camera 60B.

The interface 180 is an interface for connecting various external devices OA serving as supply sources of content to the controller 10B. Examples of the external device OA include a storage device having AR scenarios stored therein, a personal computer (PC), a cellular phone terminal, a game terminal, and the like. Examples of the interface 180 to be used include a USB interface, a micro USB interface, a memory card interface, and the like.

As shown in FIG. 10, the image display section 20B includes the right display drive section 22B, the left display drive section 24B, the right light guide plate 261B as the right optical image display section 26B, and the left light guide plate 262B as the left optical image display section 28B.

The right display drive section 22B includes the receiving section 53B (Rx 53B), the right backlight controller 201B (right BL controller 201B) and the right backlight 221B (right BL 221B) which function as light sources, the right LCD controller 211B and the right LCD 241B which function as a display element, and the right projection optical system 251B. The right backlight controller 201B and the right backlight 221B function as light sources. The right LCD controller 211B and the right LCD 241B function as a display element.

The receiving section 53B functions as a receiver for serial transmission between the controller 10B and the image display section 20B. The right backlight controller 201B drives the right backlight 221B on the basis of the control signal which is input. The right backlight 221B is, for example, an illuminant such as an LED or electroluminescence (EL). The right LCD controller 211B drives the right LCD 241B on the basis of the control signal which is transmitted from the image processing section 160B and the display controller 190B. The right LCD 241B is a transmission type liquid crystal panel having a plurality of pixels arranged in a matrix.

The right projection optical system 251B is constituted by a collimating lens in which image light emitted from the right LCD 241B is changed to be a flux of light in a parallel state. The right light guide plate 261B as the right optical image display section 26B guides the image light which is output from the right projection optical system 251B, to a user's right eye RE while reflecting the light along a predetermined light path. Meanwhile, since the left display drive section 24B has the same configuration as that of the right display drive section 22B, and corresponds to a user's left eye LE, and thus the description thereof will not be given.

C-2. Calibration Execution Process

Figure 12:
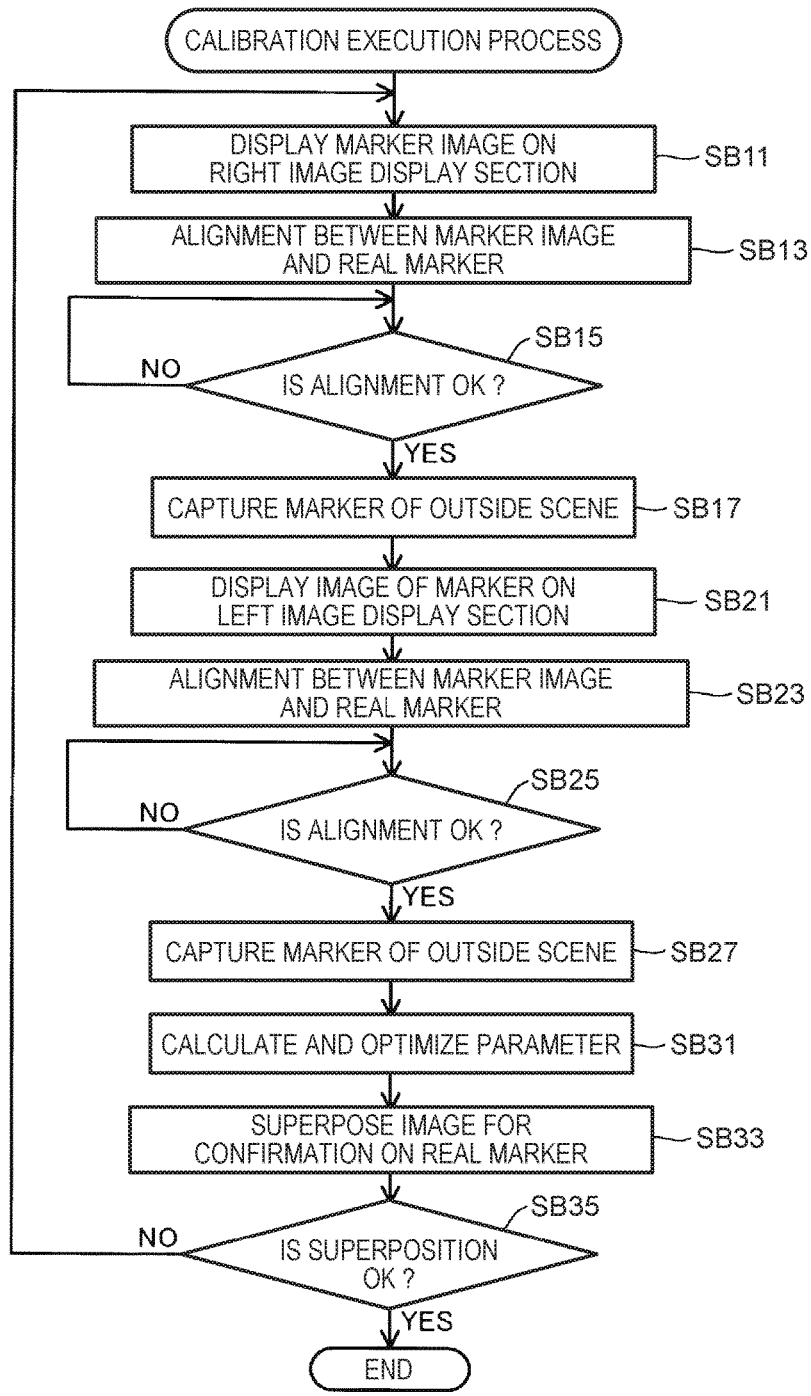
FIG. 12 is a flow diagram of a calibration execution process in the present embodiment.

FIG. 12 is a flow diagram of a calibration execution process in the present embodiment. The calibration execution process is as follows: first, in a condition that a user visually perceives that the marker image IMG displayed on the right optical image display section 26B or the left optical image display section 28B and the real marker RL specified from an outside scene overlaid with each other, the CPU 140B captures the real marker RL using the camera 60B. The CPU 140B derives the spatial parameter PM and the parameter of the camera 60B, based at least on a captured image obtained by capturing the real marker RL. In this manner, this process also has an aspect as a process of detecting a relative positional relationship between the camera 60B and the optical image display section.

In the calibration execution process, initially, the display setting section 165B causes, for example, only the right optical image display section 26B as a right image display section corresponding to a user's right eye to display the marker image IMG (step SB11). In this case, the right optical image display section 26B displays the marker image IMG with a predetermined size at a predetermined position in an image display region so that a spatial relationship between the real marker ML and the optical image display section 26B is set to a known predetermined spatial relationship (rotations and translations), when a user adjusts the distance and pose of the head with respect to the real marker ML so as to visually perceive that the real marker ML and the marker image IMG align with each other.

Figure 13:
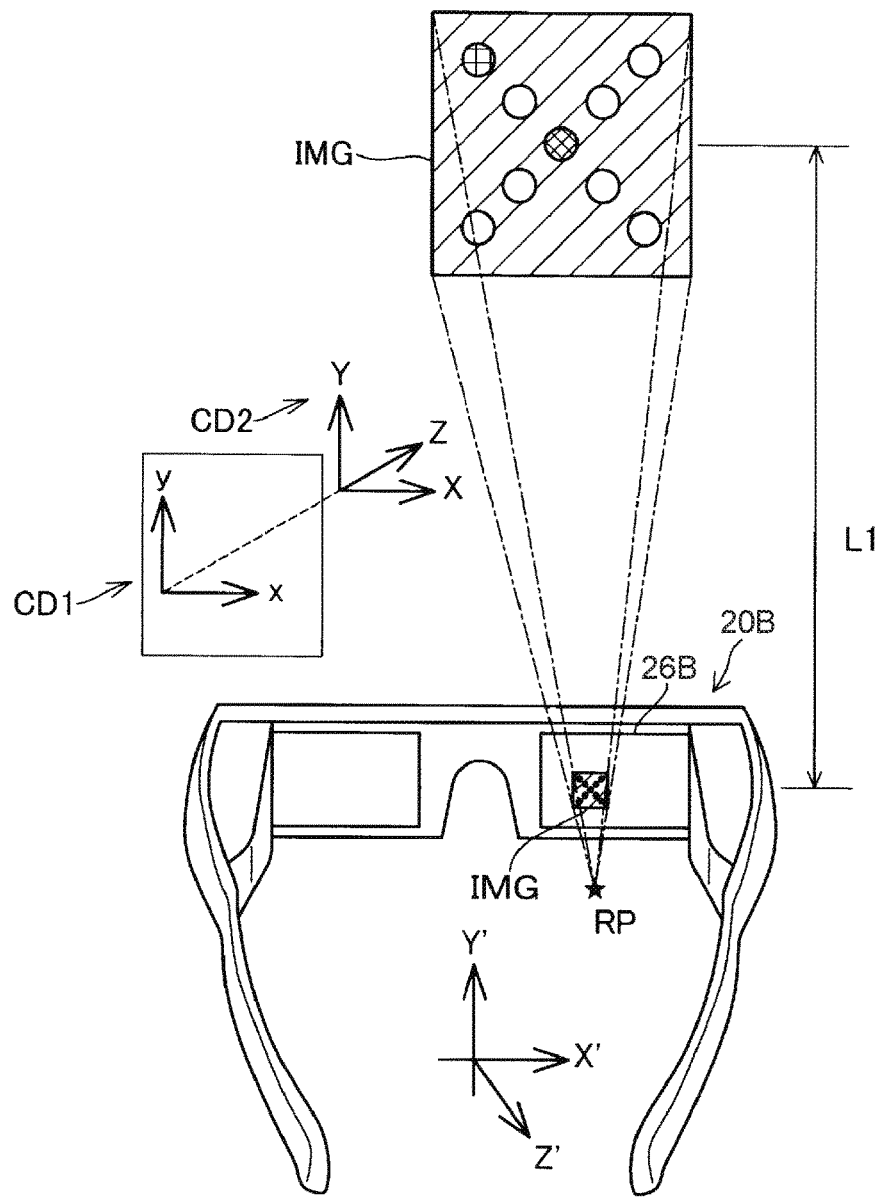
FIG. 13 is a schematic diagram of a state where the marker image is displayed on only a right optical image display section.

FIG. 13 is a schematic diagram of a state where the marker image IMG is displayed on only the right optical image display section 26B. FIG. 13 illustrates an outline when a user visually perceives the marker image IMG displayed on the right optical image display section 26B from a right-eye position RP which is set as the position of the virtual or expected right eye of the user wearing the image display section 20B in advance. Meanwhile, FIG. 13 illustrates only the image display section 20B within the HMD 100B, and does not illustrate the mounting band 90B, the controller 10B and the like. Therefore, the image display section 20B shown in FIG. 13 is the same image display section as the image display section 20B shown in FIGS. 7 to 9. In addition, FIG. 13 illustrates a coordinate axis CD2 indicating the coordinate axis of a three-dimensional space to be captured and a coordinate axis CD1 indicating the coordinate axis of a captured two-dimensional image. A user visually perceives the marker image IMG displayed on the right optical image display section 26B as the marker MK1 which is present at a position away by a distance L1 from the image display section 20B.

When the process of step SB11 of FIG. 12 is performed, the marker specifying section 166B urges or prompts a user to perform an alignment so that the marker image IMG displayed on the right optical image display section 26B and the real marker RL which is present at an outside scene are overlaid on each other (step SB13).

Figure 14:
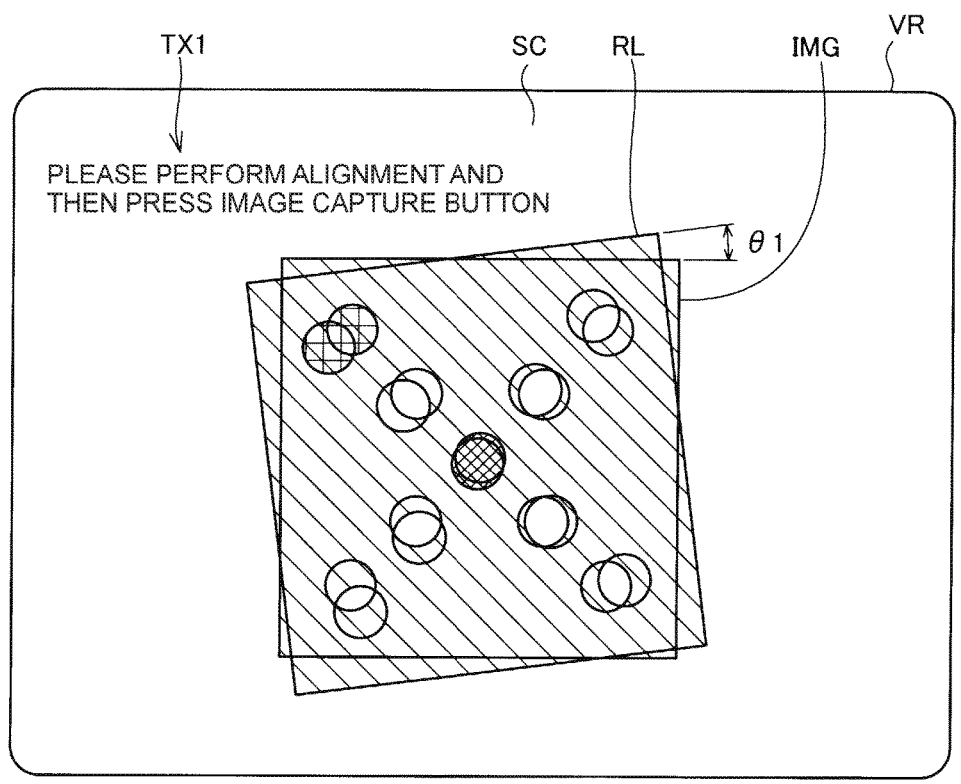
FIG. 14 is a schematic diagram illustrating a positional relationship between a real marker and the marker image.

FIG. 14 is a schematic diagram illustrating a positional relationship between the real marker RL and the marker image IMG. FIG. 14 illustrates the real marker RL included in an outside scene SC, and the marker image IMG and a character image TX1 which are displayed on the right optical image display section 26B. The character image TX1 is an image indicating with characters that urge a user to perform image capture after an alignment between the marker image IMG and the real marker RL is performed. Specifically, the character image TX1 is an image of characters indicating "please perform alignment and then press an image capture button". As shown in FIG. 12, the center of the marker image IMG and the center of the real marker RL does not align with each other. In addition, in the example shown in FIG. 12, the real marker RL is inclined by an angle θ1 with respect to the marker image IMG. In this case, a user wearing the image display section 20B can overlay the marker image IMG on the real marker RL by changing the user's position or direction.

When the process of step SB13 of FIG. 12 is performed, the marker specifying section 166B determines whether the alignment between the marker image IMG and the real marker RL is completed (step SB15). As shown in the character image TX1 of FIG. 14, the marker specifying section 166B determines the completion of the alignment on the basis of the presence or absence of an operation in which the image capture button is pressed down by a user. The image capture button may be any button of the operating section 135B which is set in advance, and can be modified variously.

When an operation for pressing down the image capture button is not present, and it is determined that the alignment is not completed (step SB15: NO), the marker specifying section 166B continuously waits for an operation for pressing down the image capture button indicating the completion of the alignment. When the operation for pressing down the image capture button is present, the marker specifying section 166B determines that the alignment is completed (step SB15: YES), and captures the outside scene SC using the camera 60B (step SB17).

Next, the display setting section 165B sets not to display the marker image IMG displayed on only the right optical image display section 26B, and causes only the left optical image display section 28B to display the marker image IMG (step SB21). A method in which the left optical image display section 28B displays the marker image IMG is the same as the method in which the right optical image display section 26B displays the marker image IMG in step SB11. Thereafter, as in the processes corresponding to a user's right eye RE from step SB13 to step SB17, the marker specifying section 166B urges a user's left eye LE to perform an alignment so that the marker image IMG and the real marker RL are overlaid on each other (step SB23).

When a user is urged to perform the alignment on the basis of a left-eye position LP, the marker specifying section 166B determines whether the alignment between the marker image IMG and the real marker RL is completed (step SB25). When the operation for a user to press down the image capture button is not present, and it is determined that the alignment is not completed (step SB25: NO), the marker specifying section 166B continuously waits for the operation for pressing down the image capture button indicating the completion of the alignment. When the operation for pressing down the image capture button is present, the marker specifying section 166B determines that the alignment is completed (step SB25: YES), and captures the outside scene SC using the camera 60B (step SB27).

Next, the processor 167B executes the derivation of the spatial parameters PM and the camera parameter CP of the camera 60B on the basis of the captured images with reference to each of the right-eye position RP and the left-eye position LP (step SB31). Then, using the derived spatial parameters PM and the camera parameter CP, the CPU 140B causes the display sections 26 and 28 to display an image for determination 3DCG (FIG. 15) based on the estimated position and pose of the real marker MK1 with respect to the camera 61B, so that the user wearing the HMD 100B is allowed to visually perceive as if the image for determination is superposed on the real marker RL with the same position and pose as those of the real marker RL (step SB33). Then, the CPU 140B determines whether the superposition of the image for determination is successful or not, based on a user's operation accepted by the operating section 135B. If the CPU 140B determines that the superposition is successful (step SB35: YES), the CPU 140B terminates the calibration execution process. If the CPU 140B determines that the superposition is not successful (step SB35: NO), the process returns to step SB11 so as to derive the spatial parameters PM and the camera parameter CP again.

C-3. Spatial Parameter and Camera Parameter

C-3-1. Camera Parameter

As a parameter (hereinafter, also called a camera parameter) relating to the camera 60B, four parameters CP (fx, fy, Cx, Cy) are present. Here, (fx, fy) is the focal length of the imaging section, and is converted into the number of pixels on the basis of pixel density.

The camera parameters may be known from the product specification of the camera 60B constituting the main portion of the imaging section (hereinafter, those are also denoted by default camera parameters). However, the camera parameters of a real camera often shift greatly from the default camera parameter. Furthermore, even in a case of cameras having the same specification, the camera parameters may vary (be not uniform) between the cameras.

When making a user visually perceive that at least one of a position, a size, and a pose in an AR object is aligned (superposed) on a real object, the camera 60B functions as a detector that detects the position and pose of the real object. In this case, the processor 167B estimates the position and pose of the real object captured by the camera 60B with respect to the camera 60B, using the camera parameter. Further, the processor 167B transforms the above position and pose into the position and pose of a real object with respect to the left optical image display section 28B, using a relative positional relationship between the camera 60B and the left optical image display section 28B (right optical image display section 26B). Further, the processor 167B determines the position and pose of the AR object on the basis of the transformed position and pose. The image processing section 160B projects (transforms) the AR object having the position and pose into a display coordinate system using the projection parameter, and writes the resultant in a display buffer (for example, RAM 122B). The image controller causes the left optical image display section 28B to display the AR object written in the display buffer. For this reason, when the camera parameters are the default camera parameters, an error may be included in the estimated position and pose of the real object. Then, a user visually perceives that an error is present in the superposition of the displayed AR object and the real object, resulting from the error of the estimated position and pose.

In the present embodiment, at least one of the camera parameters is derived by optimization during calibration for a user to visually perceive that the AR object is superposed on a target. The derived camera parameter is used in estimating the position and pose of the target. As a result, the degree of a shift that a user visually perceives between the displayed AR object and the real object becomes lower in the display of the AR object. As described later, it is preferable in the present embodiment that even when the same user uses the same HMD 100B, the derivation of the camera parameter is performed whenever calibration is performed, and the derived camera parameter is preferably used for a subsequent superposed display in which at least one of a position, a size, and a pose of the AR object are coincident with corresponding ones of the target. This is based on the fact that during the calibration, a user does not necessarily perform an alignment between the real marker RL and the marker image IMG corresponding to the real marker RL with the same accuracy. According to the present embodiment, even when a user performs an alignment with a different accuracy, the camera parameter corresponding thereto is derived, and thus an increase in the shift of a superposed display is suppressed when the superposed display of the AR object is performed.

In addition, the HMD 100B of the present embodiment has a structure in which a relative positional relationship between the camera 60B and the optical image display sections 26B and 28B changes. As can also be understood from the description of the default camera parameters, when a user is allowed to visually perceive that at least one of a position, a size, and a pose in the AR object is aligned (superposed) on the real object, the display of the AR object on the basis of a relative positional relationship different from the relative positional relationship between the real camera 60B and the optical image display sections 26B and 28B causes an error to be visually perceived in the superposition between the displayed AR object and the real object.

In the present embodiment, the spatial parameter PM indicating relative positional relationships (at least one of rotations and translations) between the coordinate system of the camera 60B, and the coordinate system of the right optical image display section 26B and the coordinate system of the left optical image display section 28B is derived during the calibration for a user to visually perceive that the AR object is superimposed on a target. When the AR object is displayed using the spatial relationship (relative positional relationship) indicated by the derived spatial parameters PM, the degree of a shift that a user visually perceives becomes lower.

As shown in FIG. 13, in a case where a user visually perceive that the marker image IMG displayed on the left optical image display section 28B and the real marker RL which is included in an outside scene and is located ahead align with each other in position, size, and direction (hereinafter, also called a case where a user establishes an alignment with a left eye), a relationship of the following Expression (1B) is established between the coordinate systems. Meanwhile, hereinafter, a case where the marker image IMG is displayed on the left optical image display section 28B will be described.

$$CP \times [R_{o2dl}, t_{o2dl}] \times ModelMatrix = \qquad (1B)$$
$$CP \times [R_{cam2left}, t_{cam2left}] \times [R_{obj2cam}, t_{obj2cam}] \times ModelMatrix$$

Here, CP on the left side and the right side is the camera parameter of the camera 60B. In addition, $[R_{o2dl}, t_{o2dl}]$ is a transformation matrix from a coordinate system fixed to the real object (in this case, real marker RL) to a coordinate system fixed to the left optical image display section 28B, where $[R_{o2dl}]$ is a 3×3 matrix indicating rotation, and $[t_{o2dl}]$ is a 3×1 matrix indicating translation. ModelMatrix is a 3×1 matrix indicating any one point on the model marker. The model marker is three-dimensional data (three-dimensional model: however, plane in the present embodiment) serving as a basis for a case where the marker image is displayed on the optical image display section 28B. The notation of $[R_{o2dl}, t_{o2dl}] \times ModelMatrix$ is based on the rule of the following Expression (2B).

$$[R_{o2dl}, t_{o2dl}] \times ModelMatrix = [R_{o2dl}] \times ModelMatrix + [t_{o2dl}] \qquad (2B)$$

The notation rule of Expression (2B) is also applied to other portions of Expression (1).

In addition, $[R_{cam2left}, t_{cam2left}]$ on the right side of Expression (1B) is a transformation matrix (hereinafter, also called a spatial parameter) from the coordinate system of the camera 60B to the coordinate system of the left optical image display section 28B. In addition, $[R_{obj2cam}, t_{obj2cam}]$ on the right side of Expression (1B) is a transformation matrix from the coordinate system of the real object (real marker RL) to the coordinate system of the camera 60B.

From the relationship of the above (1), when an alignment between the marker image IMG and the real marker RL is established with respect to the left optical image display section 28B, the following Expressions (3B) and (4B) are established.

$$R_{obj2cam} = inv(R_{cam2left}) * R_{o2dl} \qquad (3B)$$

$$t_{obj2cam} = inv(R_{cam2left}) * (t_{o2dl} - t_{cam2left}) \qquad (4B)$$

When the pose of the real marker RL with respect to the camera 60B is applied to the model marker in a case where the alignment of the left eye LE is established, any point on the model marker transformed into the coordinate system of the camera 60B is expressed as Pcl (Xcl, Ycl, Zcl) in the following Expression (5B).

$$P_{cl} = \begin{bmatrix} X_{cl} \\ Y_{cl} \\ Z_{cl} \end{bmatrix} = R_{obj2cam} \times ModelMatrix + t_{obj2cam} \qquad (5B)$$

When $R_{obj2cam}$ and $t_{obj2cam}$ are erased using Expression (3B) and Expression (4B), Expression (5B) is expressed as in the following Expression (6B).

$$P_{cl} = \begin{bmatrix} X_{cl} \\ Y_{cl} \\ Z_{cl} \end{bmatrix} = inv(R_{cam2left})(R_{o2dl} \times ModelMatrix + t_{o2dl} = t_{cam2left}) \qquad (6B)$$

Here, $R_{o2dl}$ and $t_{o2dl}$ respectively indicate rotations and translations from the coordinate system of the real marker RL to the coordinate system of the left optical image display section 28B. In the present embodiment, the marker image IMG is fixed and displayed at a predetermined position (for example, the center) on the left optical image display section 28B with a predetermined orientation and a predetermined size. Then, when the user US aligns the marker image IMG displayed on the left optical image display section 28B with the real marker ML, $R_{o2dl}$ and $t_{o2dl}$ become predetermined rotation and translation which coincide whit the predetermined position, orientation and size of the marker image IMG. $T_{cam2left}$ is translation from the coordinate system of the camera to the coordinate system of the left optical image display section 28B.

$$R_{o2d_l} = \begin{bmatrix} 1 & 0 & 0 \\ 0 & 1 & 0 \\ 0 & 0 & 1 \end{bmatrix} \qquad (7B)$$

-continued $$t_{o2d_l} = \begin{bmatrix} 0 \\ 0 \\ -a \end{bmatrix} \quad (8B)$$

$$t_{cam2left} = \begin{bmatrix} D1 \\ D2 \\ D3 \end{bmatrix} \quad (9B)$$

Element in Expressions (7B) and (8B) in the present embodiment are constants (a is L1 of FIG. 13), and elements D1, D2, and D3 in Expression (9B) are initial values. Meanwhile, as can be seen from FIG. 13, in the present embodiment, the direction of light which is emitted from the optical image display sections 26B and 28B (image display section 20B) to the eyes of the user US is a Z-axis direction in the coordinate system fixed to the image display section 20B.

When the model marker represented by Expression (5B) is projected to the captured image of the camera 60B, the coordinates of the model marker on the captured image are as follows.

$$x_{iml} = F_x \frac{X_{cl}}{Z_{cl}} + C_x \quad (10B)$$

$$y_{iml} = F_y \frac{Y_{cl}}{Z_{cl}} + C_y \quad (11B)$$

Here, (Fx, Fy) is the focal length of the camera 60B, and (Cx, Cy) is principal-point position coordinates of the camera 60B.

When the coordinates of the feature element of the marker in the captured image in a case where the camera 60B captures the real marker RL in reality are denoted by $(u_l, v_l)$, a difference between $(u_l, v_l)$ and $(x_{iml}, y_{iml})$ is as follows.

$$e_i = \begin{bmatrix} e_x \\ e_y \end{bmatrix} = \begin{bmatrix} u_{li} - x_{imli} \\ v_{li} - y_{imli} \end{bmatrix}, \quad (12B)$$

$$i = 1 \sim 9$$

A suffix i in Expression (12B) is an integer indicating a feature element in the marker, and has a value from 1 to 9. Regarding the alignment of the left eye LE, a square sum is derived.

$$E_L = \Sigma_{i=1}^9 ((u_{li} - x_{imli})^2 + (v_{li} - y_{imli})^2) \quad (13B)$$

Even when a user performs an alignment between the marker displayed on the right optical image display section 26B and the real marker RL in the right eye RE, a square sum is derived similarly.

$$E_R = \Sigma_{i=1}^9 ((u_{ri} - x_{imri})^2 + (v_{ri} - y_{imri})^2) \quad (14B)$$

A cost function E is defined by a sum of $E_R$ and $E_L$.

$$E = E_R + E_L \quad (15B)$$

A parameter for making minimization (global minimum) of E is obtained by optimized calculation which is associated with iterative calculation such as a Gauss-Newton method.

In the present embodiment, the camera parameter CP of the camera 60B, rotation ($R_{cam2left}$) and translation ($T_{cam2left}$) from the coordinate system of the camera 60B to the coordinate system of the left optical image display section 28B, and rotation ($R_{cam2right}$) and translation ($T_{cam2right}$) from the coordinate system of the camera 60B to the coordinate system of the right optical image display section 26B are derived by optimization.

A Jacobian matrix which is used in the iterative calculation for minimizing the cost function E represented by Expression (15B) is expressed as in Expression (16B).

$$J_L = \begin{bmatrix} \dfrac{\partial x_{iml_i}}{\partial p} \\ \dfrac{\partial y_{iml_i}}{\partial p} \end{bmatrix} \quad (16B)$$

Here, variables $X_{mli}$ and $y_{mli}$ on the right side of Expression (16B) are represented by Expressions (10B) and (11), respectively, and $x_{cl}$ and $y_{cl}$ in Expression (10B) and (11B) are represented by Expression (6B). In addition, variables p on the right side of Expression (16B) are Fx, Fy, Cx, and Cy included in the camera parameter CP of the camera 60B, six Euler angles constituting rotations $R_{cam2left}$ and $R_{cam2right}$ indicating spatial relationships between the camera 60B and the optical image display sections 26B and 28B, and six translation components constituting translations $T_{cam2left}$ and $T_{cam2right}$. The processor 167B can search for the global minimum of Expression (15B) on the basis of the Jacobian matrix of Expression (16B) and the minute amount of change of the variable p.

C-3-2. Spatial Parameter

As described in the above, in the present embodiment, the processor 167B calculates spatial parameters PM2 [$R_{cam2left}$ $t_{cam2left}$] and [$R_{cam2right}$ $t_{cam2right}$] corresponding to the right optical image display section 26B and the left optical image display section 28B, respectively. The rotation matrix $R_{cam2right}$ contains three parameters determined by rotations around three axes orthogonal to each other, and the translation matrix $T_{cam2right}$ contains three parameters corresponding to respective translations along the three axes. That is, the spatial parameter PM corresponding to the right optical image display section 26B includes a total of six parameters. Likewise, the spatial parameter PM corresponding to the left optical image display section 28B is a rotation matrix $R_{cam2left}$ and a translation matrix $T_{cam2left}$, and includes a total of six parameters. That is, in the present embodiment, sixteen parameters of four parameters included in the camera parameter, and twelve parameters indicating a spatial relationship are calculated.

The processor 167B captures the real marker RL in a condition that a user visually perceives that the real marker RL and the marker image IMG align with each other, and acquires a captured image. The processor 167B calculates the spatial parameters PM using Expression (15B) on the basis of the captured images. In the present embodiment, values in one pose when the camera 60B or the optical image display sections 26B and 28B is relatively moved maximally or values in an intermediate pose of the movable range are used as initial values (i=0) when the spatial parameters PM are calculated. Measurement values or test values before the HMD 100B is shipped from a manufacturing factory may also be used as the initial values.

When the spatial parameter PM is calculated, with the aim of a user's determination, the processor 167B displays an image for determination so as to perform superposition or overlay in conformity with the position of the real marker RL when the real marker RL is included in the imaging range of the camera 60B, using the calculated spatial parameters PM. When the internal coordinates of the real marker are defined by X, the spatial parameter PM is used, and the position (u, v) of a display image in the left optical image display section 28B is represented as in Expression (17B).

$$\begin{bmatrix} u \\ v \end{bmatrix} \simeq RP[R_{cam2left}, T_{cam2left}][R_{obj2cam}, T_{obj2cam}] \cdot X \quad (17B)$$

Here, [$R_{obj2cam}$, $T_{obj2am}$] are parameters (rotation matrix and translation matrix) indicating a spatial relationship between the real marker RL and the camera 60B, and these parameters are calculated by the processor 167B by applying, for example, nomography to the captured image of the real marker RL which is captured by the camera 60B. When a real object other than the real marker is detected, a spatial relationship between the real object and the camera 60B is derived by other methods. Meanwhile, regarding the right optical image display section 26B, the position (u, v) in a display image (or an image frame) is also derived by the same relational expression as Expression (17B). As shown in Expression (17B), the AR object is displayed with u and v at a position which is determined based at least on a spatial relationship between the real object (in this case, real marker RL) and the camera 60B and a spatial relationship between the camera 60B and the optical image display sections 26B and 28B, and thus it is possible to cause a user of the HMD 100B to visually perceive that at least one of the position, size and orientation of the AR object (in this case, image for determination) aligns with at least one of the position, size and orientation of the real object. Meanwhile, RP on the right side in Expression (17B) is a projection parameter (or also called a rendering parameter) which is determined when the same projection model as a pinhole camera model is used, and is represented as in the following Expression (18B) in the present embodiment.

$$RP = \begin{bmatrix} \frac{2}{W}F_x & 0 & 1 - \frac{2C_x}{W} & 0 \\ 0 & \frac{2}{H}F_y & 1 - \frac{2C_y}{H} & 0 \\ 0 & 0 & -\frac{(n+f)}{f-n} & \frac{-2nf}{f-n} \\ 0 & 0 & -1 & 0 \end{bmatrix} \quad (18B)$$

Here, Fx and Fy in Expression (18B) are a focal length converted into the number of pixels of a projector in the HMD 100B, W is the number of pixels (resolution) of the left optical image display section 28B in a horizontal direction, H is the number of pixels (resolution) of the left optical image display section 28B in a vertical direction, and Cx and Cy are the central position of the display image. Upper two rows of the projection parameter contribute to the derivation of u and v. Here, f and n are coefficients for determining a correspondence relationship with a normalized device coordinates having a depth normalized between 0 and 1. That is, these are coefficients for adjusting a depth in a rendering buffer (depth buffer), but are not directly involved in the derivation of the position (u, v) of the display image, and thus the description thereof will not be given.

Figure 15:
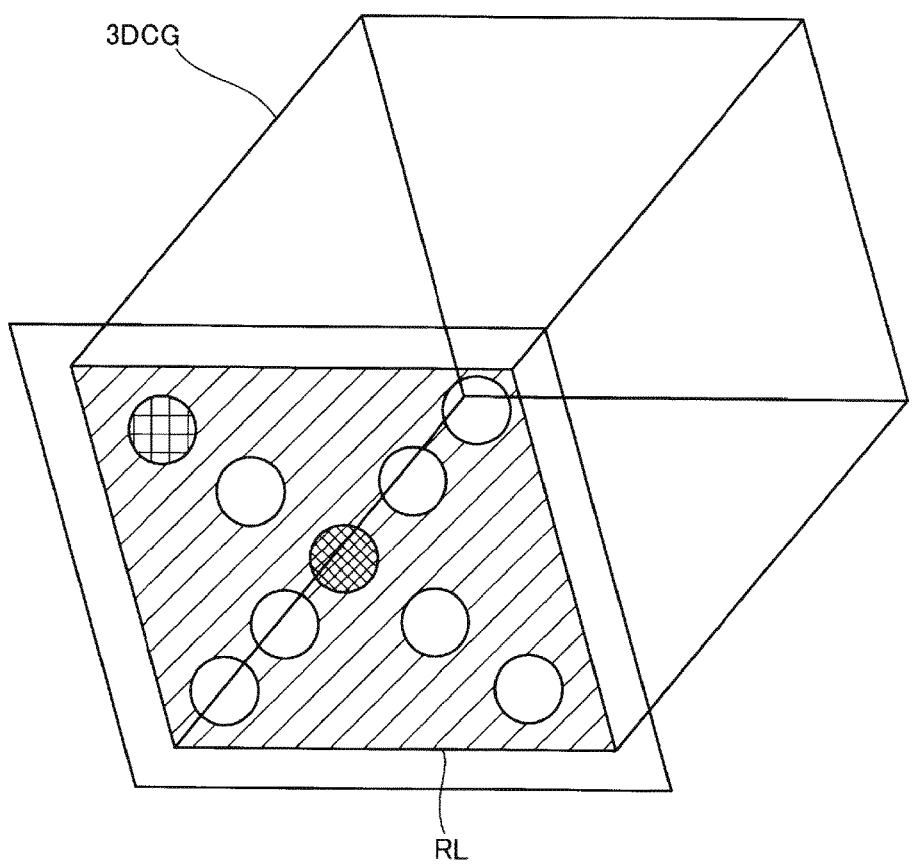
FIG. 15 is a diagram illustrating a state where the real marker and an image for determination are visually perceived by a user.

In the present embodiment, when the calibration is suitably performed, a user wearing the HMD 100B visually perceives that the position, size, and direction of the image for determination which is displayed on the optical image display sections 26B and 28B are coincident with the position, size, and direction of the real marker RL. FIG. 15 illustrates a state where the real marker RL and an image for determination 3DCG are visually perceived by a user. FIG. 15 illustrates a state where a user visually perceives the real marker RL and the image for determination 3DCG so that the position, size and direction of the image for determination 3DCG are coincident with the position, size, and direction of the real marker RL. The image for determination 3DCG is an image represented by a three dimensional stereoscopic rectangular parallelepiped so as to correspond to the real marker RL. In the image for determination 3DCG, only a straight line equivalent to each side indicating a rectangular parallelepiped is displayed, and a display as an image is not present in the inside of the rectangular parallelepiped. In other words, regarding the inside of the rectangular parallelepiped, a user can visually perceive a transparent outside scene including the real marker RL and the like. When a user does not visually perceive that the real marker RL and the image for determination 3DCG align with each other, it is possible to resume the calibration. In FIG. 15, the optical image display sections 26B and 28B or the voice processing section 170B may provide a user with a character image or a voice for urging the user to perform any of the continuation of an AR display function subsequent to success of calibration (the user can visually perceive superposing) or the resumption of the calibration.

The processor 167B causes the optical image display sections 26B and 28B to display the AR image so as to correspond to the position of the real object, using a matrix as the derived spatial parameters PM. Meanwhile, the real object corresponds to an object in the SUMMARY, and the AR image corresponds to a counterpart image in the SUMMARY.

As described above, when the captured image of the real marker RL is captured in a condition that a user visually perceives that the marker image IMG displayed on the right optical image display section 26B or the left optical image display section 28B is overlaid on the real marker RL, the processor 167B derives the camera parameter CP of the camera 60B and a spatial relationships between the camera 60B and the optical image display sections 26B and 28B, based at least on the captured images. Therefore, in the HMD 100B of the present embodiment, even when the camera 60B that captures the outside scene SC moves relative to the image display section 20B, it is possible to derive a spatial relationship between the camera 60B and the image display section 20B. Therefore, the HMD 100B can cause the user US to visually perceive that the AR image is superimposed on a corresponding real object. In addition, in the HMD 100B of the present embodiment, devices other than the HMD 100B are not required in order to execute the calibration, and the user may just move the head in a range capable of visually perceiving the real marker RL which is disposed in the controller 10B. Thus, in the HMD 100B of the present embodiment, it is possible to easily execute the calibration.

In addition, in the HMD 100B of the present embodiment, the processor 167B causes the optical image display sections 26B and 28B to display the AR image so as to correspond to the position and pose of the captured real object, using the camera parameter CP and the spatial parameters PM. Therefore, in the HMD 100B of the present embodiment, it is possible to cause the optical image display sections 26B and 28B to display the AR image so as to correspond to the position of the real object with a good degree of accuracy.

D. Modification Examples

Meanwhile, the invention is not limited to the above-mentioned embodiments, and can be implemented in various aspects without departing from the scope of the invention. For example, the following modifications can be made.

D-1. Modification Example 1B

In the above embodiment, the processor 167B also derives the camera parameter CP through optimization, but when a variation from a design value during manufacturing is small, the processor may set a design value with respect to the camera parameter CP, and may derive only the spatial relationships between the camera 60B and the optical image display sections 26B and 28B. In the HMD 100B of this modification example, the number of parameters p to be optimized is reduced. In addition, a design value is substituted into a parameter having a small manufacturing variation, and thus it is possible to shorten calculation time while performing the optimization of a parameter for further reducing the cost function E.

D-2. Modification Example 2B

Figure 16:
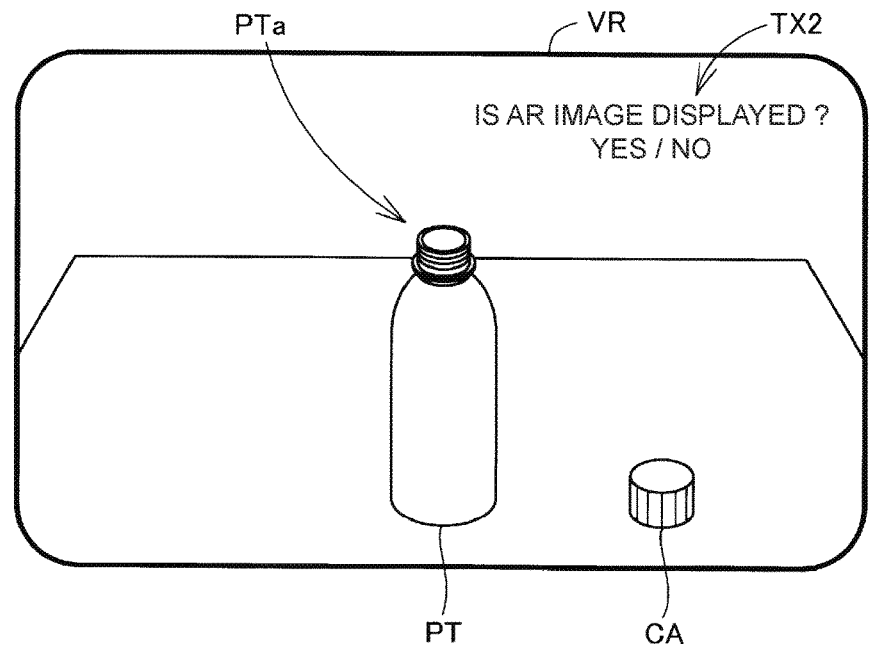
FIG. 16 is a diagram illustrating a field of view of a user before and after an AR image is displayed so as to correspond to the position of an AR object.
Figure 17:
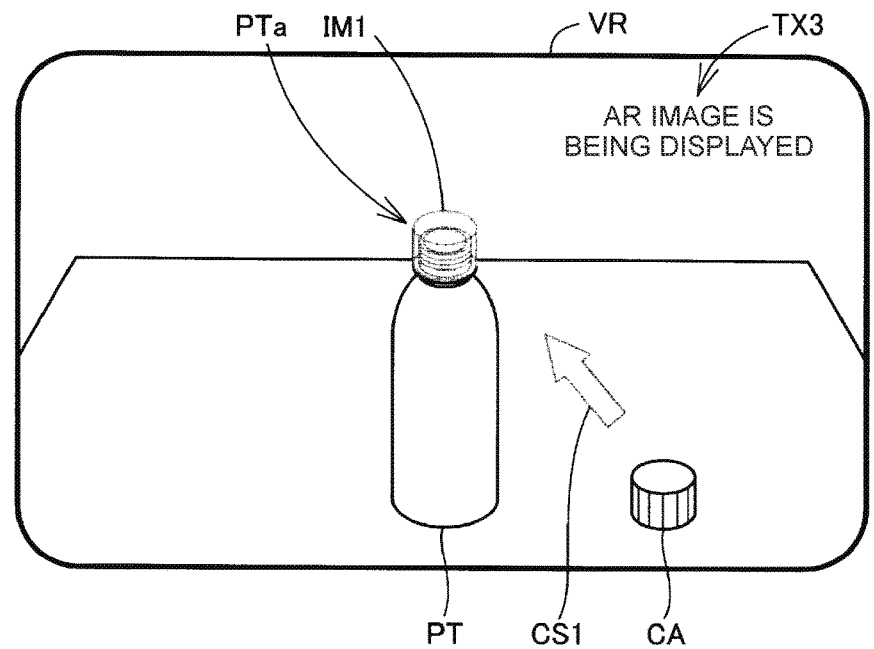
FIG. 17 is a diagram illustrating a field of view of a user before and after the AR image is displayed so as to correspond to the position of an AR object.

FIGS. 16 and 17 are diagrams illustrating a field of view VR of a user before and after the AR image is displayed so as to correspond to the position of a real object. The calibration according to the above embodiment is completed. FIG. 16 illustrates a field of view VR before the AR image is displayed, and FIG. 17 illustrates a field of view VR after the AR image is displayed. The marker specifying section 166B of the HMD 100B of the present embodiment detects a plastic bottle body PT and a cap CA of the plastic bottle body PT as the real objects from the imaging range of the camera 60B through pattern matching or the like. When the plastic bottle body PT and the cap CA are detected in a condition different from a position condition which is set in advance, the processor 167B causes the optical image display sections 26B and 28B to display the AR image. Unlike the case of FIG. 16, the position state which is set in advance is a state where the cap CA is present at the position of an opening PTa of the plastic bottle body PT, that is, the plastic bottle body PT is closed by the cap CA.

When the plastic bottle body PT and the cap CA are not present in the position state which is set in advance (in the case of FIG. 16), the processor 167B causes the optical image display sections 26B and 28B to display a character image TX2 for inquiring of a user about whether the AR image is displayed. The character image TX2 contains characters of "is AR image displayed? YES/NO". The processor 167B determines whether the AR image is to be displayed, through an operation accepted by the operating section 135B.

FIG. 17 illustrates a cursor image CS1 and a cap image IM1 as the AR images displayed on the optical image display sections 26B and 28B when the processor 167B determines that the AR image is displayed. The processor 167B represents a destination position to which the cap CA which is a real object is moved, using the cap image IM1 and the cursor image CS1 as the AR images. In addition, the processor 167B causes the optical image display sections 26B and 28B to display a character image TX3 for informing the user that the AR image is displayed. The character image TX3 contains characters of "AR image is being displayed" indicating that the AR image is displayed.

As described above, in the HMD 100B of this modification example, the processor 167B causes the optical image display sections 26B and 28B to display the character image TX2 for causing a user to determine whether the AR image is to be displayed. Therefore, in the HMD 100B of this modification example, it is possible to execute a display of the AR image obtained by reflecting a user's intention.

D-3. Modification Example 3B

In the above embodiment, the first parameter PM1 is a matrix for transforming from the real marker coordinate system to the camera coordinate system, but reversely, may be a matrix for transforming from the camera coordinate system to the real marker coordinate system. The spatial parameter PM is a matrix for transforming from the camera coordinate system to the coordinate system of the image display section, but reversely, may be a matrix for transforming from the coordinate system of the image display section to the camera coordinate system.

As the above embodiment, a measurement value(s) or a test value(s) upon shipping is used as an initial value(s) (i=0) when the spatial parameter PM is calculated, but values acquired by other methods may be used. For example, the initial value may be set on the basis of a value acquired by an IMU that detects the acceleration or angular velocity of each movable portion in the HMD 100B, or an encoder that detects a change in position.

D-4. Modification Example 4B

In the above embodiment, a total of two times of image capture of the outside scene SC of a case where the marker image IMG is displayed on the right optical image display section 26B and a case where the marker image IMG is displayed on the left optical image display section 28B has been performed, but the number of image capture which is performed in order to execute the calibration can be modified variously. For example, the processor 167B may execute the optimization of a parameter through one-time image capture of the outside scene SC in a condition that the marker image IMG is displayed on the right optical image display section 26B. On the other hand, the number of times more than two times of image capture of the outside scene SC including the real marker RL is performed, and thus the processor 167B may execute the optimization of a parameter for reducing the cost function E. In addition, unlike the above embodiment, in a case of a monocular HMD, the marker image IMG is displayed on the image display section corresponding to one eye or on one image display section (that is, monocular HMD) corresponding to both eyes, and thus the calibration may be executed.

In the above embodiment, the marker displayed on the right optical image display section 26B and the marker displayed on the left optical image display section 28B are the same marker image IMG, but the marker image IMG and the real marker RL can be modified variously. For example, the image of the marker displayed on each of the right optical image display section 26B and the left optical image display section 28B may be an image of a different marker. In addition, the marker image IMG and the real marker RL are not limited to the image of the marker MK1, and can be modified variously in accordance with the accuracy of the derived parameter. For example, the number of circles included in the marker MK1 is not limited to nine, and may be made greater or less than nine. In addition, a plurality of features included in the marker MK1 may be the center of the circle, and may simply be a triangular centroid. In addition, a plurality of straight lines which are not in parallel to each other may be formed inside the marker MK1, and thus the point of intersection between the straight lines may be specified as a plurality of features. In addition, the marker image IMG and the real marker RL may be different markers. When the marker image and the real marker are overlaid on each other, the marker image and the real marker can be modified variously in a range in which a user can perceive which portions thereof are overlaid on each other. For example, an alignment may be performed in which the center of a substantially circular real marker is made to fit in with the center of a rectangular the marker image so that the circle is inscribed in the rectangular.

In the above embodiment, when the camera parameter CP of the camera 60B is optimized, the focal length (Fx, Fy) and the camera principal-point position (Cx, Cy) are optimized, but instead thereof or together therewith, one of distortion coefficients may be optimized as the camera parameter CP of the camera 60B.

E. Third Embodiment

E-1. Configuration of Head-Mounted Display Device

Figure 18:
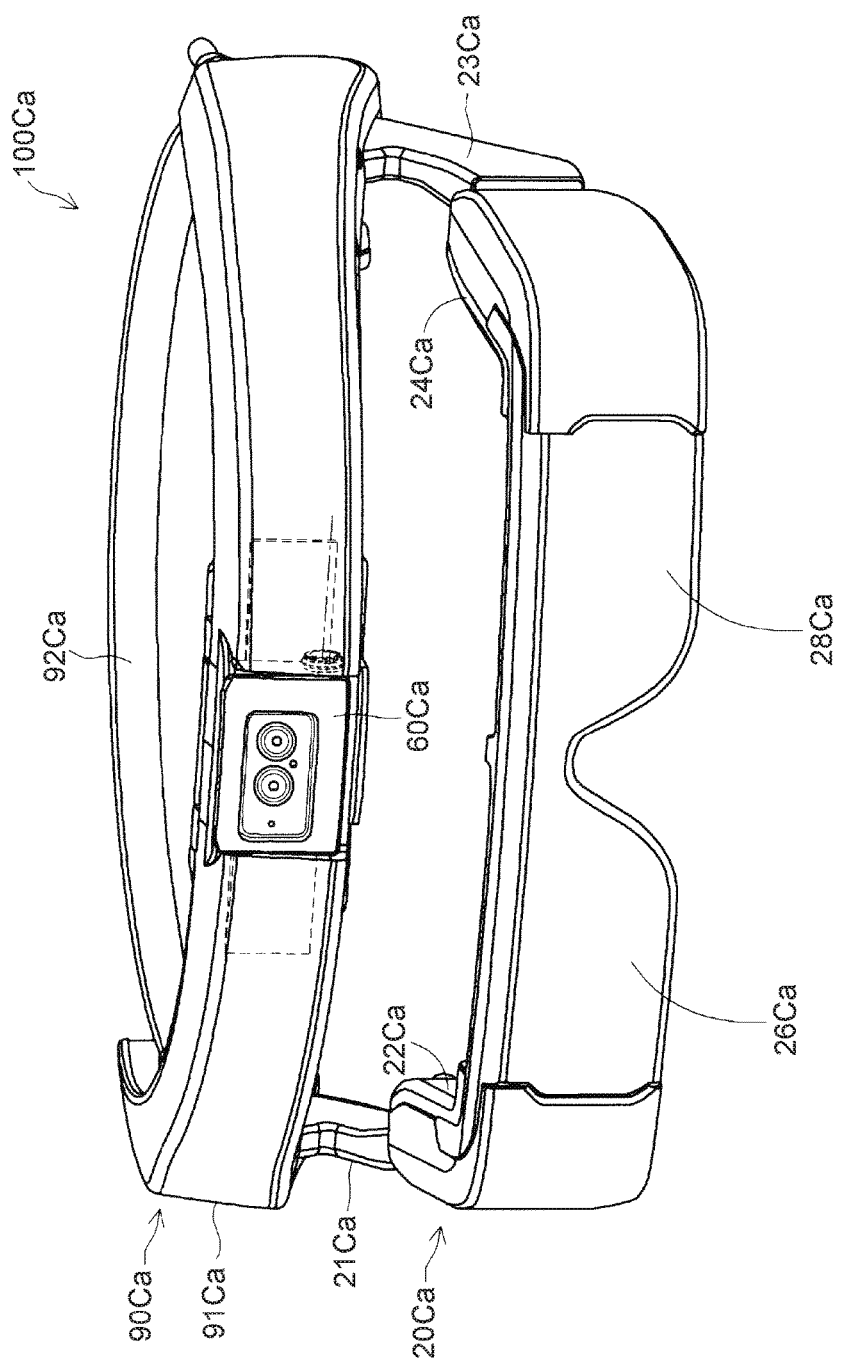
FIG. 18 is a diagram illustrating an exterior configuration of a head-mounted display device (HMD) that performs calibration.
Figure 19:
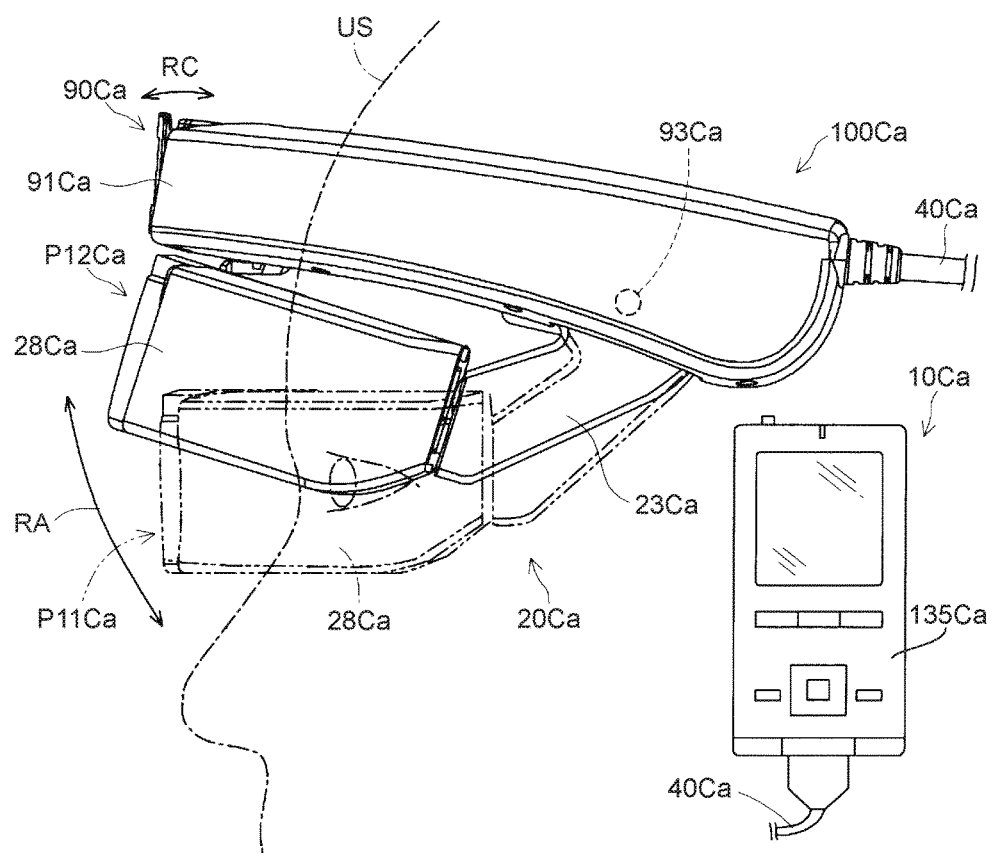
FIG. 19 is a diagram illustrating an exterior configuration of the head-mounted display device (HMD) that performs calibration.
Figure 20:
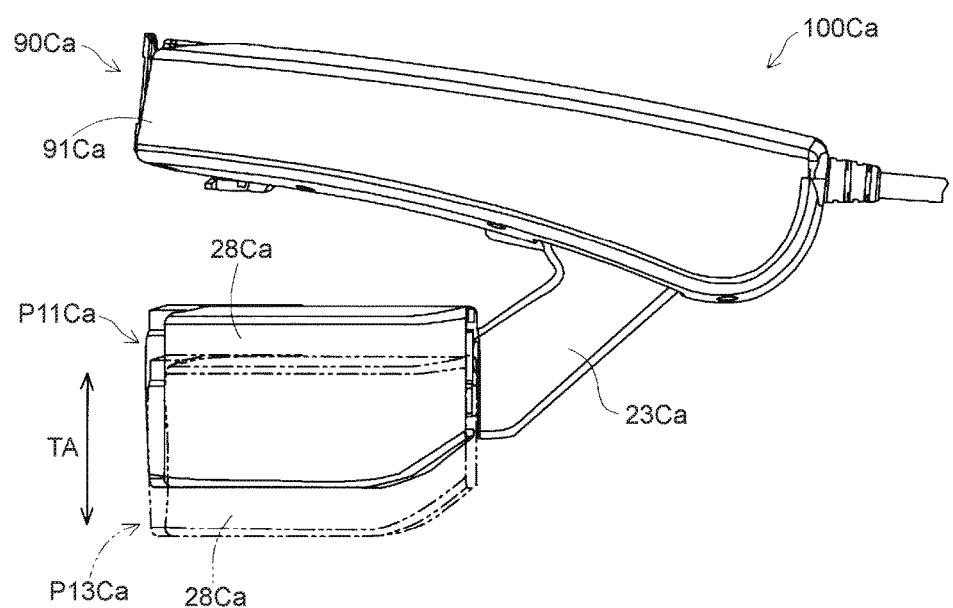
FIG. 20 is a diagram illustrating an exterior configuration of the head-mounted display device (HMD) that performs calibration.

FIGS. 18 to 20 are diagrams illustrating an exterior configuration of a head-mounted display device 100Ca (HMD 100Ca) that performs calibration. The HMD 100Ca can make a user visually perceive a display image displayed on an image display section 20Ca and can make the user visually perceive an outside scene by light from the outside scene passing through the image display section 20Ca (FIG. 18). Although a detailed configuration thereof will be described later, the HMD 100Ca according to the present embodiment includes image display sections corresponding to the right and left eyes of a user wearing the image display section 20Ca to thereby allow the user's right and left eyes to visually perceive separate images.

As illustrated in FIG. 19, the HMD 100Ca includes a mounting band 90Ca mounted on the head of a user US, the image display section 20Ca connected to the mounting band 90Ca, a control section 10Ca (controller 10Ca) controlling the image display section 20Ca, and a connection portion 40Ca connecting the control section 10Ca and the mounting band 90Ca to each other. As illustrated in FIG. 18, the mounting band 90Ca includes a mounting base portion 91Ca made of a resin, a belt portion 92Ca made of cloth and connected to the mounting base portion 91Ca, and a camera 60Ca. The mounting base portion 91Ca has a shape curved in accordance with the shape of a human's sinciput. The belt portion 92Ca is a belt to be mounted to the vicinity of a user's head. Meanwhile, the connection portion 40Ca connects the mounting band 90Ca and the control section 10Ca side to each other in a wired manner, but the connected portion therebetween is not shown in FIG. 19.

The camera 60Ca is capable of capturing an outside scene and is disposed at the central portion of the mounting base portion 91Ca. In other words, the camera 60Ca is disposed at a position corresponding to the center of a user's forehead with the mounting band 90Ca mounted on the user's head. For this reason, the camera 60Ca captures an outside scene which is scenery on the outside in a direction of a user's eye gaze direction in a state where the user wears the mounting band 90Ca on his or her head, and acquires the captured image. As illustrated in FIG. 19, the camera 60Ca is movable with respect to the mounting base portion 91Ca in a predetermined range along an arc RC. In other words, the camera 60Ca can change an imaging range in a predetermined range.

As illustrated in FIG. 19, the image display section 20Ca is connected to the mounting base portion 91Ca through a coupling portion 93Ca and has a shape of a pair of spectacles. The coupling portions 93Ca are respectively disposed on both sides of the mounting base portion 91Ca and the image display section 20Ca so as to be symmetrical to each other, and the position of the image display section 20Ca with respect to the mounting base portion 91Ca is movably supported along the arc RA centering on the coupling portion 93Ca. In FIG. 19, a position P11Ca indicated by a two-dot chain line is the lowermost position of the image display section 20Ca along the arc RA. In addition, a position P12Ca indicated by a solid line in FIG. 19 is the uppermost position of the image display section 20Ca along the arc RA.

In addition, as illustrated in FIGS. 18 and 20, optical image display sections 26Ca and 28Ca including a display panel capable of displaying an image move in parallel with holding sections 21Ca and 23Ca along a straight line TA in a predetermined range to thereby change their positions. In FIG. 20, a position P13Ca indicated by a two-dot chain line is the lowermost position of the optical image display sections 26Ca and 28Ca along the straight line TA. In FIG. 20, a position P11Ca indicated by a solid line is the uppermost position of the optical image display sections 26Ca and 28Ca along the straight line TA. Meanwhile, the position P11Ca in FIG. 19 and the position P11Ca in FIG. 20 indicate the same position.

As illustrated in FIG. 18, the image display section 20Ca includes the right holding section 21Ca, a right display driving section 22Ca, the left holding section 23Ca, a left display driving section 24Ca, the right optical image display section 26Ca, and the left optical image display section 28Ca. The right optical image display section 26Ca and the left optical image display section 28Ca are disposed so as to be positioned in front of a user's right and left eyes, respectively, when the user wears the image display section 20Ca. An end of the right optical image display section 26Ca and an end of the left optical image display section 28Ca are connected to each other at a position corresponding to a user's glabella when the user wears the image display section 20Ca.

The right holding section 21Ca is a member which is provided so as to extend to the coupling portion 93Ca connected to the mounting base portion 91Ca from the other end of the right optical image display section 26Ca. Similarly, the left holding section 23Ca is a member which is provided so as to extend to the coupling portion 93Ca from the other end of the left optical image display section 28Ca. The right display driving section 22Ca and the left display driving section 24Ca are disposed on sides corresponding to a user's head when the user wears the image display section 20Ca.

The display driving sections 22Ca and 24Ca include liquid crystal displays 241Ca and 242Ca (hereinafter, also referred to as "LCDs 241Ca and 242Ca") to be described later in FIG. 19, projection optical systems 251Ca and 252Ca, and the like. Configurations of the display driving sections 22Ca and 24Ca will be described in detail later. The optical image display sections 26Ca and 28Ca include light guiding plates 261 and 262 (see FIG. 21) and a light control plate which will be described later. The light guiding plates 261 and 262 are formed of a light transmissive resin material or the like, and guide image light which is output from the display driving sections 22Ca and 24Ca to a user's eyes. The light control plate is an optical element having a thin plate shape, and is disposed so as to cover the front side of the image display section 20Ca which is opposite to a side of a user's eyes. The light transmittance of the light control plate is adjusted, and thus it is possible to adjust the easiness of visual recognition of an imaginary image by adjusting the amount of external light entering a user's eyes.

The control section 10Ca is an apparatus for controlling the HMD 100Ca. The control section 10Ca includes an operation input section 135Ca including an electrostatic track pad, a plurality of buttons capable of being pressed, or the like.

Figure 21:
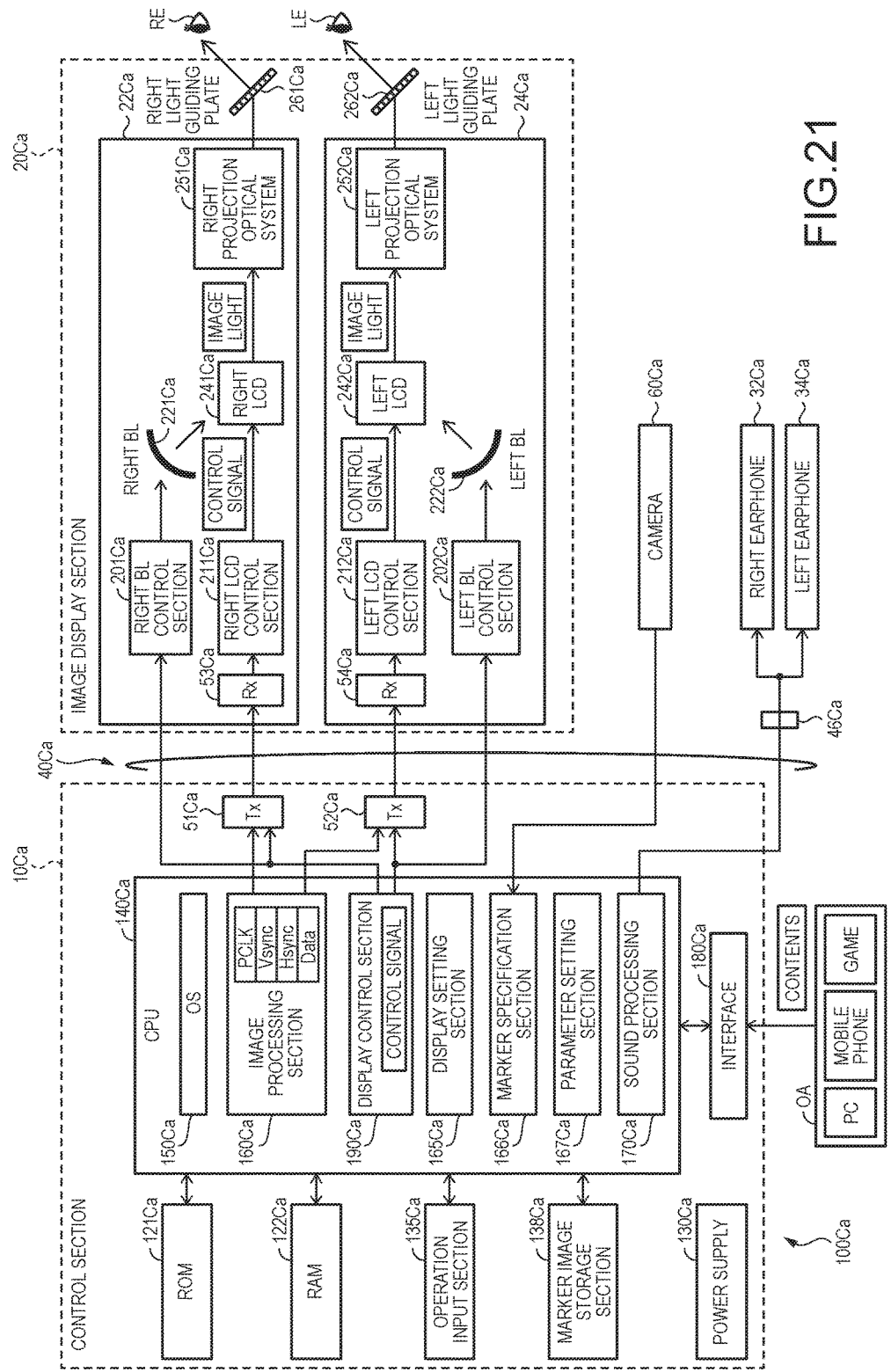
FIG. 21 is a functional block diagram illustrating a configuration of an HMD.

FIG. 21 is a functional block diagram illustrating a configuration of the HMD 100Ca. As illustrated in FIG. 21, the control section 10Ca includes a ROM 121Ca, a RAM 122Ca, a power supply 130Ca, an operation input section 135Ca, a marker image storage section 138Ca, a CPU 140Ca, an interface 180Ca, a transmission section 51Ca (Tx51Ca), and a transmission section 52Ca (Tx52Ca).

The power supply 130Ca supplies power to each section of the HMD 100Ca. The ROM 121Ca stores various computer programs. The CPU 140Ca to be described later expands various types of computer programs stored in the ROM 121Ca to the RAM 122Ca to thereby execute the various types of computer programs.

The marker image storage section 138Ca stores data of a model marker (also referred to as a marker model) which is used for calibration and/or a marker image IMG as an image for calibration which is displayed on the right optical image display section 26Ca or the left optical image display section 28Ca. The marker image storage section 138Ca may store a marker image displayed on the right optical image display section 26Ca and a marker image displayed on the left optical image display section 28Ca as the same marker image IMG. Examples of the marker image IMG to be used include an image of a two-dimensional model marker, data of the above-mentioned model marker (2D) expressed in a three-dimensional model space (3D computer graphic space), or the model marker which is projected on the basis of a projection parameter of each of the right optical image display section 26Ca or the left optical image display section 28Ca. In other words, the marker image IMG is an image obtained by two-dimensionally expressing the shape of a two-dimensional or three-dimensional real marker MK1 which is present as an actual object. Meanwhile, the real marker MK1 corresponds to an identification marker in the SUMMARY.

Figure 22:
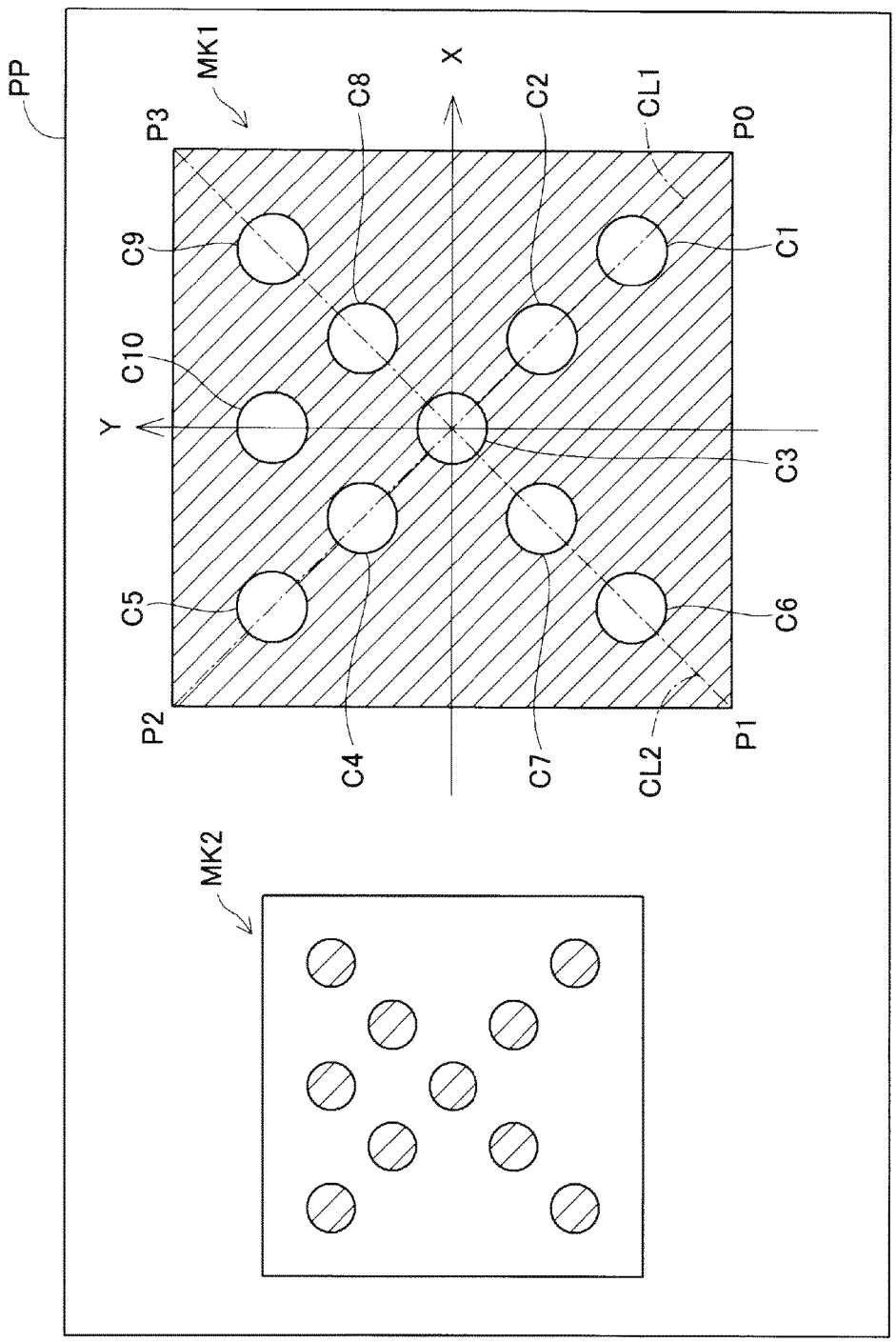
FIG. 22 is a diagram illustrating two-dimensional real markers printed on paper.

FIGS. 22 to 25 are diagrams illustrating two-dimensional real markers printed on paper PP. FIG. 22 illustrates real markers MK1 and MK2 as two markers that are used for calibration according to the present embodiment. As illustrated in FIG. 22, the real marker MK1 is a marker including ten circles in a square formed by connecting four vertexes P0, P1, P2, and P3 by a straight line. The centers of five circles among the ten circles are present on a diagonal line CL1 connecting the vertex P0 and the vertex P2. The five circles are circles C1, C2, C3, C4, and C5 from a circle close to the vertex P0 along the diagonal line CL1. Similarly, the centers of five circles among the ten circles are present on a diagonal line CL2 connecting the vertex P1 and the vertex P3. The five circles are circles C6, C7, C3, C8, and C9 from a circle close to the vertex P1 along the diagonal line CL2. The circle C3 is on an intersection between the diagonal line CL1 and the diagonal line CL2 and is a circle centering on a point which is the centroid of the square. A circle C10, which is one circle among the ten circles, is on a line which passes through the centroid of the square is parallel to a straight line connecting P1 and P2. The circle C10 is on another line which passes through the circles C5 and C9 and is parallel to the X-axis. In other words, the circle C10 is a circle having a center between the center of the circle C5 and the center of the circle C9.

In the present embodiment, distances between the centers of circles adjacent to each other in five circles having the center on the diagonal line CL1 are set to be the same as each other. Similarly, distances between the centers of circles adjacent to each other in five circles having the center on the diagonal line CL2 are set to be the same as each other. In addition, a distance between the centers of circles, having the center on the diagonal line CL1, which are adjacent to each other and a distance between the centers of circles, having the center on the diagonal line CL2, which are adjacent to each other are the same distance. Meanwhile, only the circle C10 among the ten circles differs from the other circles in a distance between the center thereof and the center of each of the other circles. The sizes of the ten circles are the same as each other in the present embodiment, however, the size of the circle 10 may be different from those of the other circles. Meanwhile, the diagonal line CL1, the diagonal line CL2, the X-axis, and the Y-axis are illustrated in FIG. 22 for convenience of description of the real marker MK1, and are straight lines that are not included in a real marker MK1.

In FIG. 22, a difference in color is shown by changing hatching. Specifically, a hatched portion in FIG. 22 is black in color, and the other portions are white in color. For this reason, as illustrated in FIG. 22, the real marker MK1 is formed of a black square, which is surrounded with a white color, on white paper PP, and white ten circles are formed in the square.

Figure 23:
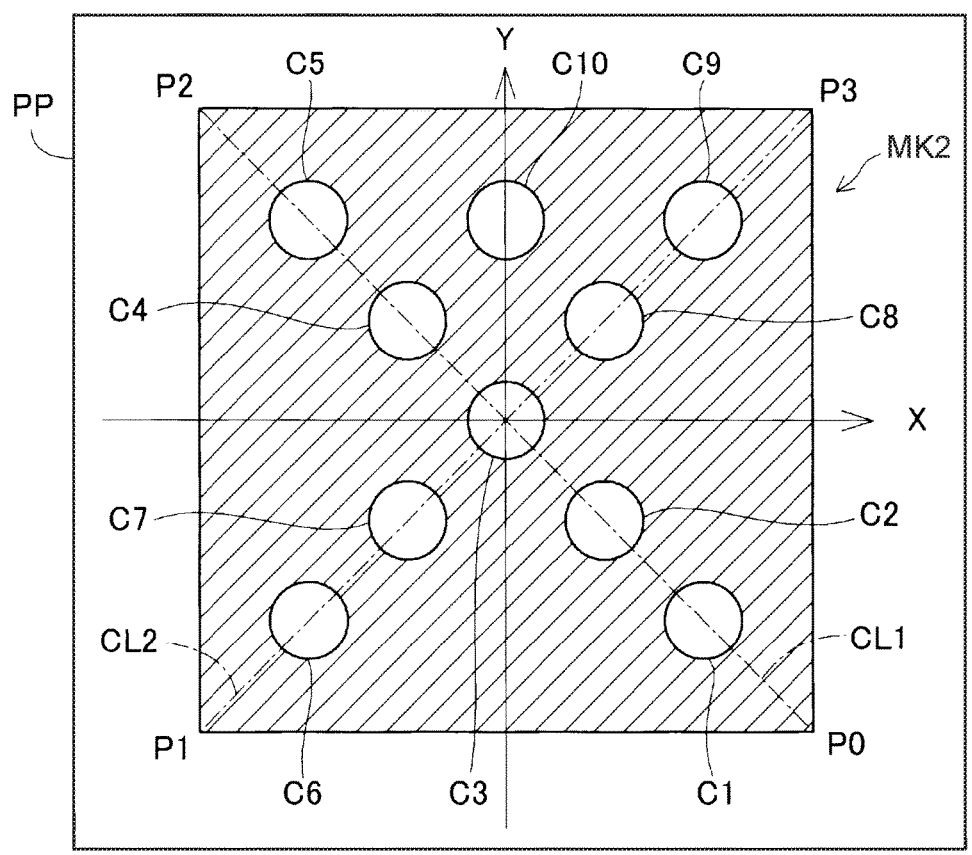
FIG. 23 is a diagram illustrating a two-dimensional real marker printed on paper.
Figure 24:
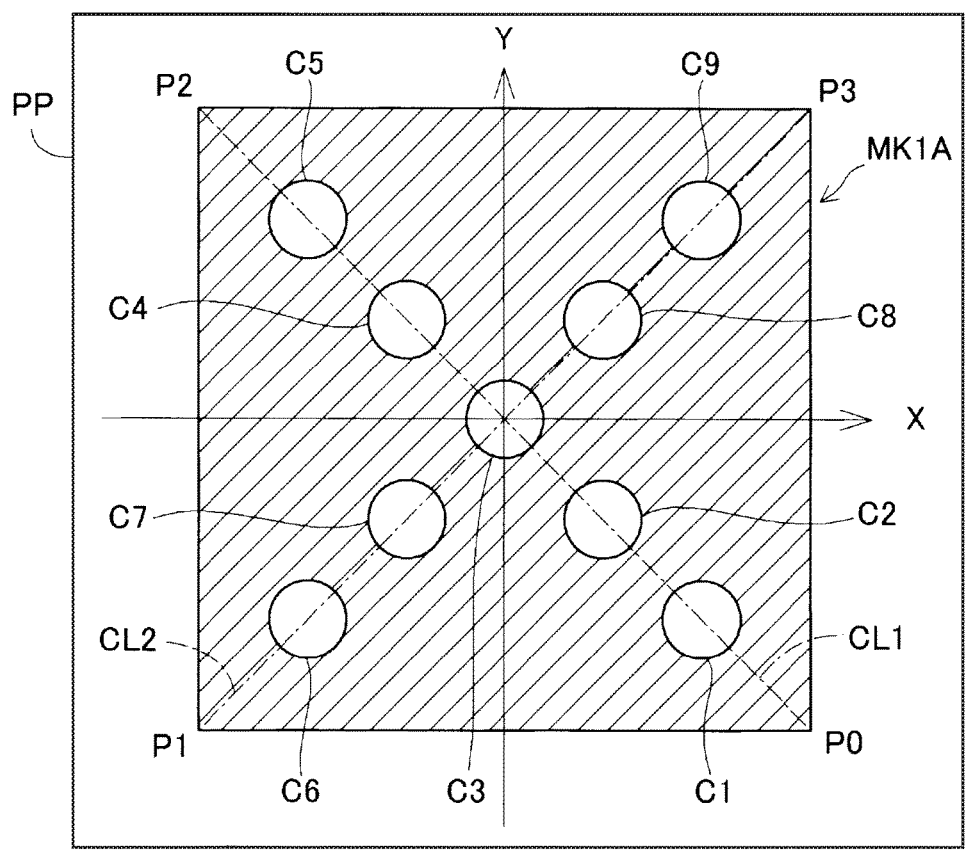
FIG. 24 is a diagram illustrating a two-dimensional real marker printed on paper.
Figure 25:
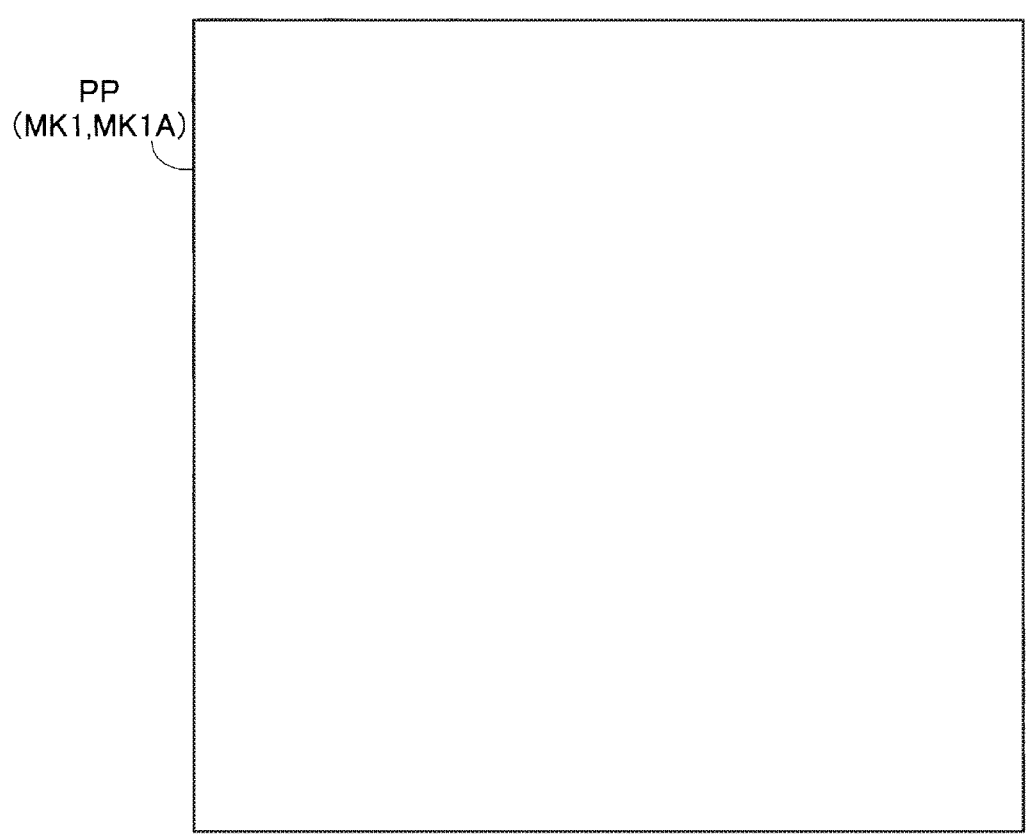
FIG. 25 is a diagram illustrating two-dimensional real markers printed on paper.

The real marker MK2 illustrated in FIG. 22 is a marker which is created on the basis of the real marker MK1. The real marker MK2 is a marker obtained by reducing the size of the real marker MK1 and reversing a black color and a white color. For this reason, as illustrated in FIG. 22, the real marker MK2 is formed by a white square surrounded by a black color (as shown with a black line), and black ten circles are formed in the square. In the present embodiment, the marker image storage section 138Ca stores a marker image IMG which is a two-dimensional image of the real marker MK1. Meanwhile, as illustrated in FIG. 23, a real marker MK2 may be separated from a real marker MK1. In addition, as illustrated in FIG. 24, a real marker MK1A that does not include a circle, which is not present on a diagonal line, may be adopted instead of a real marker MK2 (MK1). Meanwhile, as illustrated in FIG. 25, the rear faces of real markers MK1, MK2, and MK1A are not required to have features of a shape, a pattern, or a color.

The CPU 140Ca illustrated in FIG. 21 expands computer programs stored in the ROM 121Ca to the RAM 122Ca to thereby function as an operating system 150Ca (OS 150Ca), a display control section 190Ca, a sound processing section 170Ca, an image processing section 160Ca, a display setting section 165Ca, a marker specification section 166Ca, and a parameter setting section 167Ca.

The display control section 190Ca generates a control signal for controlling the right display driving section 22Ca and the left display driving section 24Ca. The display control section 190Ca controls the generation and emission of image light by each of the right display driving section 22Ca and the left display driving section 24Ca. The display control section 190Ca transmits each of control signals for a right LCD control section 211Ca and a left LCD control section 212Ca through transmission sections 51Ca and 52Ca. In addition, the display control section 190Ca transmits each of control signals for a right backlight control section 201Ca and a left backlight control section 202Ca.

The image processing section 160Ca acquires an image signal included in contents, and transmits the acquired image signal to reception sections 53Ca and 54Ca of the image display section 20Ca through the transmission sections 51Ca and 52Ca.

The sound processing section 170Ca acquires a sound signal included in contents, amplifies the acquired sound signal, and provides the amplified signal to a speaker (not shown) within a right earphone 32Ca and a speaker (not shown) within a left earphone 34Ca which are connected to a coupling member 46.

The display setting section 165Ca displays a marker image IMG based on the data stored in the marker image storage section 138Ca on the right optical image display section 26Ca or the left optical image display section 28Ca. When calibration is executed (during the execution of calibration), the display setting section 165Ca controls the case where the marker image IMG is displayed on the right optical image display section 26Ca and the case where the marker image IMG is displayed on the left optical image display section 28Ca on the basis of an operation received by the operation input section 135Ca. The display setting section 165Ca displays marker images IMG, which having different sizes when the camera 60Ca captures the real marker MK1 and executes calibration and when the camera 60Ca captures the real marker MK2 and executes calibration, on the right optical image display section 26Ca or the left optical image display section 28Ca. In addition, the display setting section 165Ca displays a character image to be described later, or the like on the optical image display sections 26Ca and 28Ca during the execution of calibration.

In the case where a captured image obtained by the camera 60Ca includes paper PP on which the real markers MK1 and MK2 are printed, the marker specification section 166Ca specifies the real markers MK1 and MK2 from the imaged paper PP. Although a specific process for specifying the real markers MK1 and MK2 will be described later, the marker specification section 166Ca extracts coordinate values of four vertexes and ten circles of the real markers MK1 and MK2 to thereby specify the real markers MK1 and MK2 from the captured image. For example, the marker specification section 166Ca distinguishes between black and white portions in the real markers MK1 and MK2 by binarizing a gradation value of the color of the captured image to thereby extract coordinates of the centers of the circles.

The parameter setting section 167Ca sets parameter groups required to set the position of an augmented reality (AR) image, which is displayed on the optical image display sections 26Ca and 28Ca in a state of being associated with a specific object imaged by the camera 60Ca (hereinafter, also referred to as a "specific object"), and the like within a display region. Specifically, the parameter setting section 167Ca sets parameter groups for making a user US visually perceive the AR image in a state where at least one of the position, size, and orientation of the AR image displayed on the optical image display sections 26Ca and 28Ca is associated with at least one of the position, size, and orientation of the specific object. In other words, the parameter setting section 167Ca calculates at least one of the parameter groups for associating a three-dimensional coordinate system (3D) having the origin fixed to the camera 60Ca with a display region (2D) of the optical image display sections 26Ca and 28Ca, by calibration. Meanwhile, hereinafter, a three-dimensional coordinate system having the origin fixed to the camera 60Ca is referred to as a camera coordinate system or a camera frame of reference. In the present embodiment, as a coordinate system other than the camera coordinate system, a real marker coordinate system having the origin of the real marker MK1 or the real marker MK2 as a reference, an object coordinate system having a specific object imaged by the camera 60Ca as a reference, a display section coordinate system having the origin of the right optical image display section 26Ca or the origin of the left optical image display section 28Ca as a reference, and the like are defined.

Here, the parameter group includes a "detection system parameter set" and a "display system parameter set". The "detection system parameter set" includes a camera parameter CP regarding the camera 60Ca. The "display system parameter set" includes a "transformation parameter" from 3D to 3D which indicates a spatial relationship between the camera 60Ca and the optical image display sections 26Ca and 28Ca and a "projection parameter" from 3D to 2D for displaying any 3D model (CG model expressed by three-dimensional coordinates) as an image (that is, 2D). These parameters are expressed in a mode of a matrix or a vector as necessary. The notation of "one parameter" may indicate one matrix or one vector, or may indicate one of a plurality of elements included in one matrix or one vector. The parameter setting section 167Ca derives necessary parameters in a parameter group and uses the derived parameters during the display of an AR image. As a result, the HMD 100Ca can make a user US visually perceive the AR image through the image display section 20Ca in a state where at least one of the position, size, orientation, and depth perception of the AR image (AR model) is substantially aligned with those of a specific object. In addition to these, the HMD 100Ca may make appearances such as color or texture aligned with each other.

When calibration is executed, the display setting section 165Ca displays an AR image or a setting image SIM (to be described later) on the right optical image display section 26Ca or the left optical image display section 28Ca. A detailed process using the setting image SIM will be described later.

The interface 180Ca is an interface for connecting various external devices OA serving as content supply sources to the control section 10Ca. Examples of the external device OA include a storage device storing an AR scenario, a personal computer (PC), a mobile phone terminal, a game terminal, and the like. Examples of the interface 180Ca may include a USB interface, a micro USB interface, an interface for a memory card, and the like.

As illustrated in FIG. 21, the image display section 20Ca includes the right display driving section 22Ca, the left display driving section 24Ca, the right light guiding plate 261 as the right optical image display section 26, and the left light guiding plate 262 as the left optical image display section 28Ca.

The right display driving section 22Ca includes the reception section 53Ca (Rx53Ca), the right backlight control section 201Ca (right BL control section 201Ca) and a right backlight 221Ca (right BL 221Ca) which function as a light source, the right LCD control section 211Ca and the right LCD 241Ca which function as a display element, and the right projection optical system. 251Ca. The right backlight control section 201Ca and the right backlight 221Ca function as a light source. The right LCD control section 211Ca and the right LCD 241Ca function as a display element.

The reception section 53Ca functions as a receiver for serial transmission between the control section 10Ca and the image display section 20Ca. The right backlight control section 201Ca drives the right backlight 221Ca on the basis of a control signal which is input. The right backlight 221Ca is a light-emitting body such as an LED or an electroluminescence (EL). The right LCD control section 211Ca drives the right LCD 241Ca on the basis of a control signal which is transmitted from the image processing section 160Ca and the display control section 190Ca. The right LCD 241Ca is a light transmissive liquid crystal panel in which a plurality of pixels are arranged in a matrix.

The right projection optical system 251Ca is constituted by a collimate lens that collimates image light emitted from the right LCD 241Ca into a parallel luminous flux. The right light guiding plate 261 as the right optical image display section 26Ca guides image light emitted from the right projection optical system. 251Ca to a user's right eye RE while reflecting the image light along a predetermined light path. Meanwhile, the left display driving section 24Ca has the same configuration as the right display driving section 22Ca and corresponds to the user's left eye LE, and thus a description thereof will be omitted here.

E-2. Calibration Execution Process

Figure 26:
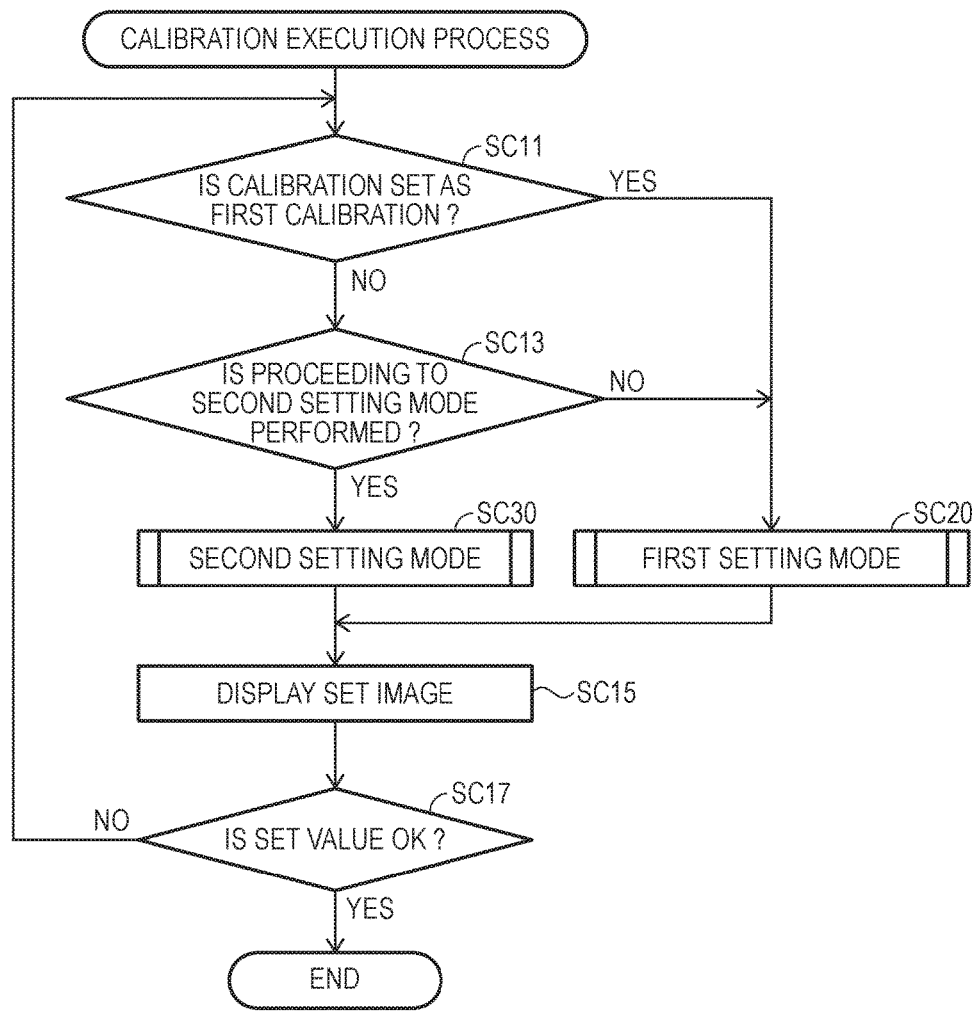
FIG. 26 is a flow chart of a calibration execution process according to the present embodiment.

FIG. 26 is a flow chart of a calibration execution process according to the present embodiment. The calibration execution process according to the present embodiment includes two modes, that is, a first setting mode and a second setting mode. In the first setting mode, the HMD 100Ca causes a user US to perform calibration for each eye. In the second setting mode, the HMD 100Ca causes the user US to perform adjustment on his or her both eyes.

In the calibration execution process, when the operation input section 135Ca first receives a predetermined operation, the parameter setting section 167Ca determines whether or not calibration to be executed from now is set as first calibration (step SC11). The marker image storage section 138Ca stores data regarding whether or not calibration to be executed is first calibration. In the present embodiment, it may be determined for each user US whether or not calibration is first calibration. Specifically, the camera 60Ca may image the shape and pattern of a palm of a user US, and the CPU 140Ca may specify the user US and may determine whether or not calibration is first executed by the user US. The specification of the user US may be performed by an ID card and the HMD 100Ca using near field communication. In the case where it is determined that calibration is set as first calibration (step SC11: YES), the parameter setting section 167Ca proceeds to the first setting mode (step SC20). Although the first setting mode will be described later in detail, the parameter setting section 167Ca displays a marker image IMG separately on the right optical image display section 26Ca or the left optical image display section 28Ca in the first setting mode. Thereafter, the parameter setting section 167Ca sets a transformation parameter and a camera parameter CP using images of real markers MK1 or MK2 which are imaged by the camera 60Ca in a state where the marker image IMG and the real markers MK1 and MK2 are visually perceived by the user US so as to be aligned with each other.

As the process of step SC20, when the parameter setting section 167Ca has executed calibration in the first setting mode, the display setting section 165Ca displays a setting image SIM associated with a specific object on the optical image display sections 26Ca and 28Ca using the set transformation parameter and camera parameter CP (step SC15). In the present embodiment, the specific object is the real markers MK1 or MK2, but is not limited thereto. When the setting image SIM is displayed on the optical image display sections 26Ca and 28Ca, the parameter setting section 167Ca determines whether or not the values of the transformation parameter and the camera parameter CP have been successfully adjusted in response to the operation received by the operation input section 135Ca (step SC17). Specifically, the user US determines whether or not the visual recognition of the user US is performed so that the setting image SIM is associated with the position and orientation (pose) of the specific object, and the user US may operate the operation input section 135Ca according to the determination. In the case where the parameter setting section 167Ca receives an input indicating that the set transformation parameter and camera parameter CP are sufficient (step SC17: YES), the parameter setting section terminates the calibration execution process.

In the process of step SC17, in the case where the parameter setting section 167Ca receives an input indicating that the set transformation parameter and camera parameter CP are not sufficient by a predetermined operation being received by the operation input section 135Ca or receives an input indicating that it is necessary to further adjust size and depth perception (step SC17: NO), the parameter setting section repeatedly performs the process of step SC11 and the subsequent processes. In the process of step SC11, the parameter setting section 167Ca determines that calibration to be executed from now is not set as first calibration (step SC11: NO), the parameter setting section determines whether to proceed to the second setting mode by a predetermined operation being received by the operation input section 135Ca (step SC13). In the case where the parameter setting section 167Ca determines not to proceed to the second setting mode (step SC13: NO) based on an instruction from the user US, the parameter setting section proceeds to the above-described first setting mode (step SC20).

In the process of step SC13, in the case where the parameter setting section 167Ca determines to proceed to the second setting mode (step SC13: YES), the parameter setting section proceeds to the second setting mode (step SC30). The second setting mode will be described later in detail. However, in the second setting mode, the display setting section 165Ca transforms the position and pose of the specific object with respect to the camera 60Ca, which are obtained by capturing the specific object by the camera 60Ca, into the positions and orientations (poses) of the specific object with respect to the right and left optical image display sections 26Ca and 28Ca using the parameter groups which are set in the first setting mode or the second setting mode which has been executed already. The display setting section 165Ca displays the setting image SIM on the right optical image display section 26Ca and the left optical image display section 28Ca with the positions and poses obtained by the transformation. Thereafter, the parameter setting section 167Ca further adjusts some of the parameter groups so as to change the setting image SIM associated with the specific object in response to the predetermined operation being received by the operation input section 135Ca. When the parameter setting section 167Ca executes calibration in the second setting mode, the display setting section 165Ca executes the process of step SC15, and the subsequent processes are repeated.

E-2-1. First Setting Mode

A process in a first setting mode is as follows. The HMD 100Ca causes a user US to perform two alignments each of which is performed at a time with respect to one eye, using two real markers MK1 and MK2 having different sizes, to thereby cause the user to perform a total of four alignments. Specifically, first, the HMD 100Ca displays a marker image IMG on the right optical image display section 26Ca or the left optical image display section 28Ca. The marker image IMG is obtained by projection, that is, rendering a model marker having an imaginary position and pose (3D) to display regions (2D) of the optical image display sections 26Ca and 28Ca with respect to each of the right optical image display section 26Ca and the left optical image display section 28Ca. The imaginary position and pose are fixed with respect to the optical image display sections 26Ca and 28Ca in the present embodiment, but may be variable. The user US moves to a position and orientation (pose) at which the marker image IMG displayed on the right optical image display section 26Ca or the left optical image display section 28Ca and the real marker MK1 or the real marker MK2 can be visually perceived so as to be superimposed on or aligned with each other. In the case where the marker IMG and the real marker MK1 or MK2 are visually perceived by the user US so as to be superimposed on or aligned with each other, the real marker MK1 MK2 is positioned at a predetermined distance according to the sizes of the real markers MK1 and MK2 and take the above-mentioned imaginary pose, with respect to the right optical image display section 26Ca or the left optical image display section 28Ca. In a state where the marker image IMG and the real marker MK1 or the real marker MK2 are aligned with each other, the parameter setting section 167Ca captures the real marker MK1 or the real marker MK2 using the camera 60Ca. The parameter setting section 167Ca sets a transformation parameter and a camera parameter CP using the real marker MK1 or the real marker MK2 included in the captured image.

Figure 27:
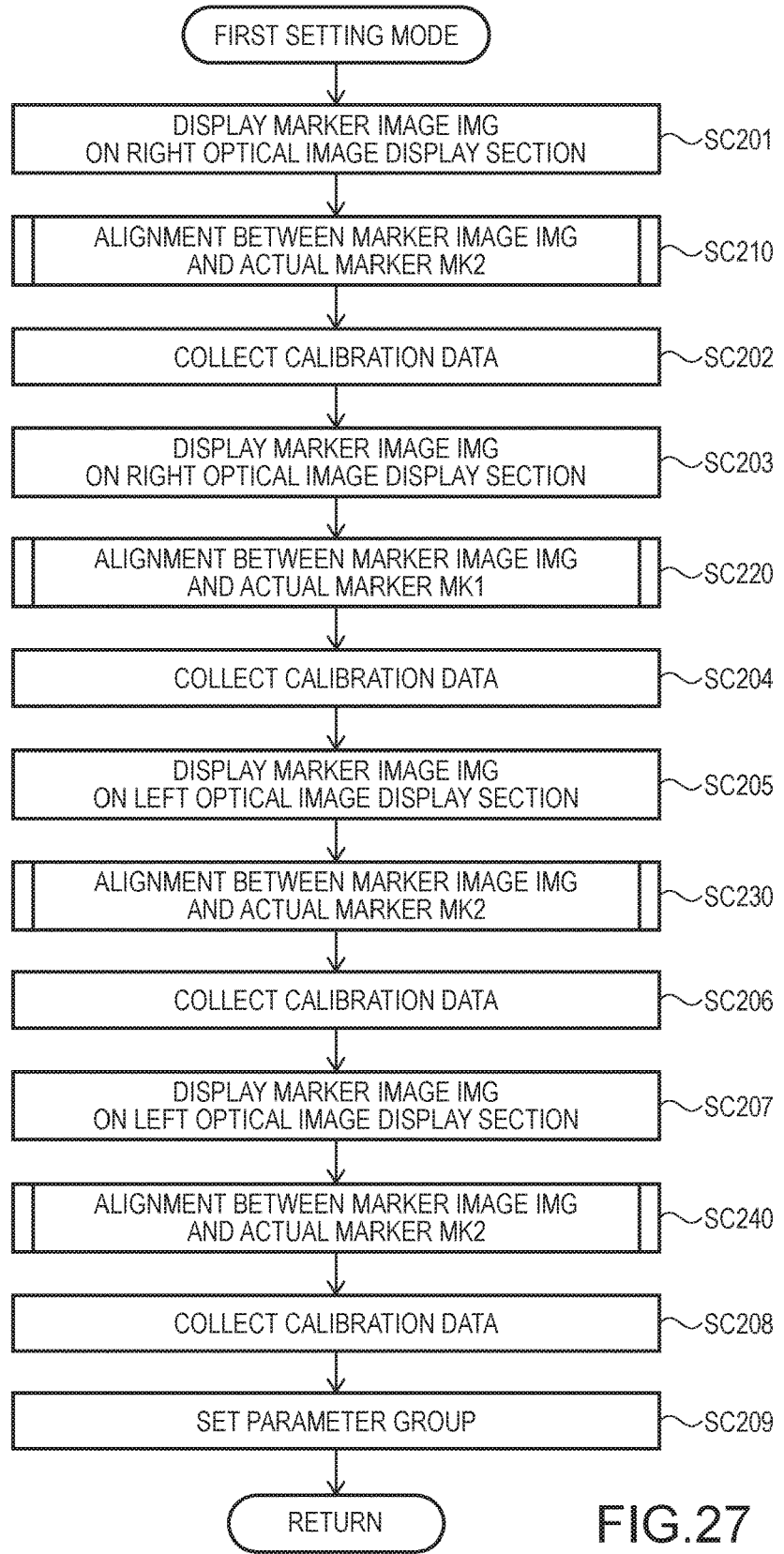
FIG. 27 is a flow chart of a first setting mode.

FIG. 27 is a flow chart of a first setting mode. In the first setting mode, the parameter setting section 167Ca collects calibration data in a state where alignment regarding the right optical image display section 26Ca is established, collects calibration data in a state where alignment regarding the left optical image display section 28Ca is established, and sets a transformation parameter and a camera parameter CP.

Figure 28:
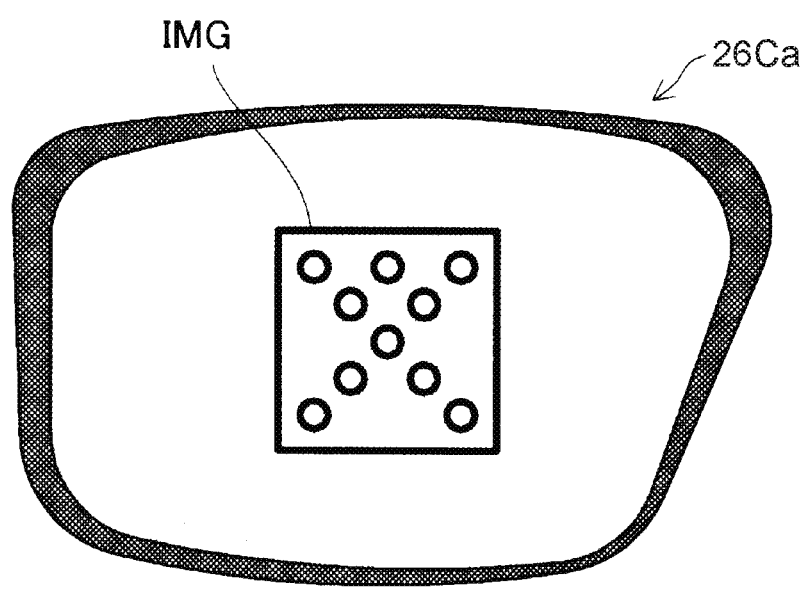
FIG. 28 is a diagram illustrating a marker image displayed on an optical image display section.

In the first setting mode, first, the display setting section 165Ca displays a marker image IMG on the right optical image display section 26Ca (step SC201). FIG. 28 is a diagram illustrating a marker image IMG displayed on the optical image display section 26Ca. As illustrated in FIG. 28, the display setting section 165Ca displays an outer frame of a square of a marker and outer frames of ten circles included in the square on the right optical image display section 26Ca. The display setting section 165Ca displays the marker image IMG on the right optical image display section 26Ca as a red line. Meanwhile, in FIG. 28, portions other than the right optical image display section 26Ca within the image display section 20Ca are not shown and will not be shown in the subsequent drawings.

When the marker image IMG is displayed on the right optical image display section 26Ca, the parameter setting section 167Ca prompts a user US to match the positions and poses of the marker image IMG and a real marker MK2 with the HMD 100Ca worn on the user US so that the marker image and the real marker are visually perceived so as to be aligned with each other (step SC210 of FIG. 27).

A message may further be displayed on the right optical image display section 26Ca. In the case where the marker image IMG and the real marker MK2 are visually perceived by the user US so as to be aligned with each other, the HMD 100Ca instructs the user US to operate a touch pad, to press a button, or to utter a sound command. In the case where the parameter setting section 167Ca receives these operations or the sound command, the camera 60Ca captures the marker MK2, that is, collects calibration data (step SC202). In the case where the parameter setting section 167Ca collects calibration data on the basis of the sound command, it is expected that the head of the user US will scarcely move. For this reason, in an operation based on the sound command, it is possible to collect calibration data in a state where there is a little deviation from alignment established by the user US, as compared to the case of a touch operation or the pressing of a button. As a result, the HMD 100Ca having a high level of superposition accuracy of an AR image is obtained.

When the process of matching the positions and poses of the marker image IMG and the real marker MK2 (alignment process by visual observation) of step SC210 of FIG. 27 and the collection of calibration data are performed, the display setting section 165Ca displays the marker image IMG on the right optical image display section 26Ca as illustrated in FIG. 28, similar to the process of step SC201 (step SC203). Thereafter, the parameter setting section 167Ca prompts the user US to match the positions and poses of the marker image IMG and a real marker MK1 with the HMD 100Ca worn on the user so that the marker image IMG and the real marker MK1 are visually perceived so as to be aligned with each other (step SC220). The real marker MK1 is imaged in this state, and thus the parameter setting section 167Ca collects calibration data (step SC204). Here, the real marker MK1 is larger than the real marker MK2. For this reason, in the process of step SC220, in the case where the marker image IMG and the real marker MK1 are visually perceived by the user US so as to be aligned with each other, a distance between the right optical image display section 26Ca and the real marker MK1 becomes larger than that in the case of the real marker MK2.

The parameter setting section 167Ca performs processes of step SC205 to step SC208 (steps SC205, SC230, SC206, SC207, SC240 and SC208) of FIG. 27 with respect to the left optical image display section 28Ca, as the same processes as the processes of step SC201 to step SC204 in the right optical image display section 26Ca. When processes (processes of step SC201 to step SC208) in the first setting mode are performed with respect to the right and left optical image display sections 26Ca and 28Ca, the parameter setting section 167Ca can set a parameter group with respect to the right optical image display section 26Ca and a parameter group with respect to the left optical image display section 28Ca for minimizing Expression (15C) to be described later (step SC209).

E-2-2. Setting of Parameters

Here, a description will be given of a procedure of setting parameters of a transformation parameter and a camera parameter CP by the parameter setting section 167Ca using imaging data of the real marker MK2 and imaging data of the real marker MK1 which are obtained by the camera 60Ca in a first setting mode. Meanwhile, in the first setting mode of the present embodiment, the camera parameter CP is not necessarily have to be optimized, and may be fixed to a design value. However, in the present embodiment to be described below, an algorithm including a camera parameter CP as an optimization variable (s) is present so that a user US can optimize the camera parameter CP as necessary. In another embodiment, in the case where it is not necessary to optimize the camera parameter CP, the following expressions may be dealt with using these parameters as constants (fixed values).

E-2-2-1. With Regard to Camera Parameter

As a camera parameter CP regarding the camera 60Ca, four camera parameters (fx, fy, Cx, Cy) are used in the present embodiment. The camera parameters (fx, fy) are focal lengths of the camera 60Ca which is an imaging section, and are converted into the number of pixels on the basis of the density of pixels. The camera parameters (Cx, Cy) are called the camera principal point position, means the center position of a captured image, and may be expressed by, for example, a 2D coordinate system which is fixed to an image sensor of the camera 60Ca.

The camera parameter CP can be known from the product specifications of the camera 60Ca constituting a principle portion of the imaging section (hereinafter, also referred to as a default camera parameter). However, in many cases, a camera parameter CP of a real camera greatly departs from a default camera parameter. In addition, when cameras are different products in spite of having the same specifications, camera parameter CP of cameras for each product vary (are not even).

In the case where at least one of a position, size, and pose in an AR model displayed on the optical image display sections 26Ca and 28Ca as an AR image is visually perceived by a user so as to be aligned with (superposed on) a real object, the camera 60Ca functions as a detection device that detects the position and pose of the real object. At this time, the parameter setting section 167Ca estimates the position and pose of the real object imaged by the camera 60Ca with respect to the camera 60Ca using the camera parameter CP. Further, the parameter setting section 167Ca transforms the position and pose into the position and pose of a real object with respect to the left optical image display section 28Ca using a relative positional relationship between the camera 60Ca and the left optical image display section 28Ca (right optical image display section 26Ca). Further, the parameter setting section 167Ca determines the position and pose of the AR model on the basis of the transformed position and pose. In addition, the image processing section 160Ca projects (transforms) the AR model having the position and the pose to a display region using a projection parameter, and writes the projected AR model in a display buffer (for example, the RAM 122Ca). In addition, the display control section 190Ca displays the AR model written in the display buffer on the left optical image display section 28Ca. For this reason, in the case where the camera parameters are the default camera parameters, the estimated position and pose of the real object may include errors. In this case, the displayed AR model and the real object, which are to be superposed on or overlaid with each other, are visually perceived by a user as if there is an error in superposing the AR model on the real object due to the errors of the estimated position and pose.

Consequently, in the present embodiment, the parameter setting section 167Ca optimizes and sets a camera parameter CP using pieces of imaging data of the real marker MK2 or the real marker MK1 during calibration for allowing an AR model to be superposed on an object and to be visually perceived by a user US. In addition, the position and pose of the real object are detected (estimated) using the set camera parameter CP. In this manner, the degree to which a deviation generated between the displayed AR model and a real object is visually perceived by a user US becomes lower in displaying the AR model. As described later, even when the same user US uses the same HMD 100Ca, it is preferable that a camera parameter CP is set whenever calibration is performed and is used for a subsequent display in which at least one of the position, size, and orientation of an object is aligned with that of an AR model. This does not indicate that a user necessarily matches the positions and poses of a real marker MK2 or a real marker MK1 and a marker image IMG corresponding to the real marker MK2 or the real marker MK1 with the same level of accuracy during calibration. Even when a user US matches positions and poses with different levels of accuracy, a camera parameter CP is set accordingly, thereby suppressing an increase in a deviation of a superposition display in the case where an AR model and a real object are displayed so as to be superposed on each other.

E-2-2-2. With Regard to Transformation Parameter

In addition, the HMD 100Ca of the present embodiment has a structure in which a relative positional relationship between the camera 60Ca and the optical image display sections 26Ca and 28Ca changes. As understood from a description of a default camera parameter, in the case where causing at least one of the position, size, and pose of an AR model to be visually perceived by a user so as to be aligned with (superposed on) a real object, the display of the AR model based on a relative positional relationship different from an actual relative positional relationship between the camera 60Ca and the optical image display sections 26Ca and 28Ca makes an error visually perceived in the displayed AR model and a real object that are superposed on each other.

Consequently, in the present embodiment, a transformation parameter indicating a relative positional relationship (at least one of rotations and translations) between a coordinate system of the camera 60Ca, a coordinate system of the right optical image display section 26Ca, and a coordinate system of the left optical image display section 28Ca is adjusted or set, during calibration for making an AR model visually perceived by a user so as to be superposed on an object. When the AR model is displayed using a spatial relationship (relative positional relationship) indicated by the thus set transformation parameter, the degree to which a deviation is visually perceived by a user US becomes lower.

In the present embodiment, the parameter setting section 167Ca sets a left transformation parameter PML[$R_{cam2left}$, $t_{cam2left}$] and a right transformation parameter PMR [$R_{cam2right}$, $t_{cam2right}$] that correspond to the right optical image display section 26Ca and the left optical image display section 28Ca, respectively. A rotation matrix $R_{cam2right}$ is three parameters that are determined by the rotation of three axes perpendicular to each other, and a translation matrix $T_{cam2right}$ is three parameters that respectively correspond to translations along the three axes. That is, the right transformation parameter PMR corresponding to the right optical image display section 26Ca includes a total of six parameters. Similarly, the transformation parameter corresponding to the left optical image display section 28Ca is a rotation matrix $R_{cam2left}$ and a translation matrix $T_{cam2left}$, and includes a total of six parameters. As described above, in the present embodiment, 16 parameters of four parameters included in a camera parameter CP and 12 transformation parameters indicating a spatial relationship are calculated.

E-2-2-3. Parameter Derivation Process

In the following description, the camera 60Ca captures a real marker MK2 (or a real marker MK1) in a state where the real marker MK2 (or the real marker MK1) and a marker image IMG are visually perceived by a user US so as to be aligned with each other, and the parameter setting section 167Ca acquires the captured image. The parameter setting section 167Ca calculates a camera parameter and a transformation parameter using Expression (15C) to be described later, on the basis of the acquired captured image. In the present embodiment, a measurement value(s) or an inspection value(s) before the shipment of the HMD 100Ca from a manufacturing factory is used as an initial value(s) (i=0) in the case where a parameter group is derived. On the other hand, in another embodiment, a value(s) in the pose of either the camera 60Ca or the optical image display sections 26Ca and 28Ca in the case where the movement thereof is maximized, or a value(s) in the middle pose in the movable range may be used as an initial value(s).

Figure 29:
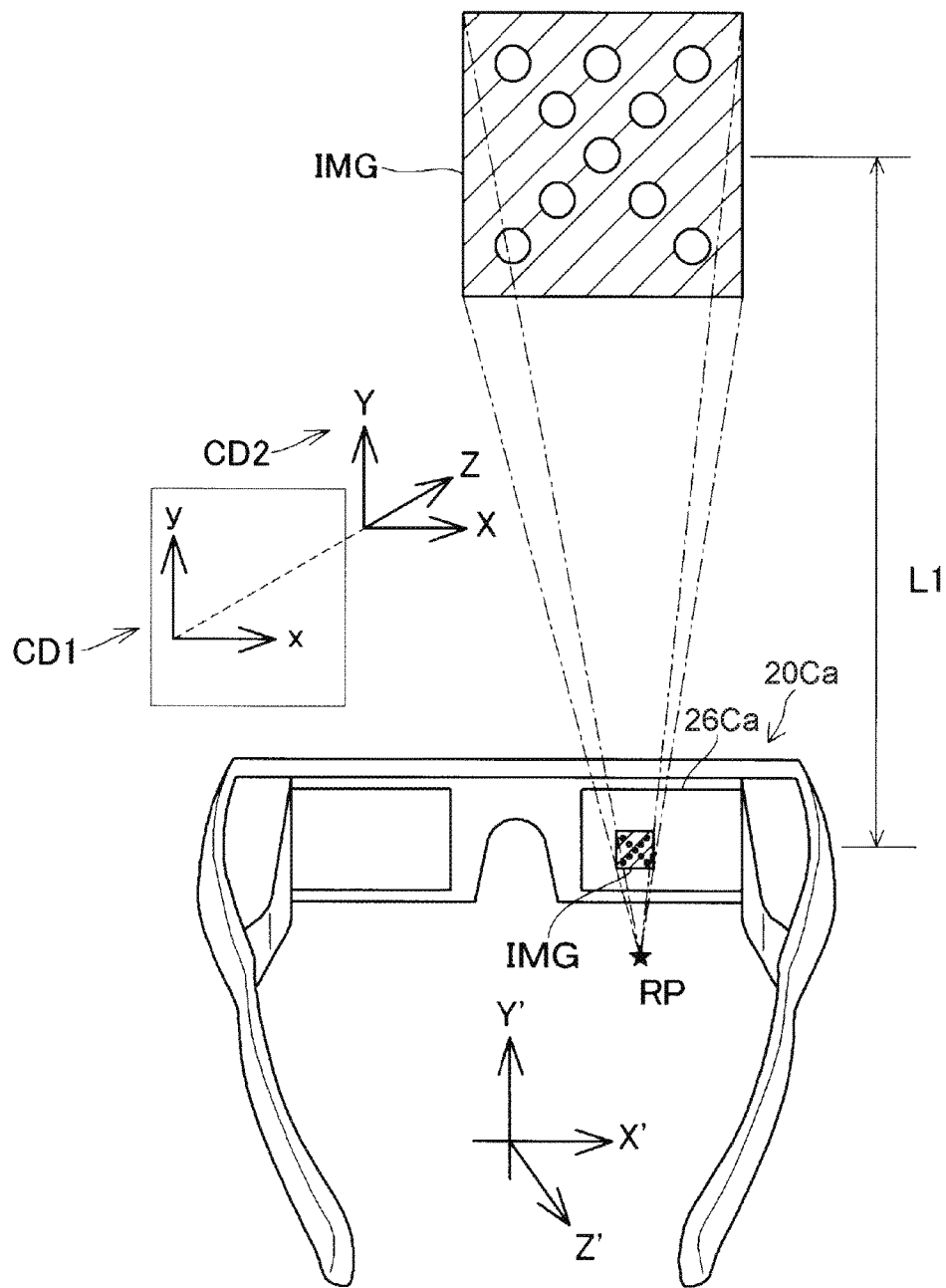
FIG. 29 is a schematic diagram illustrating a spatial positional relationship in a state where a marker image is displayed on only a right optical image display section.

FIG. 29 is a schematic diagram illustrating a spatial positional relationship in a state where a marker image IMG is displayed on only the right optical image display section 26Ca. FIG. 29 schematically illustrates the case where a user US visually perceives a marker image IMG displayed on the right optical image display section 26Ca from a right eye position RP which is set in advance as the position of an imaginary right eye of the user US wearing the image display section 20Ca. Meanwhile, in FIG. 29, only the image display section 20Ca within the HMD 100Ca is shown, and the mounting band 90Ca, the control section 10Ca, and the like are not shown. In other words, the image display section 20Ca illustrated in FIG. 29 is the same image display section as the image display section 20Ca illustrated in FIGS. 18 to 20. In addition, FIG. 29 illustrates a coordinate axis CD2 indicating a coordinate axis of an outside scene which is a three-dimensional space to be imaged, and a coordinate axis CD1 indicating a coordinate axis of a two-dimensional image in which the coordinate axis CD2 is projected. The user US visually perceives the marker image IMG displayed on the right optical image display section 26Ca as a marker MK1 which is present at a position separated from the image display section 20Ca at a distance L1.

As illustrated in FIG. 29, in the case where a user visually perceives the marker image IMG displayed on the right optical image display section 26Ca and a real marker MK1 which is included in an outside scene and is positioned at the front so that the positions, sizes, and orientations of the marker image and the real marker are aligned with each other (hereinafter, also referred to as the case where a user US establishes alignment by his or her left eye LE (right eye RE)), the following relationship of Expression (1C) is established between coordinate systems. Meanwhile, hereinafter, a description will be given of the case where a marker image IMG is displayed on the left optical image display section 28Ca instead of being displayed on the right optical image display section 26Ca.

$$CP \times [R_{o2dl}, t_{o2dl}] \times ModelMatrix = \qquad (1C)$$
$$CP \times [R_{cam2left}, t_{cam2left}] \times [R_{obj2cam}, t_{obj2cam}] \times ModelMatrix$$

Here, CP on each of the right and left sides indicates a camera parameter CP of the camera 60Ca. In addition, $[R_{o2dl}, t_{o2dl}]$ indicates a transformation matrix from a coordinate system fixed to a real object (in this case, a real marker MK2 or a real marker MK1) to a coordinate system fixed to the left optical image display section 28Ca. Among these, $[R_{o2dl}]$ indicates a 3×3 matrix indicating rotations, and $[t_{o2dl}]$ indicates a 3×1 matrix indicating translations. Here, $[R_{o2dl}, t_{o2dl}]$ indicates the position and pose of the real object with respect to the left optical image display section 28Ca. In addition, ModelMatrix indicates a 3×1 matrix indicating any one point on a model marker. The model marker is three-dimensional data (three-dimensional model: but is a plan in the present embodiment) which is a basis in the case where a marker image IMG is displayed on the optical image display section 28Ca. The notation of $[R_{o2dl}, t_{o2dl}] \times ModelMatrix$ goes by a rule of the following Expression (2C).

$$[R_{o2dl}, t_{o2dl}] \times ModelMatrix = [R_{o2dl}] \times ModelMatrix + [t_{o2dl}] \qquad (2C)$$

The rule of the notation of Expression (2C) mentioned above is also applied to other portions of Expression (1C).

Here, $[R_{cam2left}, t_{cam2left}]$ on the right side of Expression (1C) indicates a transformation matrix from the coordinate system of the camera 60Ca to the coordinate system of the left optical image display section 28Ca. The transformation matrix is constituted by a plurality of transformation parameters that are set by the parameter setting section 167Ca. In addition, $[R_{obj2cam}, t_{obj2cam}]$ on the right side of Expression (1C) indicates a transformation matrix from a coordinate system of a real object (a real marker MK2 or a real marker MK1) to the coordinate system of the camera 60Ca. In addition, $[R_{obj2cam}, t_{obj2cam}]$ indicates the position and pose of the real object with respect to the camera 60Ca.

From the relationship of Expression (1C), when alignment between a marker image IMG and the real marker MK2 or the real marker MK1 is established with respect to the left optical image display section 28Ca, the following Expressions (3) and (4C) are established.

$$R_{obj2cam} = inv(R_{cam2left}) * R_{o2dl} \qquad (3C)$$

$$t_{obj2cam} = inv(R_{cam2left}) * (t_{o2dl} - t_{cam2left}) \qquad (4C)$$

In the case where the pose of the real marker MK2 or the real marker MK1 with respect to the camera 60Ca is applied to a model marker when it is assumed that the alignment of the left eye LE is established, any point on the model marker transformed into the coordinate system of the camera 60Ca is expressed as $P_{cl}(X_{cl}, Z_{cl})$ by the following Expression (5C).

$$P_{cl} = \begin{bmatrix} X_{cl} \\ Y_{cl} \\ Z_{cl} \end{bmatrix} = R_{obj2cam} \times ModelMatrix + t_{obj2cam} \qquad (5C)$$

Here, when $R_{obj2cam}$ and $t_{obj2cam}$ are erased by Expression (3C) and Expression (4C), Expression (5C) changes to the following Expression (6C).

$$P_{cl} = \begin{bmatrix} X_{cl} \\ Y_{cl} \\ Z_{cl} \end{bmatrix} = inv(R_{cam2left})(R_{o2dl} \times ModelMatrix + t_{o2dl} - t_{cam2left}) \qquad (6C)$$

Here, $R_{o2dl}$ and $t_{o2dl}$ respectively indicate rotations and translations from the coordinate system of the real marker MK2 or the real marker MK1 to the coordinate system of the left optical image display section 28Ca. In the present embodiment, the marker image IMG is fixed and displayed at a predetermined position (for example, the center) on the left optical image display section 28Ca with a predetermined orientation and a predetermined size. Then, when the user US aligns the marker image IMG displayed on the left optical image display section 28Ca with the real marker MK2 or the real marker MK1, $R_{o2dl}$ and $t_{o2dl}$ become predetermined rotations and translations which coincide whit the predetermined position, orientation and size of the marker image IMG. Here, $T_{cam2left}$ indicates translation from the coordinate system of the camera to the coordinate system of the left optical image display section 28Ca.

$$R_{o2d_l} = \begin{bmatrix} 1 & 0 & 0 \\ 0 & 1 & 0 \\ 0 & 0 & 1 \end{bmatrix} \quad (7C)$$

$$t_{o2d_l} = \begin{bmatrix} 0 \\ 0 \\ -a \end{bmatrix} \quad (8C)$$

$$t_{cam2left} = \begin{bmatrix} D1 \\ D2 \\ D3 \end{bmatrix} \quad (9C)$$

Elements in Expressions (7C) and (8C) mentioned above are constants (a is L1 of FIG. 29) in the present embodiment. Elements D1, D2, and D3 in Expression (9C) indicate initial values in the present embodiment, and may vary during a parameter derivation process. Meanwhile, as understood from FIG. 29, in the present embodiment, in a coordinate system fixed to the image display section 20Ca, a direction of light emitted to the eyes of a user US from the optical image display sections 26Ca and 28Ca (image display section 20Ca) is parallel to a Z-axis direction.

When a model marker expressed as Expression (5C) is projected onto an image captured by the camera 60Ca, coordinates of the model marker on the captured image are as follows.

$$x_{iml} = F_x \frac{X_{cl}}{Z_{cl}} + C_x \quad (10C)$$

$$y_{iml} = F_y \frac{Y_{cl}}{Z_{cl}} + C_y \quad (11C)$$

Here, (Fx, Fy) indicates focal lengths of the camera 60Ca, and (Cx, Cy) indicates principal point position coordinates of the camera 60Ca.

When coordinates of a feature element of a marker in a captured image obtained by actually capturing the real marker MK2 or the real marker MK1 by the camera 60Ca are represented as $(u_l, v_l)$, a difference between $(u_l, v_l)$ and $(x_{iml}, y_{iml})$ is as follows.

$$e_i = \begin{bmatrix} e_x \\ e_y \end{bmatrix} = \begin{bmatrix} u_{li} - x_{imli} \\ v_{li} - y_{imli} \end{bmatrix}, \quad (12C)$$

$$i = 1 \sim 9$$

A subscript i in Expression (12C) is an integer indicating a feature element in a marker and has a value of 1 to 9. The parameter setting section 167Ca derives the sum of squares expressed as Expression (13C) with respect to the alignment of the left eye LE.

$$E_L = \Sigma_{i=1}^{9}((u_{li} - x_{imli})^2 + (v_{li} - y_{imli})^2) \quad (13C)$$

Also in the case where the user establishes alignment between a marker displayed on the right optical image display section 26Ca and the real marker MK2 or the real marker MK1 using the right eye RE, the sum of squares expressed as Expression (14C) is derived similarly.

$$E_R = \Sigma_{i=1}^{9}((u_{ri} - x_{imri})^2 + (v_{li} - y_{imri})^2) \quad (14C)$$

A cost function E expressed as Expression (15C) is defined by the sum of $E_R$ and $E_L$.

$$E = E_R + E_L \quad (15C)$$

A parameter for minimizing (global minimum) E is obtained by optimization calculation accompanied by iterative calculation such as a Gaussian Newton's method.

In the present embodiment, the camera parameter CP of the camera 60Ca, a transformation parameter indicating rotation ($R_{cam2left}$) and translation ($T_{cam2left}$) from the coordinate system of the camera 60Ca to the coordinate system of the left optical image display section 28Ca, and a transformation parameter indicating rotation ($R_{cam2right}$) and translation ($T_{cam2right}$) from the coordinate system of the camera 60Ca to the coordinate system of the right optical image display section 26Ca are set by optimization.

A Jacobian matrix which is used for iterative calculation for minimizing the cost function E expressed as Expression (15C) is expressed as Expression (16C).

$$J_L = \begin{bmatrix} \dfrac{\partial x_{im_{li}}}{\partial p} \\ \dfrac{\partial y_{im_{li}}}{\partial p} \end{bmatrix} \quad (16C)$$

Here, variables $x_{mli}$ and $y_{mli}$ on the right side of Expression (16C) are expressed by Expressions (10C) and (11), respectively, and $x_{cl}$ and $y_{cl}$ in Expressions (10C) and (11C) are expressed by Expression (6C). In addition, a variable p on the right side of Expression (16C) is Fx, Fy, Cx, and Cy that are included in the camera parameter CP of the camera 60Ca, six Euler's angles constituting rotation $R_{cam2left}$ and $R_{cam2right}$ indicating a spatial relationship between the camera 60Ca and the optical image display sections 26Ca and 28Ca, and six translation components constituting translation $T_{cam2left}$ and $T_{cam2right}$. The parameter setting section 167Ca can search for the global minimum of Expression (15C) on the basis of the Jacobian matrix of Expression (16C) and a minute variation of a variable p. A camera parameter CP and a transformation parameter are obtained by a variable p corresponding to the global minimum.

When the camera parameter CP and the transformation parameter are set, the display setting section 165Ca displays a setting image SIM on the optical image display sections 26Ca and 28Ca for the purpose of causing a user US to confirm the set transformation parameter and camera parameter CP using an image, as the process of step SC15 in the calibration execution process illustrated in FIG. 26. In the case where a specific object (a real marker MK1 in this example) is included in an imaging range of the camera 60Ca, the CPU 140Ca derives the position and pose of the specific object with respect to the camera 60Ca using the set camera parameter CP. In addition, the CPU 140Ca transforms the position and pose of the specific object with respect to the camera 60Ca into the position and pose of the specific object with respect to the optical image display sections 26Ca and 28Ca, using the set transformation parameter. The display setting section 165Ca gives the transformed position and pose to an AR model, projects the AR model, and displays the AR model on the optical image display sections 26Ca and 28Ca as a setting image SIM. In this example, when a user US can be allowed to visually perceive the position and pose of the setting image SIM to be aligned with the position and pose of the specific object and to track the movement of the specific object, the setting of the transformation parameter and the camera parameter CP is sufficient. When internal coordinates of a real marker or an AR model corresponding to the real marker are defined as X, a position (u, v) on a display image in the left optical image display section 28Ca is expressed as Expression (17C) with a transformation parameter.

$$\begin{bmatrix} u \\ v \end{bmatrix} \simeq RP[R_{cam2left}, T_{cam2left}][R_{obj2cam}, T_{obj2cam}] \cdot X \quad (17C)$$

Here, [$R_{obj2cam}$, $T_{obj2cam}$] indicates parameters (a rotation matrix and a translation matrix) which indicate a spatial relationship between a real marker MK2 or a real marker MK1 and the camera 60Ca, and are calculated by the parameter setting section 167Ca by applying, for example, a nomography to a captured image of the real marker MK2 or the real marker MK1 which is imaged by the camera 60Ca. In the case where the marker specification section 166Ca is to detect a specific object other than the real marker MK2 and the real marker MK1, the parameter setting section 167Ca sets a spatial relationship between the specific object and the camera 60Ca using another method. Meanwhile, also regarding the right optical image display section 26Ca, a position (u, v) of a display image is derived by the relational expression similar to Expression (17C). As expressed in Expression (17C), the display setting section 165Ca displays pixels of an AR model as an AR image at positions (u, v) which are determined on the basis of at least a spatial relationship between the real marker MK2 or the real marker MK1 and the camera 60Ca and spatial relationships between the camera 60Ca and the right/left optical image display sections 26Ca/28Ca. The display setting section 165Ca can make a user US visually perceive the AR model (setting image SIM in this case) and a specific object so that at least one of the position, size, and orientation of the AR model is aligned with at least one of the position, size, and orientation of the specific object. Meanwhile, RP on the right side in Expression (17C) indicates a projection parameter (or also referred to as a rendering parameter) which is determined in the case where a projection model similar to a pinhole camera model is used, and is expressed as the following Expression (18C) in the present embodiment.

$$RP = \begin{bmatrix} \frac{2}{W}F_x & 0 & 1 - \frac{2C_x}{W} & 0 \\ 0 & \frac{2}{H}F_y & 1 - \frac{2C_y}{H} & 0 \\ 0 & 0 & -\frac{(n+f)}{f-n} & -\frac{2nf}{f-n} \\ 0 & 0 & -1 & 0 \end{bmatrix} \quad (18C)$$

Here, Fx and Fy in Expression (18C) indicate focal lengths converted into the number of pixels of a projector in the HMD 100Ca, W indicates the number of pixels (resolution) of the left optical image display section 28Ca in a left-right direction, H indicates the number of pixels (resolution) of the left optical image display section 28Ca in an up-down direction, and Cx and Cy indicate the center position of a display image. Two upper rows of the projection parameter contribute to the derivation of u and v. Here, f and n are coefficients for determining a correlation with normalized device coordinates having a normalized depth between 0 and 1. That is, these coefficients are coefficients for adjusting a depth in a rendering buffer (depth buffer), but do not directly contribute to the derivation of a position (u, v) of a display image.

Here, when it is assumed that an image of the specific object or the AR model X is imaged by the camera 60Ca, Expression (19C) is established between a point of the specific object or the AR model X and a corresponding point on the captured image.

$$\text{image} = \begin{pmatrix} x \\ y \end{pmatrix} = \begin{pmatrix} f_x & 0 & C_x \\ 0 & f_y & C_y \\ 0 & 0 & 1 \end{pmatrix} (R, T) \cdot X \quad (19C)$$

Here, (R, T) on the right side of Expression (19C) indicates a transformation matrix indicating the position and pose of a specific object with respect to the camera 60Ca, and is expressed by a camera coordinate system. The left side of the transformation matrix is a camera parameter CP. As schematically shown in Expression (19C), (R, T) is estimated on the basis of a correlation between a point in a real space or a three-dimensional coordinate system and a point on a captured image, and thus it is preferable that the camera parameter CP is appropriate for the accurate estimation of the position and pose of a real object.

Since the same coordinate point of an AR model in three-dimension is rendered to a display buffer in the image processing section 160Ca, the normalized device coordinates (NDC) thereof are expressed as Expression (20C) using Expression (18C).

$$\begin{pmatrix} u \\ v \\ w \\ z \end{pmatrix} = \begin{bmatrix} \frac{2}{W}F_x & 0 & 1 - \frac{2C_x}{W} & 0 \\ 0 & \frac{2}{H}F_y & 1 - \frac{2C_y}{H} & 0 \\ 0 & 0 & -\frac{(n+f)}{f-n} & -\frac{2nf}{f-n} \\ 0 & 0 & -1 & 0 \end{bmatrix} \quad (20C)$$

$$(I, d) \begin{bmatrix} 1 & 0 & 0 & 0 \\ 0 & -1 & 0 & 0 \\ 0 & 0 & -1 & 0 \\ 0 & 0 & 0 & 1 \end{bmatrix} (R, T) \cdot x$$

Expression (20C) is expressed by homogeneous coordinate expression. Here, X on the right side of Expression (20C) indicates an internal coordinate of a point on a model marker or an AR model, and is expressed by a coordinate system which is fixed to the model. In addition, (R, T) on the left side of X in Expression (20C) indicates the position and pose of a specific object which is expressed by a camera coordinate system, and indicates the same position and pose as (R, T) in Expression (19C). A 4×4 matrix having 0, 1, and −1 as elements on the left side of (R, T) in Expression (20C) is a transformation matrix for transforming the orientation of a coordinate axis, and is provided for the sake of convenience in the present embodiment because the definition of a coordinate axis in a forward direction in a camera coordinate system is different from that in a display section coordinate system. In addition, (I, d) on the left side of the transformation matrix for transforming the orientation of a coordinate axis in Expression (19C) indicates a spatial relationship between the camera 60Ca and the optical image display section 26Ca (28Ca), and indicates a 4×4 transformation matrix constituted by rotation I and translation d that are expressed by a coordinate system of the optical image display section 26Ca (28Ca). A coordinate point expressed by Expression (20C) is a position expressed by (u', v') of Expression (21C) in an image plane of the optical image display section 26Ca (28Ca);

$$\begin{pmatrix} u' \\ v' \end{pmatrix} = \begin{bmatrix} -\frac{2}{W} F_x \cdot \frac{R_1 \cdot X + d_x + T_x}{-R_3 \cdot X + d_z - T_z} - \left(1 - \frac{2C_x}{W}\right) \\ -\frac{2}{W} F_y \cdot \frac{R_2 \cdot X + d_y + T_y}{-R_3 \cdot X + d_z - T_z} - \left(1 - \frac{2C_y}{H}\right) \end{bmatrix} \simeq \qquad (21C)$$

$$\begin{bmatrix} \frac{2}{W}\left(C_x + F_x \frac{T_x}{T_z}\right) - 1 \\ \frac{2}{H}\left(C_y + F_y \frac{-T_y}{T_z}\right) - 1 \end{bmatrix}$$

where each of R1, R2 and R3 stands for a corresponding row vector in the rotation matrix in (R, T), and each of Tx, Ty, and Tz stands for a corresponding component of the translation vector in (R, T), (R, T) having a 4×4 matrix form.

In the present embodiment, when calibration is successfully performed, a user US wearing the HMD 100Ca visually perceives a setting image SIM displayed on the optical image display sections 26Ca and 28Ca and a specific object (real marker MK1 in this example) so that the position, size, orientation, and depth perception of the setting image SIM are aligned with the position, size, orientation, and depth perception of the specific object.

Figure 30:
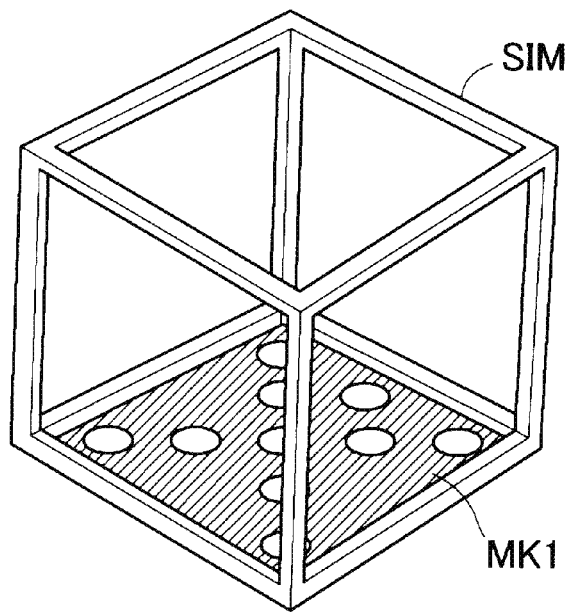
FIG. 30 is a diagram illustrating an example of a field of view of a user who visually perceives a setting image displayed in association with a specific object.

FIG. 30 is a diagram illustrating an example of a field of view of a user US who visually perceives a setting image SIM displayed in association with a specific object. In the example illustrated in FIG. 30, a real marker MK1 is adopted as the specific object. After calibration is executed, the display setting section 165Ca displays the setting image SIM on the right and left optical image display sections 26Ca and 28Ca in accordance with the position and orientation (pose) of the imaged real marker MK1, using a transformation parameter and a camera parameter CP which are set by the parameter setting section 167Ca. The setting image SIM is an image constituting sides of a regular hexahedron. As illustrated in FIG. 30, the bottom of the regular hexahedron of the setting image SIM is displayed so as to be matched with the real marker MK1. The user US can recognize the accuracy of calibration by visually recognizing a spatial relationship between the actual marker MK1 as a specific object and the setting image SIM. When the user US does not visually perceive the real marker MK1 and the setting image SIM so that the real marker and the setting image match each other, the user can execute calibration again in a first setting mode or a second setting mode. As illustrated in FIG. 30, the optical image display sections 26Ca and 28Ca or the sound processing section 170Ca may present a character image or a sound for promoting either the continuation of an AR display function by the success of calibration (or viewed in an overlapping manner) or the re-execution of calibration, to the user.

E-2-2-4. Automatic Collection of Calibration Data

First, a coordinate axis of a coordinate system which is fixed to the optical image display sections 26Ca and 28Ca will be described by taking the case of the right optical image display section 26Ca as an example, in preparation for the description of an automatic collection process of calibration data. In the present embodiment, a Z-axis of a coordinate system of the right optical image display section 26Ca is aligned with a normal direction of a display region visually perceived by a user US in the case where the user US appropriately wears the HMD 100Ca. For this reason, the Z-axis may indicate a direction to which the face of the user US is directed. An X-axis is perpendicular to the Z-axis, and is substantially parallel to a direction in which the right optical image display section 26Ca and the left optical image display section 28Ca are arranged. For this reason, the X-axis may indicate the left-right direction of the user US. In addition, a Y-axis is perpendicular to both the Z-axis and the X-axis. For this reason, the Y-axis may indicate the up-down direction of the user US.

In the above-mentioned first setting mode, a user US transmits the establishment of alignment by the visual observation of a marker image IMG and real markers MK1 and MK2 to the parameter setting section 167Ca by operating a touch pad, pressing a button, or uttering a sound command. In the case where the parameter setting section 167Ca receives one of these operations or the sound command, the camera 60Ca captures the marker MK1 or MK2, that is, collects calibration data. That is, the HMD 100Ca uses an operation or utterance by a user US as a trigger of the collection of calibration data. However, as described below, the HMD 100Ca may be configured such that calibration data is automatically collected, instead of having such a configuration.

Figure 31:
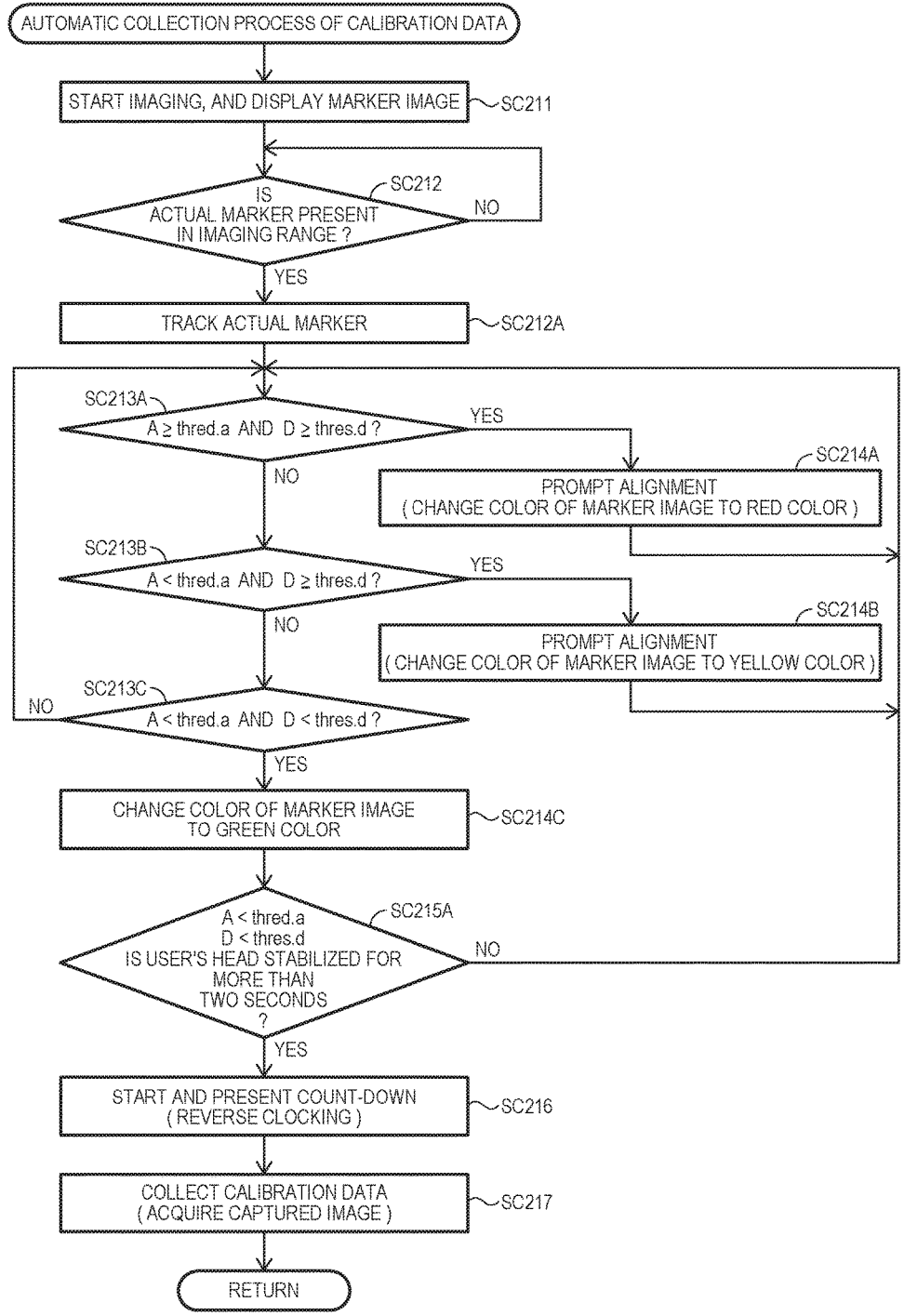
FIG. 31 illustrates a flow of an automatic collection process of calibration data according to an embodiment.

FIG. 31 illustrates a flow of an automatic collection process of calibration data according to an embodiment. In this process, first, the marker specification section 166Ca starts capturing, and one of the optical image display sections 26Ca and 28Ca (hereinafter, the right optical image display section 26Ca) starts to display a marker image IMG (step SC211). The marker specification section 166Ca executes binarization on each imaging frame imaged by the camera 60Ca to thereby extract a real marker MK2. The marker specification section 166Ca determines whether or not the real marker MK2 is included in an imaging range (step SC212). In the case where the marker specification section 166Ca determines that the real marker MK2 is not included in the imaging range (step SC212: NO), the marker specification section continuously monitors the detection of the real marker MK2 from the imaging range.

In the process of step SC212, in the case where the marker specification section 166Ca determines that the real marker MK2 is included in the imaging range (step SC212: YES), the marker specification section derives the position and pose of the real marker MK2 with respect to the camera 60Ca and starts to track the derived position and pose (step SC212A).

The derived position and pose of the real marker MK2 are expressed by a camera coordinate system. In other words, the position and pose are a position and a pose with respect to the camera 60Ca. Consequently, the position and pose of the real marker MK2 with respect to the camera 60Ca are transformed into an approximate position and pose which are expressed by a coordinate system of the right optical image display section 26Ca, that is, a provisional position and pose, using a default spatial relationship between the camera 60Ca and the right optical image display section 26Ca. The wording "default spatial relationship" refers to, for example, one spatial relationship which is present between both ends of a relative movable range between the camera 60Ca and the right optical image display section 26Ca. A 4×4 transformation matrix T indicating a position and a pose, that is, rotations and translations, is expressed as Expression (21AC).

$$T(\text{marker to display}) = T(\text{camera to display}) * \text{Tracking pose} \quad (21AC)$$

Here, "T (marker to display)" on the left side indicates an approximate position and pose of the real marker MK2 with respect to the right optical image display section 26Ca, and "T (camera to display)" on the right side indicates a default transformation matrix from a coordinate system of the camera 60Ca to a coordinate system of the right optical image display section 26Ca, and "Tracking pose" indicates the position and pose of the real marker MK2 with respect to the camera 60Ca.

Whether or not rotation differences around the X-axis and the Y-axis in the coordinate system of the optical image display section 26Ca between a model marker and the real marker MK2 are less than a predetermined value may be determined as in the following Expression (21BC) and Expression (21CC).

$$\text{abs}(A_x - \text{approximated } A_x) < \text{threshold} \quad (21BC)$$

$$\text{abs}(A_y - \text{approximated } A_y) < \text{threshold} \quad (21CC)$$

Here, "$A_x$" and "$A_y$" indicate rotation angles of a model marker around the X-axis and the Y-axis, respectively. In addition, "approximated $A_x$" and "approximated $A_y$" indicate approximate rotation angles of the real marker MK2 around the X-axis and the Y-axis, and are Euler's angles that are all expressed in units of degrees. In addition, "Abs" means the taking of an absolute value of a value. Meanwhile, as described above, the model marker refers to a model expressed in a three-dimensional coordinate space, and is to be projected to 2D and displayed as a marker image IMG.

Next, in the coordinate system of the right optical image display section 26Ca, whether or not approximate translations ($T_x'$, $T_y'$) along the X-axis and the Y-axis of the real marker MK2 are close to translations ($t_x$, $t_y$) of a model marker may be determined using the following relational expressions of Expression (21DC) and Expression (21EC).

$$\frac{\text{Abs}(T_x' - t_x)}{t_x} < \text{threshold} \quad (21DC)$$

$$\frac{\text{Abs}(T_y' - t_y)}{t_y} < \text{threshold} \quad (21EC)$$

In the following description, the above-mentioned difference in rotation angle will be collectively referred to as a "rotation difference A", and the above-mentioned difference in translation will be collectively referred to as a "translation difference D".

Returning to the flow of FIG. 31, the marker specification section 166Ca determines whether or not the rotation difference A is equal to or greater than the threshold value (threshold) thereof and the translation difference D is equal to or greater than the threshold value thereof (step SC213A). In the case where it is determined that both the rotation difference A and the translation difference D are equal to or greater than the respective threshold values (step SC213A: Yes), the display setting section 165Ca changes the color of a marker image to a red color, and displays a character image for prompting alignment on the right optical image display section 26Ca (step SC214A). In the case where the determination result in step SC213A is "negative" (step SC213A: No), the marker specification section 166Ca determines whether or not the rotation difference A is less than the threshold value and the translation difference D is equal to or greater than the threshold value (step SC213B). In the case where it is determined that the rotation difference A is less than the threshold value and the translation difference D is equal to or greater than the threshold value (step SC213B: Yes), the display setting section 165Ca changes the color of a marker image to a yellow color and displays a character image for prompting alignment on the right optical image display section 26Ca (step SC214B). In the case where the determination result in step SC213B is "negative" (step SC213B: No), the marker specification section 166Ca determines whether or not the rotation difference A is less than the threshold value and the translation difference D is less than the threshold value (step SC213C). In the case where it is determined that both the rotation difference A and the translation difference D are less than the respective threshold values (step SC213C: Yes), the display setting section 165Ca changes the color of a marker image to a green color (step 214C). In the case where the determination result in step SC213C is "negative" (step SC213C: No), a process to be executed next is returned to the determination of step SC213A. After step SC214C, the marker specification section 166Ca determines whether a state where both the rotation difference A and the translation difference D are less than the respective threshold values and a state where the head of a user US is stabilized have been continued, for example, for two seconds or more (step SC215A). In the case where it is determined that the determination result in step SC215A is affirmative, the parameter setting section 167Ca starts the clocking or reverse clocking during a predetermined period of time. The reverse clocking started by the parameter setting section 167Ca is referred to as a count-down process. The predetermined period of time according to the present embodiment is one second. The display setting section 165Ca divides one second into three parts, and presents count-down information of "3", "2", "1", and "0" that are displayed or output as a sound with the lapse of time. The parameter setting section 167Ca acquires a captured image of the real marker MK2 which is obtained by the camera 60Ca as calibration data at a timing when "0" is presented. The parameter setting section 167Ca may also acquire a plurality of the captured images obtained from the beginning of the predetermined period of time until the end of the period so as to obtain locations of the circle centers at a timing when "0" is presented by filtering or processing the captured images. In the latter, the obtained locations of the circle centers may be more stable.

The predetermined period of time in the count-down process is not limited to one second. It is preferable that the predetermined period of time is long to such a degree that a user US can improve alignment between the marker image IMG and the real marker MK2 by visual observation in terms of accuracy and is short to such a degree that the user US can maintain alignment therebetween by visual observation which is already established with a high level of accuracy. In this regard, "one second" is an empirically suitable length.

The parameter setting section 167Ca can determine whether a head is in a stabilized state or a substantially static state, from the position of a feature point of the real marker MK2 in a captured image obtained by the camera 60Ca, the output of an IMU built into the HMD 100Ca, and a combination thereof.

Figure 32:
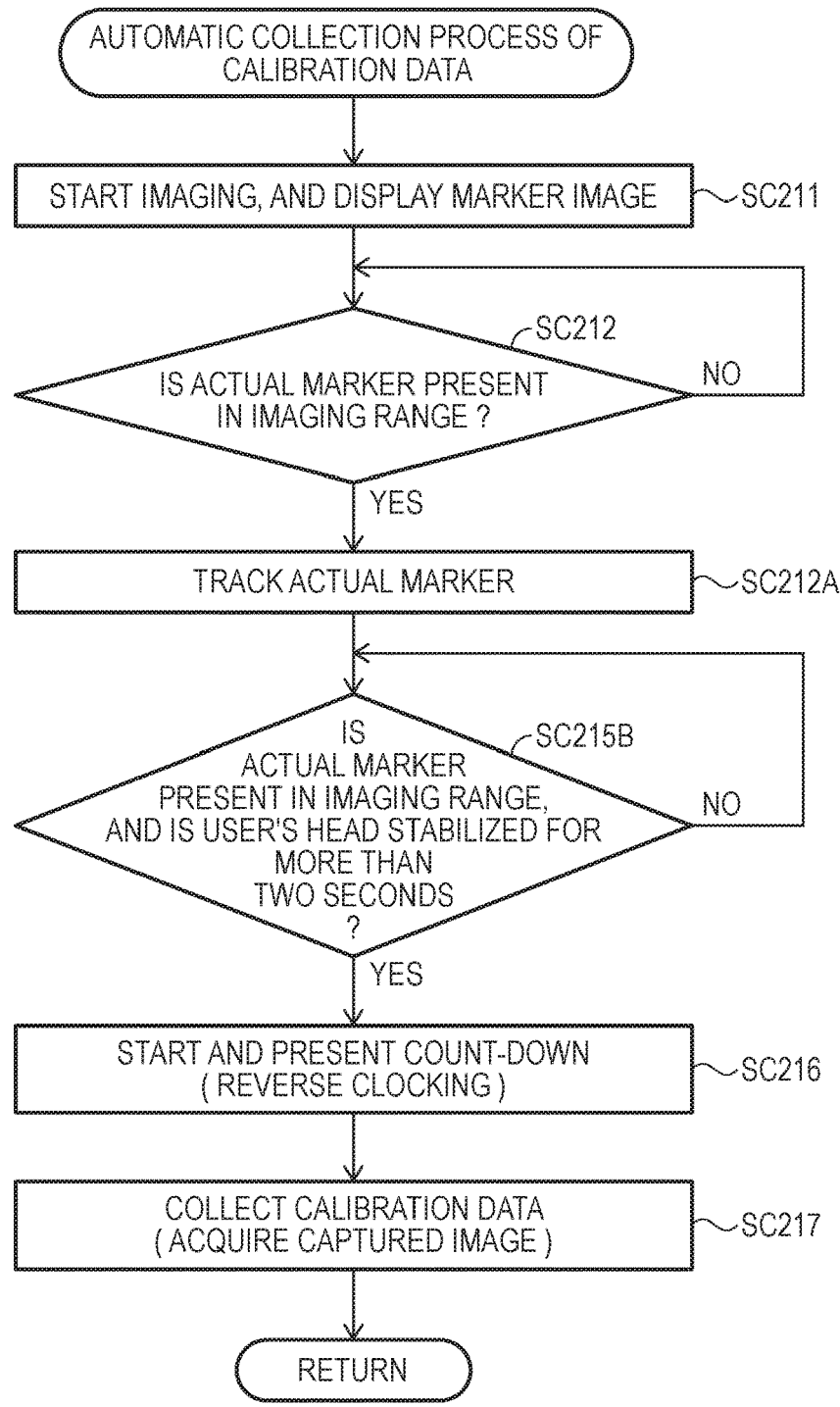
FIG. 32 illustrates a flow of an automatic collection process of calibration data according to another embodiment.

FIG. 32 illustrates a flow of an automatic collection process of calibration data according to another embodiment.

In the flow of FIG. 32, portions between step SC212 and step SC216 are different from those in the flow of FIG. 31, and the other portions are substantially the same as those in the flow of FIG. 31. Therefore, only different portions will be described below.

In the flow illustrated in FIG. 32, after step SC212A, the parameter setting section 167Ca determines whether a real marker MK2 is present in an imaging range of the camera 60Ca and the head of a user US is in a stable state for a predetermined period of time, for example, two seconds (step SC215B). In the case where the parameter setting section 167Ca determines that a real marker is present in the imaging range of the camera 60Ca and the head of the user US is in a stable state for two seconds (step SC215B: Yes), the process proceeds to step SC216. In the case where the determination result in step SC215B is "negative", the parameter setting section 167Ca continuously monitors a captured image and the movement of the head of the user US until this determination is satisfied.

Figure 33:
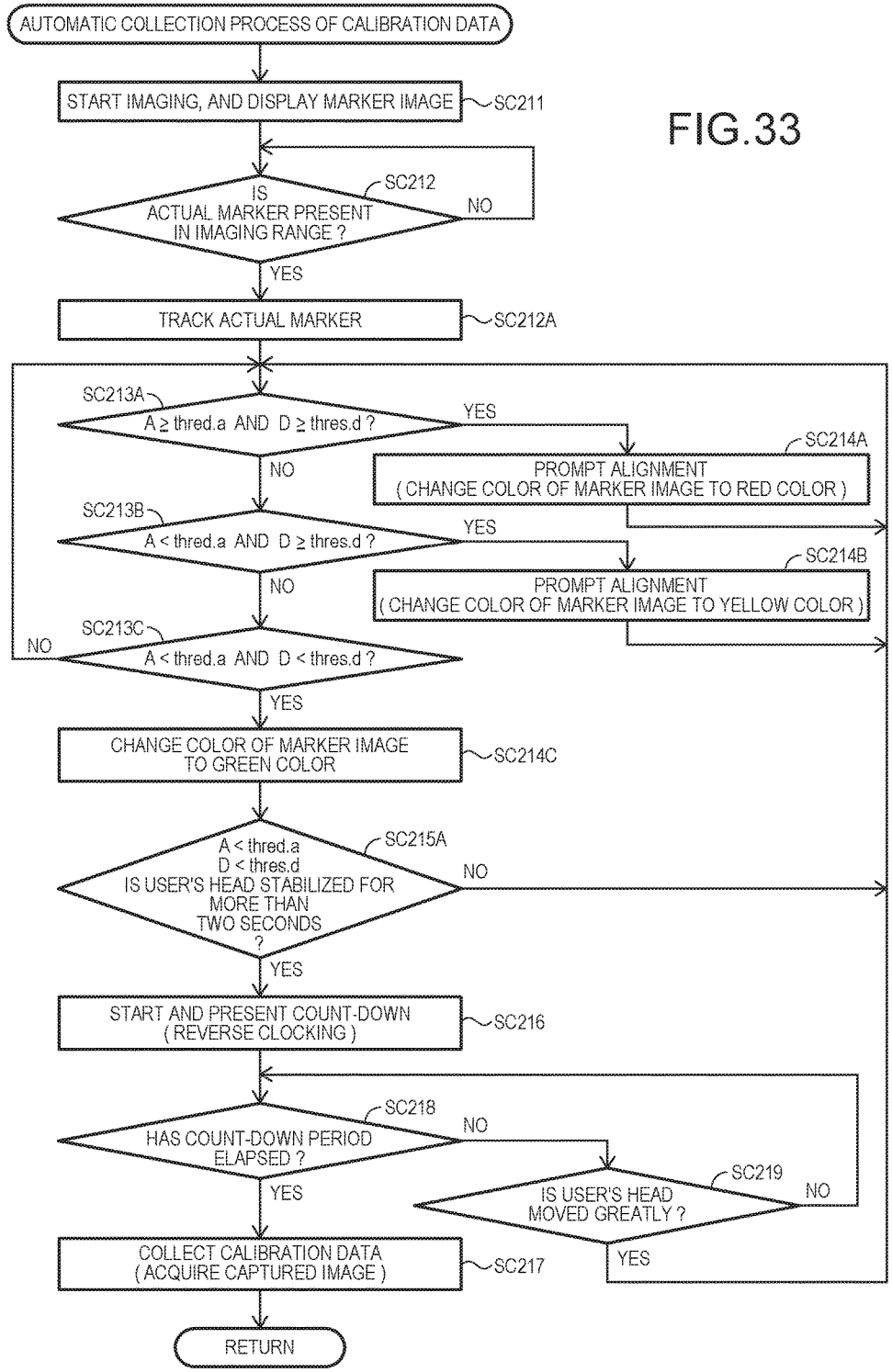
FIG. 33 illustrates a flow of an automatic collection process of calibration data according to another embodiment.

FIG. 33 illustrates a flow of an automatic collection process of calibration data according to another embodiment.

The flow of FIG. 33 is different from the flow of FIG. 31 in that determination steps SC218 and SC219 are added between step SC216 and step SC217 as compared to the flow of FIG. 31, and the other portions are substantially the same as those in the flow of FIG. 31. Therefore, only different portions will be described below.

In the process of FIG. 31, when a count-down process is started (step SC216), calibration data is collected when a predetermined period of time elapses even when alignment by visual observation is not established any longer as a result of a great change in the pose of a user US. In this case, it is not possible to collect accurate calibration data. In the present embodiment, in the case where the movement of the head of the user US within a predetermined period of time in the count-down process has a value equal to or greater than a threshold value, it is possible to stop the count-down process and to perform a process of collecting calibration data again. Specifically, after the count-down process of step SC216 is started, the parameter setting section 167Ca determines whether or not a predetermined period of time (count-down period) has elapsed (step SC218). In the case where the determination result of the parameter setting section 167Ca in step SC218 is "negative" (step SC218: No), it is determined whether or not the movement of the head of the user US has a value equal to or greater than a threshold value, on the basis of an angular velocity or an acceleration which is output by an IMU (step SC219). In the case where the determination result in step SC219 is "negative", the parameter setting section 167Ca collects calibration data at a point in time when the predetermined period of time has elapsed (step S281: Yes) in the process of step SC218 (step SC217). In step SC219, in the case where the parameter setting section 167Ca determines that the movement of the head of the user US has a value equal to or greater than a threshold value, the process of step SC213A and the subsequent processes are performed.

As described above, when a parameter group is adjusted, it is preferable to collect calibration data in a state where a marker image IMG displayed on the HMD 100Ca and a real marker MK2 are visually perceived by a user US so as to be aligned with each other (alignment is established). Whether or not the marker image IMG and the real marker MK2 are visually perceived by the user US with a high level of accuracy affects the accuracy of calibration for deriving a parameter group.

However, when a user touches the controller 10Ca for an instruction or a trigger for data collection even when a marker image and a real marker are visually perceived by the user so as to be aligned with each other with a high level of accuracy, alignment may deviate by the touch especially when the real maker is relatively small, and calibration data is collected (the real marker is imaged) in a state where the alignment deviates. The possibility of alignment deviating due to an utterance operation or a pronouncing operation even in the case of a sound command is not zero. When such a parameter group obtained in a state where alignment deviates is used, the superposition display of an AR image is not performed with a high level of accuracy.

In the automatic collection process of calibration data which is described with reference to FIGS. 31 to 33, it is possible to provide a configuration in which the HMD 100Ca can determine that a marker image and a real marker are visually perceived by a user so as to be aligned with each other even when the user does not necessarily perform a touch operation or give a sound command. In addition, calibration data can be collected using this determination as a trigger, and thus a highly-accurate parameter group is obtained. As a result, it is possible to obtain the HMD 100Ca in which the superposition display of an AR image is performed with a high level of accuracy. Meanwhile, in the present embodiment, it is determined whether or not a "rotation difference A" is less than a threshold value on the basis of a difference between two rotation angles. However, it may be determined whether or not the "rotation difference A" is less than a threshold value on the basis of a difference between rotation angles around one axis or a difference between rotation angles around three axes. The same is true of a "translation difference D".

E-2-3. Second Setting Mode

In a second setting mode, the parameter setting section 167Ca receives an operation of a user US with respect to results of the calibration executed in a first setting mode and corrects the results of the calibration. In other words, the parameter setting section 167Ca corrects the position, size, and depth perception of an AR image (AR model) which is displayed in association with a specific object, on the basis of the received operation.

Figure 34:
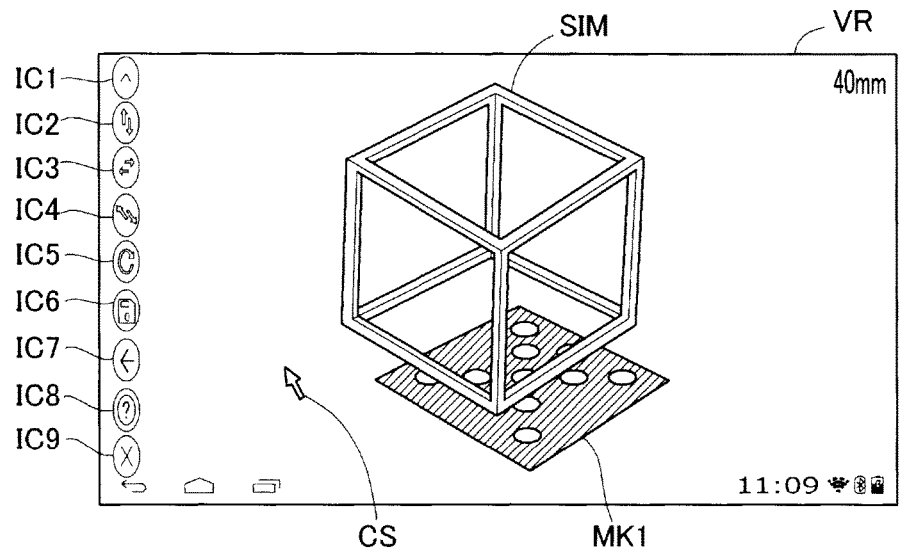
FIG. 34 is a diagram illustrating an example of a field of view which is visually perceived by a user in the case of transitioning to a second setting mode.

FIG. 34 is a diagram illustrating an example of a field of view VR which is visually perceived by a user US in the case of transitioning to a second setting mode. FIG. 34 illustrates a real marker MK1 as a specific object included in an outside scene which is passed through, a setting image SIM which is displayed on the optical image display sections 26Ca and 28Ca in association with the real marker MK1, and eight icons and a cursor image CS which are displayed on the optical image display sections 26Ca and 28Ca in a second setting mode. The eight icons are icons for changing a setting mode in the second setting mode by an operation received by the operation input section 135Ca of the control section 10Ca. In the example illustrated in FIG. 34, the position of the real marker MK1 of the outside scene and the position of the bottom of a regular hexahedron which is the displayed setting image SIM do not overlap each other when seen from a user. In other words, the accuracy of calibration is not sufficient. In this case, in the present embodiment, a user US can correct results of calibration performed on the real marker MK1 and the setting image SIM by operating the operation input section 135Ca in the second setting mode.

When a track pad of the operation input section 135Ca receives a predetermined operation, the parameter setting section 167Ca moves the position of the cursor image CS displayed on the optical image display sections 26Ca and 28Ca. When a decision button of the operation input section 135Ca is pressed down in a state where the cursor image CS overlaps any of the eight icons, the parameter setting section 167Ca transitions to a setting mode which is associated with the icon overlapping the cursor image CS.

An icon IC1 is an icon for transitioning to a mode for enlarging or reducing the setting image SIM when being selected. In a mode of the icon IC1, the operation input section 135Ca receives a predetermined operation, and thus the parameter setting section 167Ca changes the size of the setting image SIM displayed on the optical image display sections 26Ca and 28Ca by correcting either one or both of the above-mentioned camera parameter CP and projection parameter. In the present embodiment, the parameter setting section 167Ca adjusts the size of the setting image SIM by correcting either one or both of focal lengths $F_x$ and $F_y$ in the camera parameter CP and focal lengths $F_x$ and $F_y$ in the projection parameter. A user US can change the size of the setting image SIM so as to be aligned with the size of the real marker MK1 by selecting the icon IC1.

An icon IC2 is an icon for transitioning to a mode for vertically moving the display position of the setting image SIM when being selected. In a mode of the icon IC2, the operation input section 135Ca receives a predetermined operation, and thus the parameter setting section 167Ca corrects transformation parameters of the respective optical image display sections 26Ca and 28Ca, so that the optical image display sections 26Ca and 28Ca vertically move the setting image SIM in a displayable range. In the present embodiment, the parameter setting section adjusts a parameter Rx indicating rotation around the X-axis among the transformation parameters to thereby vertically (that is, in the Y-axis direction) move the setting image SIM. Meanwhile, in the display of the transformation parameter, X and Y indicate the X-axis and the Y-axis of a coordinate system fixed to the optical image display sections 26Ca and 28Ca. Furthermore, as described above, the X-axis may indicate the left-right direction of a user US wearing the HMD 100Ca, and the Y-axis may indicate the up-down direction.

An icon IC3 is an icon for transitioning to a mode for horizontally moving the display position of the setting image SIM when being selected. In a mode of the icon IC3, the operation input section 135Ca receives a predetermined operation, and thus the parameter setting section 167Ca corrects transformation parameters of the respective optical image display sections 26Ca and 28Ca, and the optical image display sections 26Ca and 28Ca horizontally move the setting image SIM in a displayable range. In the present embodiment, the parameter setting section 167Ca adjusts a parameter $R_y$ indicating rotation around the Y-axis among the transformation parameters to thereby horizontally (that is, the X-axis direction) move the setting image SIM. A user US can change the display position of the setting image SIM so as to align the position of the setting image SIM with the real marker MK1 by selecting the icon IC2 and the icon IC3.

An icon IC4 is an icon for adjusting the depth perception of the setting image SIM which is visually perceived by a user US when being selected. In a mode of the icon IC4, the operation input section 135Ca receives a predetermined operation, and thus the parameter setting section 167Ca adjusts Cx which is an X component of a display principal point in projection parameters of the respective optical image display sections 26Ca and 28Ca to thereby change the depth perception of the setting image SIM. When the amount of adjustment of the depth perception is set to be ΔCx, the display principal point of the right optical image display section 26Ca is set to be Cx_right, and the display principal point of the left optical image display section 28Ca is set to be Cy left, the display principal points after the adjustment of the depth perception are expressed as the following Expression (21FC) and Expression (21GC), respectively.

$$Cx\_left = Cx\_left + \Delta Cx \qquad (21FC)$$

$$Cx\_right = Cx\_right - \Delta Cx \qquad (21GC)$$

In the expression of the projection parameter, X indicates the X-axis of a coordinate system fixed to the optical image display sections 26Ca and 28Ca. As described above, the X-axis in this case may indicate the left-right direction of a user US wearing the HMD 100Ca. According to Expression (21FC) and Expression (21GC), center positions of right and left image regions displayed on the right and left optical image display sections 26Ca and 28Ca vary by the same amount in the opposite directions, and thus the right and left image regions come close to or recede from each other. As a result, when the user US observes the right and left image regions with both eyes, the user can visually perceive an AR image (AR object) at an appropriate convergence angle depending on a distance of a specific object. For this reason, depth perceptions of the specific object and the AR image are aligned with each other therebetween.

An icon IC5 is an icon for returning the correction of a parameter group having been executed so far to the value of the parameter group before the execution, when being selected. An icon IC6 is an icon for updating the correction of a parameter group having been executed so far as a new parameter group (a camera parameter CP, a transformation parameter, and a projection parameter) and storing the new parameter group, when being selected.

An icon IC7 is an icon for returning to the last mode which precedes the second setting mode, when being selected. In other words, when the icon IC7 is selected, the display setting section 165Ca displays a selection screen regarding to which setting mode of the second setting mode and the first setting mode illustrated in step SC13 of FIG. 26 the transition is performed, on the optical image display sections 26Ca and 28Ca.

An icon IC8 is an icon for causing the display setting section 165Ca to display "help" which is an explanation on the optical image display sections 26Ca and 28Ca, when being selected. When "help" is displayed, an explanation regarding an operation for executing calibration in a second setting mode and a calibration execution process is displayed on the optical image display sections 26Ca and 28Ca. An icon IC9 is an icon for terminating a calibration execution process including a second setting mode, when being selected.

Figure 35:
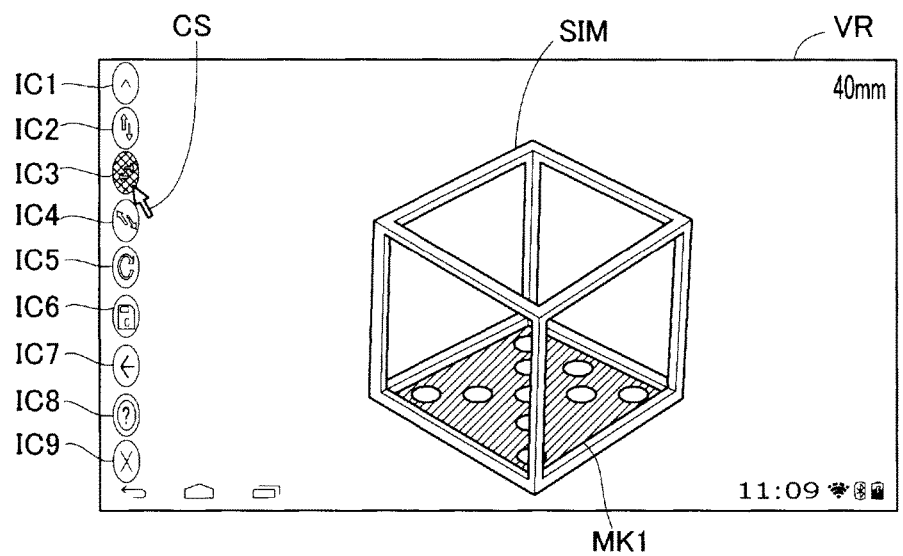
FIG. 35 is a diagram illustrating an example of a field of view which is visually perceived by a user when the display position of a setting image is changed in the second setting mode.

FIG. 34 is a diagram illustrating an example of a field of view VR which is visually perceived by a user US when the display position of a setting image SIM is changed in a second setting mode. In this example, the orientation, size, and depth perception of the setting image SIM already match those of a real marker MK1, and the superposition accuracy of an AR image is improved by adjusting only display positions in horizontal and up-down directions. FIG. 35 illustrates a state where the display position of the setting image SIM is set so that the position of the bottom of a regular hexahedron which is the setting image SIM is aligned with the position of the real marker MK1, by a predetermined operation being received by the operation input section 135Ca after an icon IC2 and an icon IC3 are selected in the second setting mode. As a specific operation, first, the display position of the setting image SIM in the up-down direction is aligned with the real marker MK1 by the icon IC2 being selected, and the display position of the setting image SIM in the left-right direction is aligned with the real marker MK1 by the icon IC3 being selected. Thereafter, when an icon IC5 is selected, a transformation parameter is updated and stored.

As described above, in the HMD 100Ca according to the third embodiment, the camera 60Ca captures an outside scene including a specific object. The parameter setting section 167Ca acquires, from the camera 60Ca, a captured image of the specific object in a state where the specific object is visually perceived by a user US so that the position and pose of a model marker displayed on the optical image display section 26Ca (28Ca) as a marker image IMG are substantially aligned with those of a real marker MK1 (MK2). The parameter setting section 167Ca sets a parameter group on the basis of at least the acquired captured image. The parameter group includes a camera parameter CP of the camera 60Ca, transformation parameters from 3D to 3D which indicate a spatial relationship between the camera 60Ca and each of the right optical image display section 26Ca and the left optical image display section 28Ca, and projection parameters from 3D to 2D for displaying any 3D model on the optical image display sections 26Ca and 28Ca as an image. The HMD 100Ca estimates the position and pose of the specific object using the camera parameter CP. In addition, the HMD 100Ca displays an AR image on each of the optical image display sections 26Ca and 28Ca so that an AR model associated with the specific object is visually perceived by a user US as an AR image in a state where the position and pose of the AR model and the position and pose of the specific object correspond to each other, preferably, are substantially aligned with each other, using the transformation parameters and the projection parameters. Therefore, it is possible to provide the HMD 100Ca capable of making a user US to visually perceive the specific object and the AR model (AR image) associated with the specific object so that the specific object and the AR model correspond to each other, preferably, are substantially aligned with each other, by calibration in a first setting mode.

In addition, in the HMD 100Ca according to the third embodiment, the parameter setting section 167Ca sets at least one parameter among the camera parameter CP, the transformation parameters, and the projection parameters so that a user US visually perceives a setting image SIM displayed on the optical image display sections 26Ca and 28Ca in a state where the position, size, and depth perception of the setting image SIM and the position, size, and depth perception of a real marker MK1 (MK2) correspond to each other, preferably, are aligned with each other, in accordance with an operation received by the operation input section 135Ca in a second setting mode. For this reason, in the HMD 100Ca according to the third embodiment, the operation input section 135Ca receives a predetermined operation, and thus the user US can further manually correct a positional relationship between the specific object and the AR model (AR image). Thereby, the user US can easily perform calibration and execute calibration with a higher level of accuracy.

In addition, in the HMD 100Ca according to the third embodiment, the parameter setting section 167Ca sets a parameter regarding at least one of a camera parameter CP and a transformation parameter, using a captured image obtained by the camera 60Ca in a first setting mode. In addition, the parameter setting section 167Ca sets a parameter regarding at least one of a camera parameter CP, a transformation parameter, and a projection parameter in accordance with a predetermined operation received by the operation input section 135Ca in a second setting mode. For this reason, in the HMD 100Ca according to the third embodiment, the camera parameter CP and the transformation parameter that are set in the first setting mode can be individually set in the second setting mode. Thereby, it is possible to individually adjust parameters that have not been adjusted in the first setting mode. As a result, it is possible to improve accuracy at the time of displaying a specific object and an AR image associated with the specific object so that the specific object and the AR image are superposed on each other.

In addition, in the HMD 100Ca according to the third embodiment, the camera 60Ca is disposed so as to be able to change the orientation thereof with respect to the mounting band 90Ca. The optical image display sections 26Ca and 28Ca capable of displaying a setting image SIM are disposed so as to be able to the relative positions thereof with respect to the mounting band 90Ca. As a result, the camera 60Ca is disposed so that the position and orientation thereof can be changed with respect to the optical image display sections 26Ca and 28Ca (HMD 100Ca is also referred to as a "camera movable HMD"), and thus it is necessary to set calibration in accordance with a change in a positional relationship between the camera 60Ca and the optical image display sections 26Ca and 28Ca. In the HMD 100Ca according to the third embodiment, a user US can easily execute calibration required in accordance with a change in positional relationship by executing a first setting mode and a second setting mode. In an HMD (also referred to as a "camera fixed HMD") in which a spatial relationship between a camera and the optical image display sections 26Ca and 28Ca is fixed, the optimization of a spatial relationship between the camera and the optical image display section may also be performed by setting rotations and translations indicating the spatial relationship to be variable as calibration parameters, every time calibration (first setting mode) is performed by a user US. Such calibration is useful when the above-mentioned spatial relationships over individual HMDs are largely dispersed due to manufacturing errors even in the camera fixed HMD.

In addition, in the HMD 100Ca according to the third embodiment, the display setting section 165Ca displays a setting image SIM in association with a real marker MK2 or a real marker MK1 which is an imaged specific object, on the basis of a camera parameter CP and a transformation parameter that are set by the parameter setting section 167Ca. For this reason, in the HMD according to the third embodiment, a user US can visually perceive results of calibration which is executed and determine whether or not it is necessary to execute additional adjustment, and thus user convenience is improved.

In the HMD 100Ca according to the third embodiment, in the case where a marker image IMG and a real marker MK2 have a predetermined positional relationship, a distance between the right optical image display section 26Ca having the marker image IMG displayed thereon and the real marker MK2 has a value equal to or less than a predetermined value, and the head of a user US is stopped in an alignment process, the display setting section 165Ca displays a character image indicating count-down on the right optical image display section 26Ca. After the count-down has passed, the parameter setting section 167Ca makes the camera 60Ca image the real marker MK2 to thereby set a camera parameter CP and a transformation parameter. For this reason, in the HMD 100Ca according to the third embodiment, when imaging data of the real marker MK2 which is required for the execution of calibration is acquired, it is not necessary to press a specific button or to execute sound recognition, and image capturing by the camera 60Ca is automatically performed. Accordingly, it is possible to reduce a deviation in superposition (alignment) between the real marker MK2 and the marker image IMG due to a user's operation, the generation of a sound, or the like. Thereby, it is possible to acquire imaging data of highly-accurate alignment and to improve the accuracy of calibration.

In addition, in the HMD 100Ca according to the third embodiment, the parameter setting section 167 calculates an imaginary position and pose of a specific object with respect to the right optical image display section 26Ca or the left optical image display section 28Ca, using a calculated spatial relationship between the camera 60Ca and the specific object and a default spatial relationship between the camera and the optical image display sections 26Ca and 28Ca as a predetermined positional relationship and a predetermined value of a distance. The parameter setting section 167Ca compares the imaginary position and pose of the specific object with an imaginary position and pose of a model marker displayed (projected) as a marker image IMG with respect to the optical image display sections 26Ca and 28Ca to thereby calculate a deviation of a parameter regarding the rotation and a deviation of a parameter regarding the translation thereof of both the positions and poses. The display setting section 165Ca displays information regarding count-down until the camera 60Ca captures an outside scene on the right optical image display section 26Ca or the left optical image display section 28Ca, on the basis of a difference between the deviations. In addition, the display setting section 165Ca displays a character image for prompting a user US to perform alignment between the marker image IMG and a real marker MK2 which is a specific object, on the right optical image display section 26Ca in accordance with the difference in the parameter regarding rotation or the difference in the parameter regarding translation. For this reason, in the HMD 100Ca according to the third embodiment, the user US can recognize a deviation between the marker image IMG and the real marker MK2 as visual information and to easily execute calibration with a high level of accuracy.

In addition, in the HMD 100Ca according to the third embodiment, the display setting section 165Ca displays an image, obtained by changing the color of a marker image IMG associated with a real marker MK2 as a specific object, on the right optical image display section 26Ca as information indicating count-down until the camera 60Ca captures an image. For this reason, in the HMD 100Ca according to the third embodiment, it is possible to make a user US visually perceive a timing at which the camera 60Ca captures the real marker MK2, as visual information, and the user US can execute calibration sensuously.

F. Fourth Embodiment

A fourth embodiment is different from the third embodiment in a real marker imaged by a camera 60Ca during the execution of calibration and a portion of a first setting mode for capturing the real marker. For this reason, in the fourth embodiment, processes different from those in the third embodiment will be described, and the other same processes as those in the third embodiment will not be described.

Figure 36:
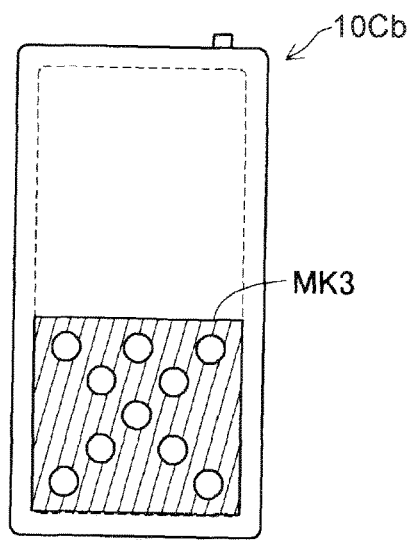
FIG. 36 is a front view illustrating a rear face of a control section according to a fourth embodiment.

FIG. 36 is a front view illustrating a rear face of a control section 10Cb according to the fourth embodiment. FIG. 36 illustrates a rear face in the case where a surface having an operation input section 135Ca in the control section 10Cb formed thereon is defined as a front face. As illustrated in FIG. 36, a real marker MK3 obtained by reducing a real marker MK1 is disposed on the rear face of the control section 10Cb.

In a first setting mode of the fourth embodiment, first, a display setting section 165Ca displays a marker image IMG on a right optical image display section 26Ca, similar to the first setting mode in the third embodiment (step SC201 of FIG. 27). A parameter setting section 167Ca prompts a user US to perform alignment between the marker image IMG and the real marker MK3 disposed on the rear face of the control section 10Cb (step SC210). When the alignment between the real marker MK3 and the marker image IMG is performed, the display setting section 165Ca displays a marker image IMG, having a size different from that of the marker image IMG displayed on the right optical image display section 26Ca in step SC201, on the right optical image display section 26Ca unlike the third embodiment (step SC202). The parameter setting section 167Ca prompts the user US to perform alignment between the marker image IMG having a size different from that in the process of step SC201 and the real marker MK3 (step SC220). Here, two marker images IMG having different sizes are generated by two-dimensionally projecting the same model markers having different imaginary positions (distance along the Z-axis) with respect to optical image display sections 26Ca and 28Ca by a projection parameter in the present embodiment. In the process of step SC220 in the fourth embodiment, even when there is one real marker to be used, there is an attempt to establish alignment with respect to two marker images IMG having different sizes, and thus the user US aligns the right optical image display section 26Ca having the marker image IMG displayed thereon and the real marker MK3 with each other while changing a distance therebetween, similar to the third embodiment. The process of step SC203 and the subsequent processes in the first setting mode are the same as the processes with respect to the right optical image display section 26Ca, and thus a description thereof will be omitted here.

In an HMD 100Cb according to the fourth embodiment, even when there is one real marker MK3, it is possible to execute calibration with a high level of accuracy by changing a marker image IMG displayed on the right optical image display section 26Ca or the left optical image display section 28Ca in the first setting mode.

G. Fifth Embodiment

A fifth embodiment is different from the third embodiment in the shape of a real marker imaged by a camera 60Ca during the execution of calibration and the shape of a marker image IMG corresponding to the real marker. For this reason, in the fifth embodiment, the shape of a real marker and the specification of a real marker which are different from those in the third embodiment will be described, and the other configurations will not be described.

Figure 37:
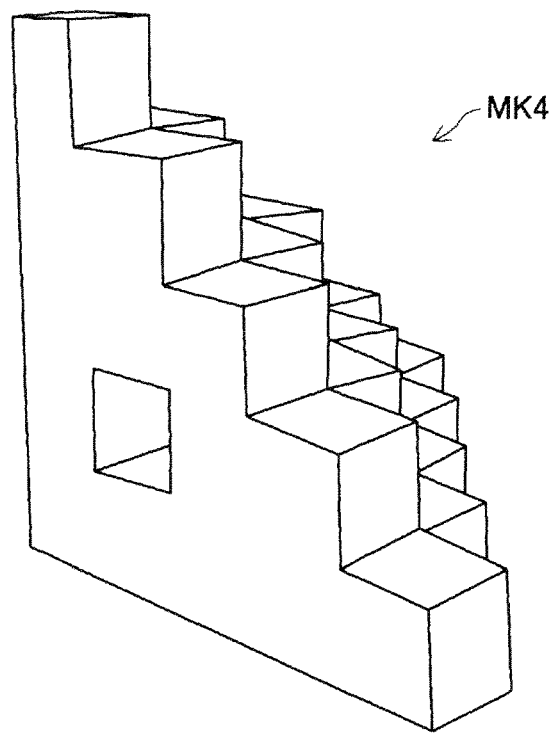
FIG. 37 is a schematic diagram illustrating an example of a real marker according to a fifth embodiment.
Figures 38, 39:
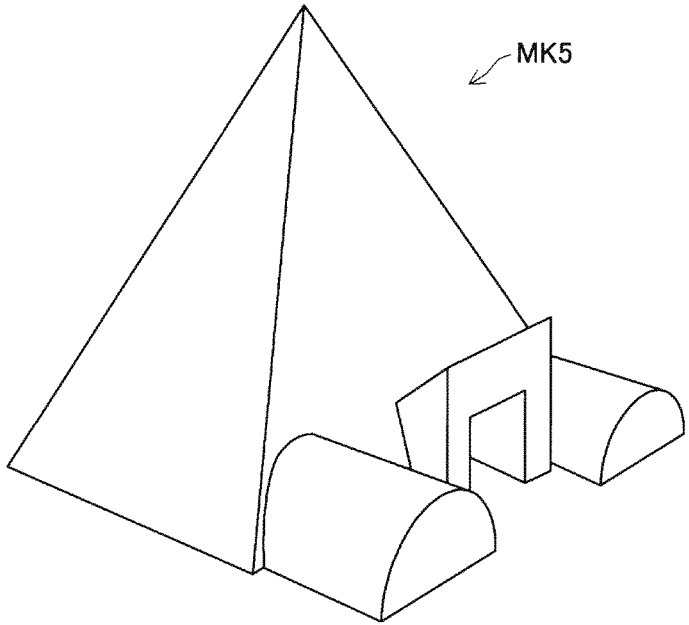
FIG. 38 is a schematic diagram illustrating an example of a real marker according to the fifth embodiment.
FIG. 39 illustrates tables showing elements related to parameters that are set in a first setting mode.

FIGS. 37 and 38 are schematic diagrams illustrating an example of a real marker according to the fifth embodiment. FIG. 37 illustrates a three-dimensional block which is formed in the form of steps, as a real marker MK4. Similarly, FIG. 38 illustrates a three-dimensional block in which blocks such as semicircular cylinders are added to a triangular pyramid, as a real marker MK5. A marker image storage section 138b according to the fifth embodiment stores data of three-dimensional models corresponding to the real marker MK4 and the real marker MK5 together with the feature points thereof. For this reason, a marker specification section 166Ca can estimate the position and pose of the real marker MK4 or the real marker MK5 with respect to the camera 60Ca by estimating a correlation between the feature points stored in the marker image storage section 138b and feature points in a captured image. As a method of specifying a feature point, edge detection in which a distance to a specific position is specified by a stereo camera and the specified distance is used, or the like may be used, or a known technique can be used. The position and pose of the real marker MK4 or MK5 may be estimated by methods other than the above method, for instance with a monocular camera. Once the position and pose of the real marker MK4 or MK5 have been obtained, they may be used to establish 2D-3D feature correspondences so that one of the parameters described in the above embodiments is derived based on the correspondences.

The storage section may store a 3D model marker having a shape similar to the shape of the real marker MK4 or the real marker MK5. Meanwhile, similarly to the third embodiment, the model marker is defined within an imaginary three-dimensional space. In an HMD 100Cb, the model marker, which is set to have a predetermined position and pose with respect to optical image display sections 26Ca and 28Ca, is projected by the above-mentioned projection parameter and is displayed on the optical image display sections 26Ca and 28Ca as a marker image IMG. Hereinafter, similarly to the third embodiment, a user US establishes alignment between the marker image IMG and the real markers MK4 and MK5.

As described above, in the HMD 100Cb according to the fifth embodiment, calibration is executed using a three-dimensional model having more feature points than a two-dimensional model, and thus it is possible to execute calibration with a high level of accuracy. Besides, potentially providing more feature points, the three-dimensional model may help user improve alignment accuracy especially in rotations and/or scales.

H. Modification Example

Meanwhile, the invention is not limited to the above-described embodiments, and can be implemented in various aspects without departing from the scope of the invention. For example, the following modifications can also be made.

H-1. Modification Example 1C

In the third to fifth embodiments, as illustrated in FIGS. 18 to 20, a description has been given of the HMDs 100 in which the position and orientation of the camera 60Ca with respect to the optical image display sections 26Ca and 28Ca change. The calibration described in the third to fifth embodiments is also effective in an HMD 101 in which the position of the camera 60Ca with respect to the optical image display sections 26Ca and 28Ca does not change. Meanwhile, hereinafter, the HMD 100 described in the third to fifth embodiments is also referred to as a "camera movable HMD", and the HMD 101 in which the position of the camera 60Ca is fixed is also referred to as a "camera fixed HMD". For example, even in the case of the camera fixed HMD, if the variance of errors that are present in rotations and translations indicating a spatial relationship between the camera 60Ca and the optical image display sections 26Ca/28Ca is large among individual HMDs having been produced under the same specifications, a calibration process may be performed so as to adjust a relationship including the rotation and the translation every time before a user US displays an AR image.

FIG. 39 illustrates tables showing elements related to parameters that are set in a first setting mode. In the case where a transformation parameter is set in the first setting mode, it is possible to make a selection of a distance from the optical image display sections 26Ca and 28Ca to a specific object, a selection regarding which parameter is preferentially optimized, and the like.

As illustrated in FIG. 39, "display of a marker image IMG" includes two display modes of a both-eyes display and a single-eye display. The both-eyes display indicates the case where a marker image IMG is simultaneously displayed on the right optical image display section 26Ca and the left optical image display section 28Ca and a user US performs alignment therebetween. The single-eye display indicates the case where a marker image IMG is displayed on the right optical image display section 26Ca or the left optical image display section 28Ca and a user US separately performs alignment on the right optical image display section 26Ca and the left optical image display section 28Ca. In a camera movable HMD which is the HMD 100 and a camera fixed HMD which is the HMD 101 according to the above embodiments, a single-eye display is adopted.

The "structures of a real marker and a model marker" include "2D" using a two-dimensional object (a plane figure or the like) and "3D" using a three-dimensional object, as a model marker and real markers MK1, MK2, MK3, and MK4 serving as the base of the marker image IMG. In a camera movable HMD which is the HMD 100 and a camera fixed HMD which is the HMD 101, a marker image IMG obtained by projecting a two-dimensional model marker, and two-dimensional real markers MK1/MK2 may be adopted as described in the third embodiment.

The "position and pose of a model marker (marker image IMG)" indicates whether a marker image IMG displayed on the optical image display sections 26Ca and 28Ca is fixedly displayed on the optical image display sections 26Ca and 28Ca or is customized when a user US performs alignment, which will be described in detail below.

In the present embodiment, a model marker which is three-dimensionally represented is used, and the model marker is rendered (drawn) as a marker image IMG as if the model marker is directly fixed to a place separated from the optical image display sections 26Ca and 28Ca by a predetermined distance. An imaginary position and pose of the model marker with respect to the optical image display sections 26Ca and 28Ca are determined (fixed) in advance. The position and pose are usually selected with respect to a specific HMD on the basis of the following conditions.

(1) Real marker MK1 or MK2 is simultaneously viewed by a user US and the camera 60Ca. For example, a camera mounted on an HMD may be positioned at a right leg of a spectacle type structure. Therefore, when an alignment distance is excessively short, the markers may not be included in a captured image.

(2) The position and pose that are determined in advance are selected for a place of a position and a pose (particularly, a distance) in which a large number of AR scenarios are generated. This is because the superposition accuracy (or calibration accuracy) of an AR image is high in a vicinity region including a place where alignment is performed, and is reduced in the case of deviating from the region.

However, the above-mentioned position and pose that are determined in advance, that is, an alignment pose which is determined in advance is not necessarily essential in other embodiments. According to other embodiments, the position and pose of real markers MK1 and MK2 (MK4, MK5) imaged by a camera 60Ca are continuously tracked, and a model marker is displayed on optical image display sections 26Ca and 28Ca as a marker image IMG using the tracked position and pose and an existing or default parameter group. In addition, the rendering (drawing) of a model marker (marker image IMG) is updated in accordance with the tracked position and pose, and a user US determines the position and pose of a marker image IMG recognized as being best for alignment by the user US. For example, the user US can move around the real marker MK1 or MK2 until the real marker MK1 or MK2 look unique and a position and a pose (field of view) in which an existing parameter group (existing calibration results) shows an obvious error are found. The parameter setting section 167Ca stops updating a position and a pose using a new tracking pose at a point in time which is designated by the user US. In this case, the model marker (marker image IMG) is stopped and drawn, and the user US makes a change to his or her own position and pose so as to be able to visually perceive the marker image IMG and the real marker MK1 or MK2 which are aligned with each other. The user US can also establish alignment by such a method.

An image processing section 160Ca includes a rendering engine used to display a model marker, and OpenGL in the rendering engine generates CG using a matrix product of "PVM". Here, P indicates a projection parameter, V denotes the position and pose of a model marker with respect to the optical image display sections 26Ca and 28Ca, and M denotes internal coordinates of the model marker (3D model). In the case where a marker image having a model marker projected thereto is desired to be rendered (drawn) for alignment by visual observation of a user US, V may be limited to, for example, [I:0, 0, d1] as in the third embodiment. Meanwhile, here, I denotes a unit matrix and is rotation expressed by a coordinate system of the optical image display section 26Ca or 28Ca, and d of (0, 0, d) is an alignment distance and is translation expressed by a coordinate system of the optical image display section 26Ca or 28Ca.

Customized alignment means that an existing or default parameter group is used as V instead of using a fixed V and the positions and poses (hereinafter, tracking poses) of the real markers MK1 and MK2, which are tracked at a point in time when a user US fixes the tracking of the positions and poses, are used.

$$V = H \cdot T \tag{21HC}$$

In Expression (21H), T indicates a tracking pose (position and pose with respect to the camera 60Ca) which is obtained by tracking through the camera 60Ca, and H indicates a transformation matrix (spatial relationship) between a present or default camera and a display.

Advantages of the customized alignment are shown as follows.

(1) A case of a camera movable HMD in which a spatial relationship between a camera 60Ca and optical image display sections 26Ca and 28Ca changes greatly depending on a user' wearing condition and a distance range of an AR scenario: in a certain case, there is the possibility that a calibration process according to the present embodiment cannot be successfully performed using either one of real marker MK1 or MK2, having different sizes, which are located at corresponding distances. This is because the camera 60Ca may not view (complement) the real markers MK1 and MK2. The real marker MK1 or MK2 may deviate from a captured image obtained by the camera 60Ca to the upper or lower outside portions thereof. In this case, the prompting of a user US to select an alignment distance is a solution.

(2) A case where a user US desires to achieve a higher superposition accuracy of an AR image for a distance of a specific AR scenario, particularly, a case where a distance that the user US is interested in is not in a calibration range: in a case where the user US obtains accuracy in a wide distance range, the user can rather select a plurality of distances within the range, and can perform alignment a plurality of times.

(3) In a case where a user US uses a 3D object created by himself or herself as a real marker, the user US needs to define (determine) an alignment distance.

Referring back to FIG. 39, a "parameter to be adjusted" indicates a parameter which is adjusted in a calibration process. As described later, a camera parameter CP of the camera 60Ca included in the HMD 100 does not necessarily need to be adjusted. In addition, even in the case of a camera fixed HMD, it may be preferable to adjust a transformation parameter indicating a spatial relationship (rotations and translations) between the camera 60Ca and the right and/or left optical image display sections 26Ca and/or 28Ca.

H-2. Modification Example 2C

Factory calibration (initial calibration) of optical image display sections 26Ca and 28Ca and a camera 60Ca:

For example, in a service station, a camera parameter CP of the camera 60Ca, a spatial relationship (transformation parameter) between the camera 60Ca and the optical image display sections 26Ca and 28Ca, and initial values (default values) of projection parameters of the optical image display sections 26Ca and 28Ca may be derived by a process having the following steps.

1. Calibration of a high-resolution measuring camera is separately performed.

2. Calibration of the camera 60Ca included in the HMD 100 is separately performed to thereby derive a camera parameter CP.

3. The HMD 100Ca and the measuring camera are set up on a special jig. A planar pattern is installed as a world coordinate system.

4. Several positions are defined on the jig with respect to the measuring camera. In addition, the position and pose of the measuring camera with respect to the planar pattern are estimated at each of the positions.

5. An imaginary pattern having an imaginary position and pose with respect to the optical image display section 26Ca is projected to the optical image display section 26Ca. Meanwhile, the imaginary position and pose with respect to the optical image display section 26Ca are the same as the position and pose of a planar pattern with respect to the optical image display section 26Ca.

6. The measuring camera is moved to the defined plurality of positions, and an image of the imaginary pattern displayed on the optical image display section 26Ca is captured at each of the positions.

7. A 3D position which is projected using the captured images is reconstructed.

8. An internal parameter (projection parameter) of the optical image display section 26Ca is estimated using a 2D-3D correlation.

9. The poses of two cameras (the camera 60Ca and the measuring camera) with respect to the planar pattern are calculated, and a transformation parameter between the camera 60Ca and the optical image display section 26Ca is solved.

10. The steps of 4 to 9 are repeated with respect to the optical image display section 28Ca.

H-3. Modification Example 3C

A camera movable HMD which is the HMD 100 and a camera fixed HMD which is the HMD 101 are different from each other in the presence or absence of changes in the position and orientation of a camera 60Ca with respect to optical image display sections 26Ca and 28Ca. For this reason, in the camera fixed HMD and the camera movable HMD, a parameter which is preferentially optimized may be changed to a different parameter in a first setting mode. For example, in the camera fixed HMD, a camera parameter CP may be optimized by calibration, with respect to the camera movable HMD.

A parameter to be optimized includes a camera parameter CP and a transformation parameter. In the camera fixed HMD, a camera parameter CP is optimized by calibration by using a design value during the manufacture of the HMD 101 as a fixed value. A camera parameter CP to be optimized includes a focal length of the camera 60Ca and a principal point position (center position of a captured image) of the camera 60Ca. In the camera fixed HMD, a transformation parameter to be optimized includes a rotation parameter and a translation parameter of each of X, Y, and Z axes of each of the right optical image display section 26Ca and the left optical image display section 28Ca.

In the camera movable HMD, a camera parameter CP does not necessarily need to be optimized. In the camera movable HMD, since the camera 60Ca is movable with respect to the optical image display sections 26Ca and 28Ca, a deviation of a transformation parameter may greatly affect the display of an AR image rather than a deviation of a camera parameter, and thus a transformation parameter is preferentially optimized.

H-4. Modification Example 4C

In the third embodiment, the display setting section 165Ca displays a character image for prompting alignment on the right optical image display section 26Ca, but various modifications can be made to a method of prompting a user to perform alignment. For example, the display setting section 165Ca may output a sound of "displacement is detected" through earphones 32Ca and 34Ca to thereby prompt a user to perform alignment. In addition, various modifications can be made to the character image, and the display setting section 165Ca may display an image of an arrow indicating a direction in which displacement is corrected, on the right optical image display section 26Ca, instead of displaying the character image.

In other embodiments, various modifications can be made to a method of notifying a user of a time until capturing. For example, a display setting section 165Ca may output a number indicating a time until capturing as a sound through earphones 32Ca and 34Ca to thereby notify a user of the time until capturing. In addition, the display setting section 165Ca may display only a number of "3" on a right optical image display section 26Ca, for example, during countdown to thereby notify a user of a time until capturing. In addition, the display setting section 165Ca may display a straight line on the right optical image display section 26Ca in such a manner that the length of the straight line is reduced as time goes by, thereby expressing the length of a time until capturing.

H-5. Modification Example 5C

In the third embodiment, calibration is executed by performing alignment twice on each of the right optical image display section 26Ca and the left optical image display section 28Ca in the first setting mode, but various modifications can be made to the number of times of alignment. The number of times of alignment is increased, and thus a parameter for executing calibration with a higher level of accuracy may be set in the optimization of each parameter using a Jacobian matrix. Hereinafter, an example of the optimization of a parameter will be described.

The number of times of alignment is set to be A, and the number of feature elements (for example, the center of a circle) of real marker MK1 or MK2 is set to be n. When the number of parameters to be adjusted with respect to a pair of a camera 60Ca and an image display section (in the third embodiment, a pair of the camera 60Ca and either one of the right and left optical image display sections 26Ca and 28Ca) is set to be m, the total number of parameters to be optimized is M and satisfies the following Expression (22C).

$$M \leq 2n \tag{22C}$$

Regarding each iteration, a pseudo code of optimization is as follows. First, regarding each alignment, a Jacobian matrix Js is calculated with respect to a pair of the camera 60Ca and the right optical image display section 26Ca and a pair of the camera 60Ca and the left optical image display section 28Ca. The Jacobian matrix Js can be expressed as a 2n×M matrix. Next, a 2n×1 residual matrix es is calculated. The above-mentioned process is performed on each of A alignments.

Next, the Jacobian matrix Js having a size of 4n×M is merged to a matrix J. The residual matrix es is connected thereto to thereby generate a 4n×1 matrix e. Elements of the matrix e may be expressed as Expression (12). In addition, an increase value dp of a selected parameter is calculated.

$$dp = \text{inverse}(\text{transpose}(J)*J+B)*\text{transpose}(J)*e \tag{23C}$$

Here, B in Expression (23C) indicates a correction matrix and is used to avoid a convergence problem in the case where transpose (J)*J in Expression (23C) is not successfully adjusted. Meanwhile, in the above-mentioned expression, "inverse( )" means an inverse matrix of a matrix within parentheses, and "transpose( )" means a transposed matrix of a matrix within parentheses. Next, a parameter p is updated as in Expression (24C).

$$p = p + dp \tag{24C}$$

In the case where the updated parameter p satisfies termination conditions, optimization is terminated. In the case where the updated parameter does not satisfy termination conditions, optimization is iteratively performed.

H-6. Modification Example 6C

In the above-described embodiments, the parameter setting section 167Ca also derives a camera parameter CP by optimization. However, in the case where there is less variation from a design value during manufacture, a design value may be set with respect to the camera parameter CP, and only a spatial relationship between the camera 60Ca and the optical image display sections 26Ca and 28Ca may be derived. In an HMD 100 according to this modification example, the number of parameters to be optimized is decreased. In addition, it is possible to reduce a time for optimizing a parameter while optimizing a parameter for making a cost function E smaller by substituting a design value for a parameter having less variation in manufacturing.

In the above-described embodiments, a marker displayed on the right optical image display section 26Ca and a marker displayed on the left optical image display section 28Ca are the same marker image IMG, but various modifications can be made to the marker image IMG and the real markers MK1 and MK2. For example, images of the markers respectively displayed on the right optical image display section 26Ca and the left optical image display section 28Ca may be different images. In addition, various modifications can be made to the marker image IMG and the real markers MK1 and MK2 in accordance with the accuracy of a parameter to be derived. For example, the number of circles included in the real marker MK1 is not limited to ten, may be greater than ten, and may be less than ten. In addition, a plurality of feature points included in the real marker MK1 may not be the center of the circle, and may be simply the center of gravity of a triangle. In addition, a plurality of straight lines, which are not parallel to each other, may be formed within the real marker MK1, and intersections between the straight lines may be specified as a plurality of feature points. In addition, the marker image IMG and the real markers MK1 and MK2 may be different markers. In the case where a marker image and a real marker are superposed on each other, various modifications can be made to the marker image and the real marker in a range in which a user visually perceives the superposed portion. For example, alignment may be performed on a rectangular marker image so that the center of a real marker which is a substantially perfect circle is aligned with the center of a marker image.

In the above-described embodiments, in the case where a camera parameter CP of the camera 60Ca is optimized, focal lengths (Fx, Fy) and camera principal point positions (center positions of a captured image) (Cx, Cy) are optimized. Instead of these or together with this, one of distortion coefficients may be optimized as the camera parameter CP of the camera 60Ca.

H-7. Modification Example 7C

The following additional constraint conditions may be added to the cost function of Expression (15C) defined in the third embodiment. Alignment by the visual observation of a user US is separately performed with respect to each of optical image display sections 26Ca and 28Ca, and thus the alignment errors thereof are not necessarily the same as each other. For this reason, among two translations of a camera 60Ca with respect to the right and left optical image display sections 26Ca and 28Ca, the estimation of a Ty component may greatly vary between the optical image display sections 26Ca and 28Ca. In the case where two Ty components are greatly different from each other, a user experiences a fusion problem of a stereoscopic view. Since a maximum difference in a translation Ty between the camera 60Ca and the optical image display sections 26Ca and 28Ca is a predetermined finite value, a function defined as in the following Expression (25C) as a function of an absolute value of a difference between right and left Ty may be added to Expression (15C). Expression (25C) is then introduced into the following Expression (26C).

$$\text{abs}(T_y\_\text{left} - T_y\_\text{right}) \tag{25C}$$

$$1 \bigg/ \exp\left(-\frac{(ds - ts)^2}{2d^2}\right) \tag{26C}$$

Here, elements included in Expression (26C) are expressed as the following Expression (27C) to Expression (29C).

$$ds = (T_y\_\text{left} - T_y\_\text{right})^2 \tag{27C}$$

$$ts = (\text{acceptable difference})^2 \tag{28C}$$

$$d^2 = (\text{maximum difference})^2 - (\text{acceptable difference})^2 \tag{29C}$$

In the above-mentioned Expression (28C) and Expression (29C), "acceptable difference" is an allowable Ty difference, and "maximum difference" is a maximum value of an estimated Ty difference.

Expression (15C) is as follows.

$$E = E_L + E_R + 1 \bigg/ \exp\left(-\frac{(ds - ts)^2}{2d^2}\right) \tag{30C}$$

Here, "acceptable difference" and "maximum difference" may be empirically set. In addition, when a difference between Ty_left and Ty_right is large, a cost function E increases. For this reason, the cost function E approximates a global minimum while a variable p (particularly, a right Ty_right and a left Ty_left) is forced so as to fall within a request range. In the calculation of optimization, a new row (horizontal row of a matrix) is added to a Jacobian matrix J, and an e matrix is generated in iteration steps of the optimization. An error calculated from the above-mentioned function is added to the end of the e matrix. The new row in the Jacobian matrix J takes a value of zero with respect to all parameters except for Ty_left and Ty_right. In addition, entries (initial values) corresponding to the two parameters may be set to 1 and −1, respectively.

The invention is not limited to the above-described embodiments and modification examples, but various configurations can be realized without departing from the scope of the invention. For example, the technical features in the embodiments and modification examples which correspond to the technical features of the respective aspects described in Summary can be appropriately replaced or combined with each other, in order to solve a portion or all of the above-described problems or in order to achieve a portion or all of the above-described effects. The technical features can be appropriately deleted unless the technical features are described as essential herein.

The entire disclosures of Japanese patent applications No. 2015-135365, filed on Jul. 6, 2015, No. 2015-167787, filed on Aug. 27, 2015, No. 2015-235305, filed on Dec. 2, 2015, No. 2015-235307, filed on Dec. 2, 2015, No. 2015-235306, filed on Dec. 2, 2015, and No. 2016-097716, filed on May 16, 2016, are expressly incorporated by reference herein.

What is claimed is:

1. A head-mounted display device comprising:
an image display having an optical element to transmit light from an outside scene and a display element to display an image;
a camera;
a memory configured to store data of a marker image;
one or more processors configured to:
  display an image on the image display based at least on the data; and
  derive at least one of a camera parameter of the camera and a spatial relationship, the spatial relationship being between the camera and the image display, based at least on an image that is captured by the camera in a condition that allows a user to visually perceive that the marker image displayed by the image display and a real marker corresponding to the marker image align at least partially with each other, the real marker being captured in the image by the camera, wherein
    the real marker includes a first set of circles within a square, the first set of circles arranged along intersecting diagonal lines connecting four peaks of the square, and
    the marker image includes a second set of circles, the second set of circles corresponding to the first set of circles such that an alignment of the second set of circles with the first set of circles results in a calibration of the head-mounted display device.

2. A head-mounted display device according to claim 1, wherein the one or more processors cause the image display to display an AR image so as to allow the user to visually perceive a condition that a position and pose of the AR image and those of the real marker correspond to each other, after the one or more processors derive at least one of the camera parameters and the spatial relationship.

3. A head-mounted display device according to claim 1, wherein the memory stores, as the data, a three-dimensional model that is a basis of the marker image,
the one or more processors causes the image display to display the three-dimensional model as the marker image, and
the one or more processors derive at least one of the camera parameters and the spatial relationship, based at least on an image that is captured by the camera in a condition that allows the user to visually perceive that the marker image displayed by the image display and the real marker having a three-dimensional shape corresponding to the three-dimensional model substantially align at least partially with each other.

4. A head-mounted display device according to claim 1, wherein the camera is configured to be movable with respect to the image display.

5. The head-mounted display device according to claim 1, wherein the one or more processors is configured to:
  derive the at least one of the camera parameter of the camera and the spatial relationship based at least on distances in a 2D coordinate system between points of the captured real marker and points of the marker image.

6. A non-transitory computer readable medium storing a computer program for a head-mounted display device including an image display having an optical element to transmit light from an outside scene and a display element to display an image, a camera, and a memory configured to store data of a marker image, the computer program causing a processor to perform functions comprising:
  an image setting function that, when executed, causes the image display to display an image based at least on the data; and
  a parameter setting function that derives at least one of a camera parameter of the camera and a spatial relationship, the spatial relationship being between camera and the image display, based at least on an image that is captured by camera in a condition that allows a user to visually perceive that the marker image displayed by the image display and a real marker corresponding to the marker image align at least partially with each other, the real marker being captured in the image by the camera, wherein:
    the real marker includes a first set of circles within a square, the first set of circles arranged along intersecting diagonal lines connecting four peaks of the square, and
    the marker image includes a second set of circles, the second set of circles corresponding to the first set of circles such that an alignment of the second set of circles with the first set of circles results in a calibration of the head-mounted display device.

* * * * *